United States Patent
Pudiyapura et al.

(10) Patent No.: US 9,582,251 B2
(45) Date of Patent: *Feb. 28, 2017

(54) ALGORITHM TO ACHIEVE OPTIMAL LAYOUT OF DECISION LOGIC ELEMENTS FOR PROGRAMMABLE NETWORK DEVICES

(71) Applicant: CAVIUM, INC., San Jose, CA (US)

(72) Inventors: Ajeer Salil Pudiyapura, Sunnyvale, CA (US); Kishore Badari Atreya, San Jose, CA (US); Ravindran Suresh, San Jose, CA (US)

(73) Assignee: Cavium, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/675,682

(22) Filed: Mar. 31, 2015

(65) Prior Publication Data
US 2016/0139900 A1 May 19, 2016

Related U.S. Application Data

(60) Provisional application No. 62/080,086, filed on Nov. 14, 2014, provisional application No. 62/080,060,
(Continued)

(51) Int. Cl.
*G06F 9/44* (2006.01)
*G06F 9/45* (2006.01)
(Continued)

(52) U.S. Cl.
CPC ............... *G06F 8/33* (2013.01); *G06F 8/314* (2013.01); *G06F 8/41* (2013.01); *G06F 8/427* (2013.01);
(Continued)

(58) Field of Classification Search
CPC .... G06F 8/40–8/01; G06F 8/70; G06F 8/427; G06F 8/443; G06F 8/451; G06F 8/443444; G06F 9/30145
(Continued)

(56) References Cited

U.S. PATENT DOCUMENTS 5,126,965 A * 6/1992 Asato ............... G06F 7/507 708/714
5,493,525 A * 2/1996 Yang ............... G06F 7/507 708/274
(Continued)

OTHER PUBLICATIONS

Djemal et al., "Programmable routers for efficient mapping of applications onto NoC-based MPSoCs", IEEE, 2012, 8pg.*
(Continued)

*Primary Examiner* — Ryan Coyer
(74) *Attorney, Agent, or Firm* — Haverstock & Owens LLP

(57) ABSTRACT

A processing network including a plurality of lookup and decision engines (LDEs) each having one or more configuration registers and a plurality of on-chip routers forming a matrix for routing the data between the LDEs, wherein each of the on-chip routers is communicatively coupled with one or more of the LDEs. The processing network further including an LDE compiler stored on a memory and communicatively coupled with each of the LDEs, wherein the LDE compiler is configured to generate values based on input source code that when programmed into the configuration registers of the LDEs cause the LDEs to implement the functionality defined by the input source code.

35 Claims, 41 Drawing Sheets

Related U.S. Application Data filed on Nov. 14, 2014, provisional application No. 62/080,011, filed on Nov. 14, 2014, provisional application No. 62/079,929, filed on Nov. 14, 2014, provisional application No. 62/079,888, filed on Nov. 14, 2014, provisional application No. 62/080,107, filed on Nov. 14, 2014.

(51) Int. Cl.
*G06F 15/76* (2006.01)
*G06F 9/30* (2006.01)
*G06F 15/78* (2006.01)

(52) U.S. Cl.
CPC .............. *G06F 8/443* (2013.01); *G06F 8/445* (2013.01); *G06F 8/447* (2013.01); *G06F 8/4434* (2013.01); *G06F 8/451* (2013.01); *G06F 8/70* (2013.01); *G06F 9/30145* (2013.01); *G06F 15/7825* (2013.01); *G06F 15/76* (2013.01)

(58) Field of Classification Search
USPC ...................................... 717/158; 712/29, 37
See application file for complete search history.

(56) References Cited

U.S. PATENT DOCUMENTS

| | | | | |
|---|---|---|---|---|
| 7,386,583 | B2* | 6/2008 | Cho | G06F 7/503 708/700 |
| 7,472,051 | B2* | 12/2008 | Mariani | G06F 11/27 703/13 |
| 7,543,283 | B2 | 6/2009 | Luk | |
| 2003/0172045 | A1* | 9/2003 | Rindner | G06F 17/505 707/999.001 |
| 2003/0188299 | A1 | 10/2003 | Broughton | |
| 2005/0213570 | A1* | 9/2005 | Stacy | H04L 47/32 370/389 |
| 2006/0168309 | A1* | 7/2006 | Sikdar | G06F 8/427 709/232 |
| 2007/0226686 | A1 | 9/2007 | Beardslee | |
| 2008/0313427 | A1 | 12/2008 | Dombrowski | |
| 2009/0113170 | A1 | 4/2009 | Abdallah | |
| 2009/0210387 | A1 | 8/2009 | Hutton | |
| 2011/0010525 | A1 | 1/2011 | Binkert | |
| 2011/0161626 | A1 | 6/2011 | Mangione-Smith | |
| 2012/0191944 | A1 | 7/2012 | Gonion | |
| 2013/0163475 | A1* | 6/2013 | Beliveau | H04L 67/327 370/257 |
| 2013/0215906 | A1* | 8/2013 | Hidai | H04L 69/22 370/474 |
| 2013/0238792 | A1* | 9/2013 | Kind | H04L 43/026 709/224 |
| 2014/0269307 | A1* | 9/2014 | Banerjee | H04L 47/2441 370/235 |
| 2014/0359585 | A1 | 12/2014 | Marvie | |

OTHER PUBLICATIONS

Jalabert et al., "XpipesCompiler: A tool for instantiating application specific Networks on Chip", IEEE, 2004, 6pg.*
Bertozzi et al., "Xpipes: A Network-on-Chip Architecture for Gigascale Systems-on-Chip", IEEE, 2004, 14pg.*
Liang et al., "An Architecture and Compiler for Scalable On-Chip Communication", IEEE, 2004, 25pg.*
Hu et al., "DyAD—Smart Routing for Networks-on-Chip", ACM, 2004, 4pg.*
Dally et al., "Route Packets, Not Wires: On-Chip Interconnection Networks", ACM, 2001, 6pg.*
Tran et al., "NoCTweak: a Highly Parameterizable Simulator for Early Exploration of Performance and Energy of Networks On-Chip", UC-Davis, 2012, 12pg.*
Flich et al., "The fast evolving landscape of on-chip communication", Springer, Apr. 30, 2014, 17pg.*
Bjerregaard et al., "A Survey of Research and Practices of Network-on-Chip", ACM, 2006, 51pg.*
Baas et al., "Achieving High-Performance On-Chip Networks With Shared-Buffer Routers", IEEE, 2013, 12pg.*
Leupers et al., "A BDD-based Frontend for Retargetable Compilers", IEEE, 1995, 5 pages.

* cited by examiner

Schematic of a MuxLut cell

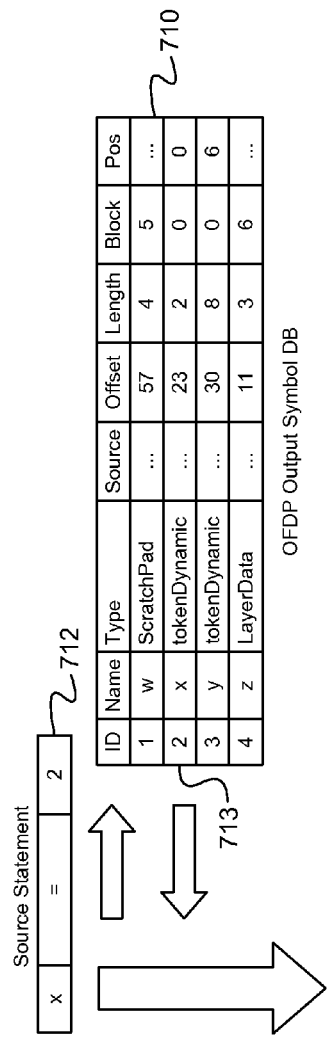

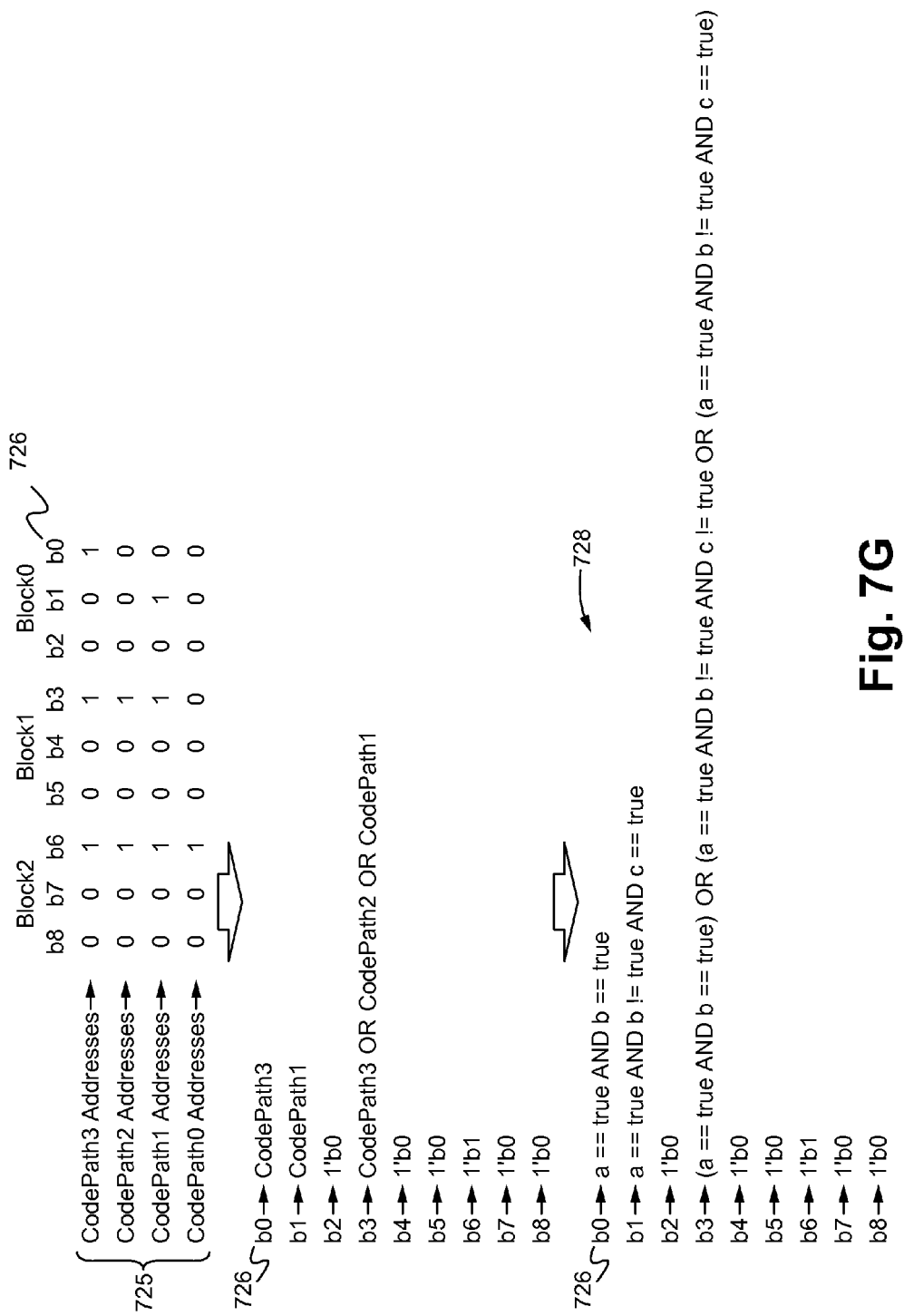

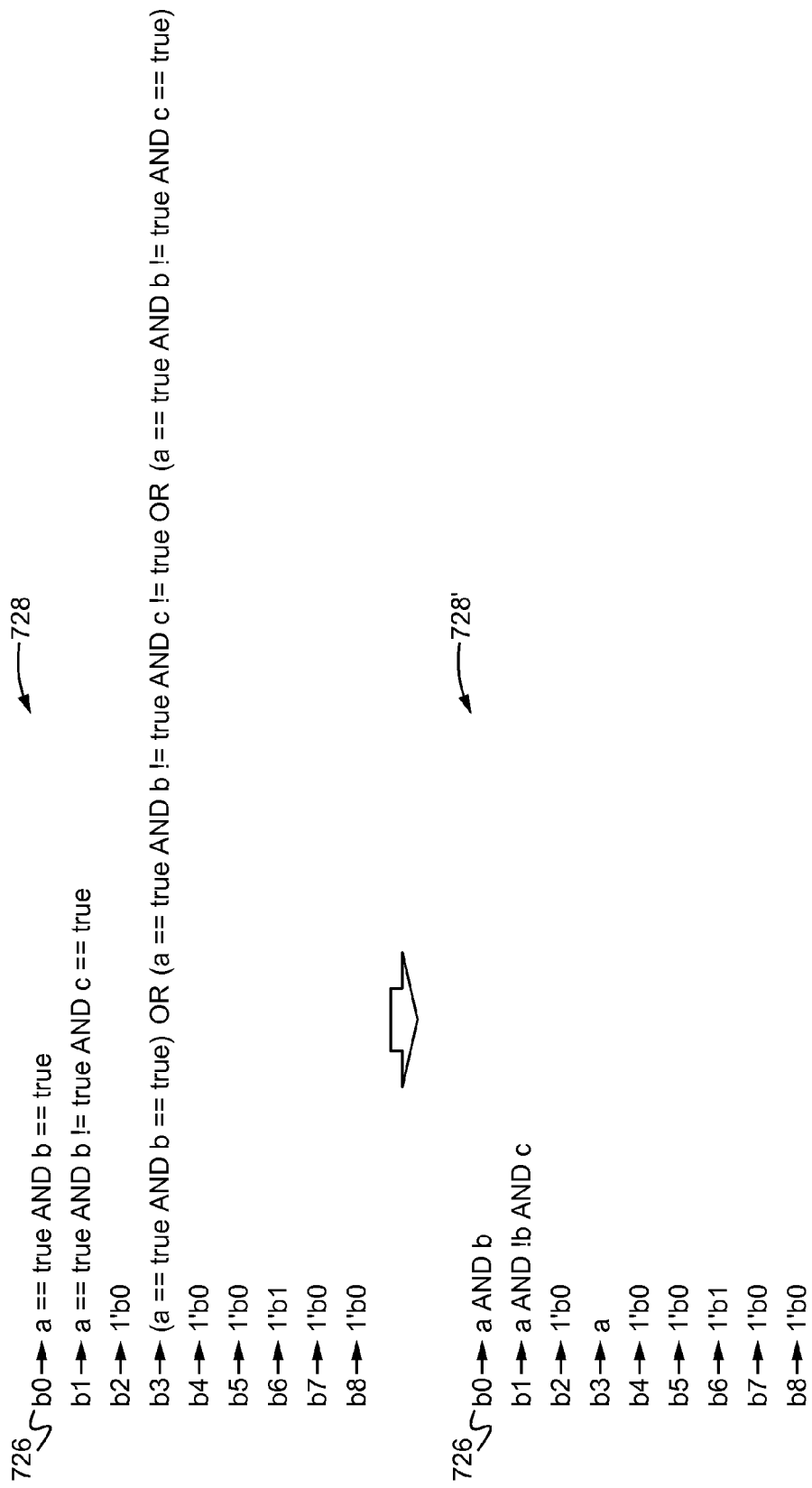

◢—1200

1201. Start.
1202. if (FieldBitLength == 0) then Go To Step 15.
1203. SubFieldBitLength = FieldBitLength. // attempts to copy the entire field all at once.
1204. if (SrcStartBitOffsetWithinItsByte >= DstStartBitOffsetWithinItsByte) then // Shift Right
      a. SubFieldShiftBy = SrcStartBitOffsetWithinItsBtye - DstStartBitOffsetWithinItsByte.
      b. DeeperOffset = SrcStartBitOffsetWithinItsByte.
1205. else // Shift Left
      a. SubFieldShiftBy = DstStartBitOffsetWithinItsByte - SrcStartBitOffsetWithinItsByte.
      b. DeeperOffset = DstStartBitOffsetWithinItsByte,
1206. SubFieldFetchBytes = (DeeperOffset + SubFieldBitLength + 7) / 8.
1207. if (SubFieldFetchBytes > MaxFetchBytes) then
      a. SubFieldFetchBytes = MaxFetchBytes. // Trim the subfield to max fetch bytes
      b. SubFieldBitLength   = (MaxFetchBytes * 8) - DeeperOffset.
1208. if (SubFieldFetchBytes > MaxShiftBytes AND SubFieldShiftBy != 0) then
      a. SubFieldFetchBytes = MaxShiftBytes. // Trim the subfield to shifter size.
      b. SubFieldBitLength   = (MaxShiftBytes * 8) - DeeperOffset.
1209. if (SubFieldFetchBytes > MaxMaskBytes AND DstNotByteAligned) then
      a. if (SubFieldShiftBy == 0)
            i. SubFieldBitLength = 8 - DeeperOffset. // Until end of this byte so that
              the next subfield onwards in next iteration will be byte aligned.
            ii. SubFieldFetchBytes = (DeeperOffset + SubFieldBitLength + 7) / 8.
      b. else
            i. SubFieldFetchBytes = MaxMaskBytes.
            ii. SubFieldBitLength   = (MaxMaskBytes * 8) - DeeperOffset.
1210. Create an instruction in corresponding step 1016 that copies SubFieldBitLength bits from the source starting from SrcFieldBitStart to the destination starting from DstFieldBitStart.
1211. SrcFieldBitStart += SubFieldBitLength. // Advance the source pointer by amount copied.
1212. DstFieldBitStart += SubFieldBitLength. // Advance the dest. pointer by amount copied.
1213. FieldBitLength  -= SubFieldBitLength. // Reduce the field length by amount copied.
1214. Go To Step 1202.
1215. Stop.

Fig. 12

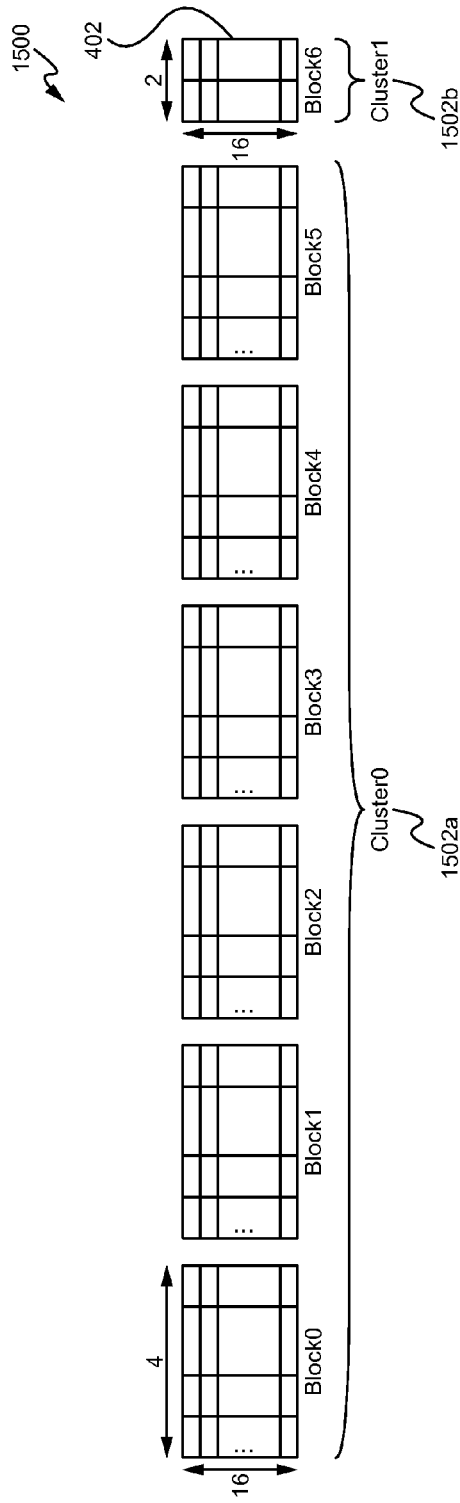
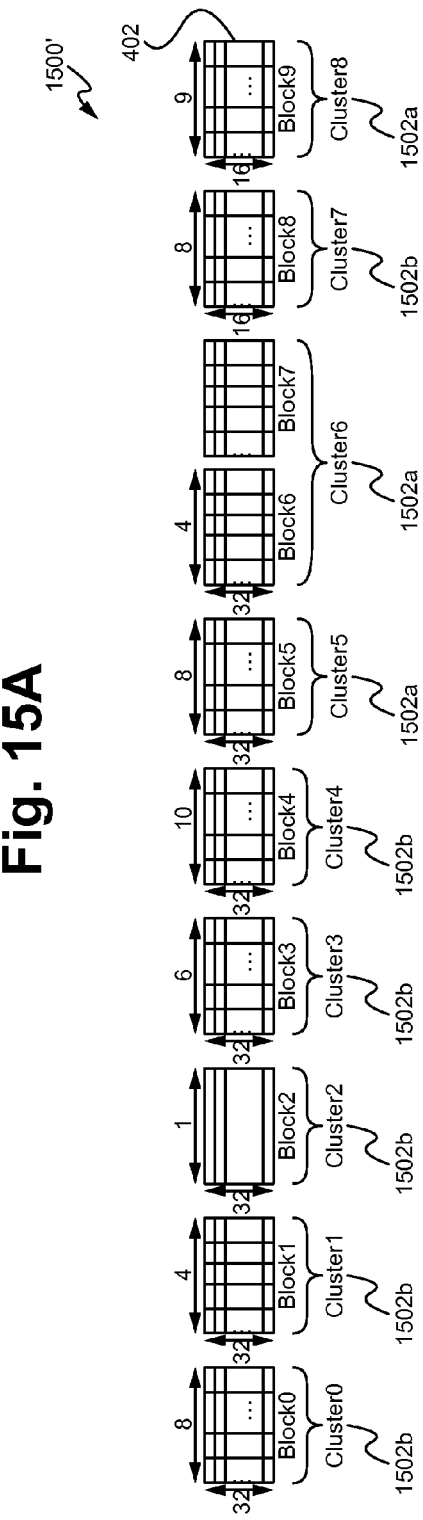
Fig. 15A
Fig. 15B

1801. Start.
1802. Create an Instruction Table Line for each Instruction in the Instruction Dictionary.
1803. Create an Instruction Table Block for each Instruction Line created in step 1802.
1804. Create InstructionTableAddesses Array such that each code path picks its instructions from the corresponding blocks.
1805. Build the RelationshipsDatabase to reflect the current Relationships between Blocks.
1806. numOfBlocks = totalNumOfInstructions.
1807. Iteration = 0;
1808. if (numOfBlocks <= totalNumOfBlocksInCluster | | RelationshipsDatabase
    .HighestCompatibility < cFactorArray[Attempt % cFactorDim])
    a. Go To 1812.
1809. CombineInstructionTableLines (InstructionsCluster, InstructionTableAddesses, RelationshipsDatabase, Iteration, Attempt).
1810. Iteration = Iteration + 1
1811. Go To 1808.
1812. Iteration = 0;
1813. if (numOfBlocks <= totalNumOfBlocksInCluster || RelationshipsDatabase.HighestExclusivity
    < eFactorArray[Attempt % eFactorDim])
    a. Go To 1817.
1814. CombineInstructionTableBlocks(InstructionsCluster, InstructionTableAddesses, RelationshipsDatabase, Iteration, Attempt).
1815. Iteration = Iteration + 1
1816. Go To 1813.
1817. if (numOfBlocks <= totalNumOfBlocksInCluster || Attempt >= MaxAttempts)
    a. Go To 1820
1818. Attempt = Attempt + 1
1819. Go To 1802.
1820. Return (numOfBlocks <= totalNumOfBlocksInCluster)
1821. Stop.

Fig. 18

1901. Start.
1902. Get the two most Combinable instruction lines from the database.
1903. Combine the two instruction lines to form a new instruction line that has instructions from both the original lines.
1904. Create a new Block for the new instruction line and add it to the Cluster.
1905. Update code paths that used to use both of the old instruction lines to now use the new instruction line instead.
1906. If the last step has made any of the old instruction lines unused, delete that instruction line along with the Block it belongs to.
1907. Update the Relationships Database to reflect the current Relationships between Blocks.
1908. Return.
1909. Stop

Fig. 19

2001. Start.
2002. Initialize PathForward = Params.Order [Attempt] [Iter]
2003. Initialize BestHashesArray [PathForward] with worst possible values. Initialize FirstOfPairArray[PathForward] and SecondOfPairArray[PathForward] with 'None'.
2004. For each Instruction Table Line or block i' in the database
2005. For each Instruction Table Line or block j' in the database
2006. If (RelDbase.Widths(i) + RelDbase.Widths(j) > RelDbase.MaxWidthAllowed)
    a. Go to Step 2009.
2007. Compute Hash = CompatibilityHash(i, j, iter, attempt);
2008. If (Hash is better than the worst element in BestHashesArray[ ] OR (Hash is same as the worst element in BestHashesArray[] AND Combined Number of instructions in Line i and Line j > Combined Number of instructions in the worst pair in BestHashesArray[ ]))
    a. Replace the worst element in BestHashesArray[ ] with Hash)
    b. Replace the corresponding element in FirstOfPairArray[ ] with i.
    c. Replace the corresponding element in SecondOfPairArray[ ] with j.
2009. If (j < RelDbase.NumOfInstructions) Go To 2005.
2010. If (i < RelDbase.NumOfInstructions) Go To 2004.
2011. Return the pair of instructions (FirstOfPairArray[index of worst element in BestHashesArray[ ] ], SecondOfPairArray[ [index of worst element in BestHashesArray[ ] ]).
2012. Stop.

Fig. 20

2101. Start.
2102. alpha = Params.alpha[Attempt][Iter].
2103. beta = Params.beta[Attempt][Iter].
2104. gamma = Params.gamma[Attempt][Iter].
2105. Incs = RelDbase.Inclusivity[i][j].
2106. If (RelDbase.RightExclusivity[i][i] > RelDbase.LeftExclusivity[i][j])
    a. HigherExc = RelDbase.RightExclusivity[i][i].
2107. Else
    a. HigherExc = RelDbase.LeftExclusivity[i][j].
2108. Hash = (alpha * Incs) + (beta * (RelDbase.NumOfCodePaths- RelDbase.Exclusions[i][j])) + (gamma * HigherExc))
2109. Return Hash.
2110. Stop

Fig. 21

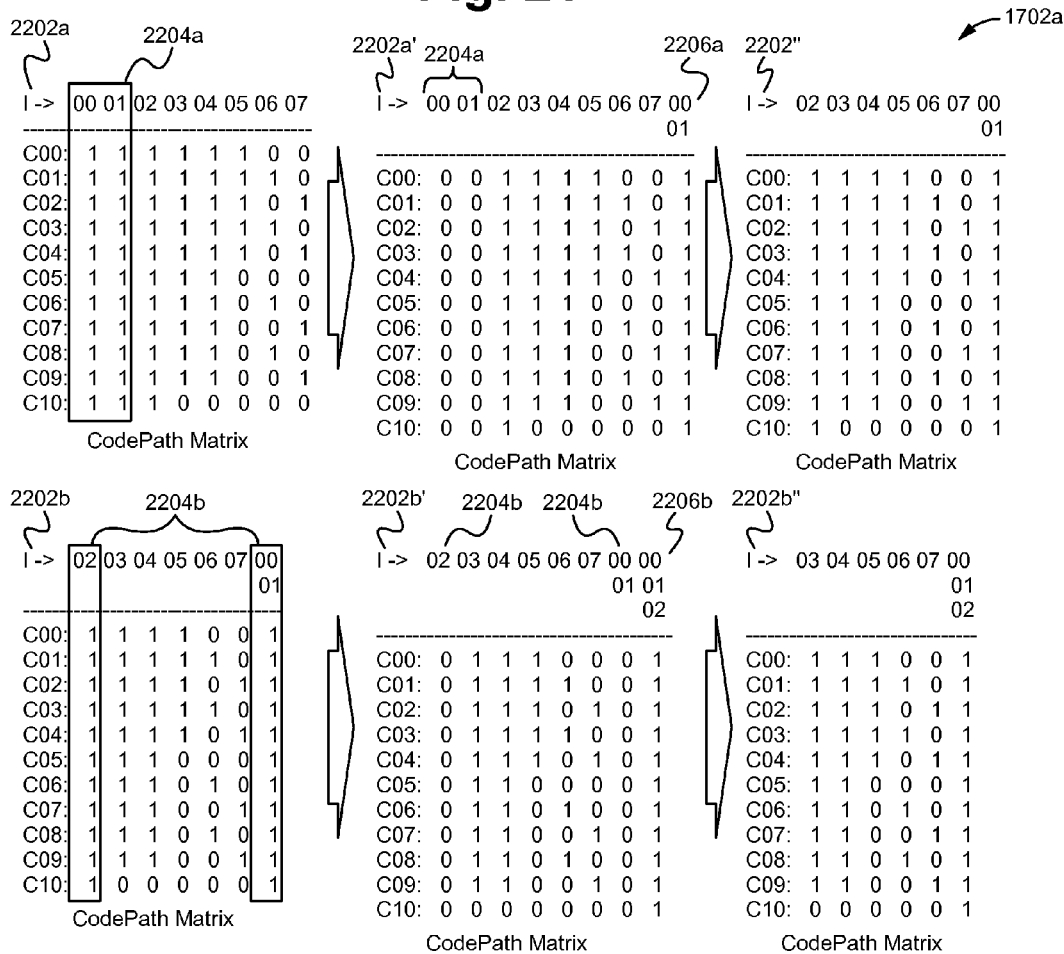

Fig. 22

2401. Start.
2402. Get the two most Exclusive instruction blocks from the database.
2403. Combine the two blocks by creating a new Block that contains Lines from both the blocks.
2404. Add the new Block to the Cluster.
2405. Update the code paths to use the new Block.
2406. If the last step has made any of the old Blocks to be used by no code path, delete that Block.
2407. Update the Relationships Database to reflect the current Relationships between Blocks.
2408. Return.
2409. Stop.

Fig. 24

2501. Start.
2502. Initialize PathForward = Params.Order[Attempt][Iter]
2503. Initialize MostExcArray[PathForward] with worst possible values. Initialize FirstOfPairArray[PathForward] and SecondOfPairArray[PathForward] with None'.
2504. For each instruction line (or block) i' in the database
2505. For each other instruction line (or block) j' in the database
2506. if (RelDbase.Depths(i) + RelDbase.Depths(j) > RelDbase.MaxDepthAllowed)
    a. Go To Step 2510.
2507. If (Inclusivity[i,j] == 0)
    a. Go To Step 2510.
2508. Compute Exc = Exclusivity[i, j];
2509. If (Exc is better than the worst element in MostExcArray[])
    a. Replace the worst element in MostExcArray[] with Exc)
    b. Replace the corresponding element in FirstOfPairArray[] with i.
    c. Replace the corresponding element in SecondOfPairArray[] with j.
2510. If (j < RelDbase.NumOfInstructions) Go To 2505.
2511. If (i < RelDbase.NumOfInstructions) Go To 2504.
2512. Return the pair of instructions (FirstOfPairArray[index of worst element in MostExcArray[]], SecondOfPairArray[[index of worst element in MostExcArray[]]).
2513. Stop.

Fig. 25

ALGORITHM TO ACHIEVE OPTIMAL LAYOUT OF DECISION LOGIC ELEMENTS FOR PROGRAMMABLE NETWORK DEVICES

RELATED APPLICATIONS

This application claims priority under 35 U.S.C. §119(e) of the U.S. provisional patent application Ser. No. 62/080,086, filed Nov. 14, 2014, and titled "AN ALGORITHM TO ACHIEVE OPTIMAL LAYOUT OF DECISION LOGIC ELEMENTS FOR PROGRAMMABLE NETWORK DEVICES," the U.S. provisional patent application Ser. No. 62/080,060, filed Nov. 14, 2014, and titled "AN ALGORITHM TO DERIVE LOGIC EXPRESSION TO SELECT EXECUTION BLOCKS FOR PROGRAMMABLE NETWORK DEVICES," the U.S. provisional patent application Ser. No. 62/080,011, filed Nov. 14, 2014, and titled "AN ALGORITHM TO ACHIEVE OPTIMAL LAYOUT OF INSTRUCTION TABLES FOR PROGRAMMABLE NETWORK DEVICES," the U.S. provisional patent application Ser. No. 62/079,929, filed Nov. 14, 2014, and titled "A CODE GENERATOR FOR PROGRAMMABLE NETWORK DEVICES," the U.S. provisional patent application Ser. No. 62/079,888, filed Nov. 14, 2014, and titled "A COMPILER ARCHITECTURE FOR PROGRAMMABLE APPLICATION SPECIFIC INTEGRATED CIRCUIT BASED NETWORK DEVICES," and the U.S. provisional patent application Ser. No. 62/080,107, filed Nov. 14, 2014, and titled "A CODE PROCESSOR TO BUILD ORTHOGONAL EXECUTION BLOCKS FOR PROGRAMMABLE NETWORK DEVICES," all of which are hereby incorporated by reference.

FIELD OF INVENTION

The present invention relates to the programming of multiple lookup and decision engines (LDEs) on a single chip. More particularly, the present invention relates to a processing engine compiler for use with a matrix of on-chip routers interconnecting a plurality of lookup and decision engines.

BACKGROUND OF THE INVENTION

As transistor size becomes smaller, more computational components, memories and lookup and decision engines can be integrated onto a single chip. This high integration allows for the ability to process more system tasks in parallel to achieve higher system performance. An on-chip network is an interconnection technique for a large number of lookup and decision engines on a single chip. The network includes multiple on-chip routers in which each on-chip router connects to the nearest neighboring on-chip router(s) in the network. Each lookup and decision engine is connected to one of the on-chip routers and an on-chip router can connect with multiple lookup and decision engines. Data communicated among lookup and decision engines are transferred through the network of the on-chip routers.

BRIEF SUMMARY OF THE INVENTION

A lookup and decision engine (LDE) compiler for use with a matrix of on-chip routers interconnecting a plurality of lookup and decision engines (LDEs). Using a plurality of modules, the LDE compiler is able to break down a source code to determine all of the unique assignments within the code as well as all the conditions of the code, which are both then able to be stored in tables for later reference. Further, the modules are able to pair sets of assignments with sets of conditions of the code that must be satisfied for those assignments to be executed until all possible condition paths of the code are determined. Based on this data, the conditional logic and corresponding assignments are able to be simplified, combined and/or compressed such that as little data as possible is able to represent all permutations of the source code. Finally, these compressed permutations and/or associated assignments are able to be converted into an output file based on the configuration of the processing elements (e.g. multiplexers) on the LDE such that the LDE is able to perform the source code functionality when programmed with the output file.

A first aspect is directed to a processing network for receiving a source code having one or more code paths that are each associated with one or more conditions and one or more assignments of the source code. The network comprises a plurality of processing elements on a programmable microchip, wherein each of the processing elements comprise one or more instruction tables and a logic cloud including a grid of logic devices, wherein a first column of the grid receives logic cloud input and a last column of the grid transmits logic cloud output, a plurality of on-chip routers on the microchip for routing the data between the processing elements, wherein each of the on-chip routers is communicatively coupled with one or more of the processing elements and a compiler stored on a non-transitory computer-readable memory and comprising a logic cloud mapper that, based on the grid of logic devices, assigns functions to one or more of the logic devices and routes operable connections between the one or more of the logic devices such that the logic cloud, in conjunction with the instruction tables, implement the conditions and the assignments of the code paths of the source code. In some embodiments, each function corresponds to one or more device input values and a device output value, and further wherein the logic device assigned one of the functions will output the device output value in response to inputting the device input values. In some embodiments, the device input values and device output value are selected from the group consisting of primary inputs that are to be received from the logic cloud input, intermediate results that are to be received from one of the logic devices or primary outputs that are the logic cloud output to be transmitted to the instruction tables. In some embodiments, the logic cloud mapper determines all possible serial chains of the functions that can be formed such that the device input values of the function at the start of each of the chains are one or more of the primary inputs, the device output value of the function at the end of each of the chains is one of the primary outputs and for every pair of the functions that are adjacent within each of the chains, the device output value of the preceding function of the pair matches at least one of the device input values of the other function of the pair. In some embodiments, for each of the functions the logic cloud mapper determines a longest chain of the chains that includes the function. In some embodiments, for each of the functions, the logic cloud mapper determines which column or columns within the grid that the logic device to which the function is assigned can be located such that the longest chain that includes the function can fit within the logic devices of a single row of the grid. In some embodiments, of the column or columns within the grid that the logic device to which the function is assigned can be located, the logic cloud mapper assigns the function to one of the logic devices in the column closest to the first column whose logic devices have not all already been assigned one of the functions. In some embodiments, the logic cloud mapper prioritizes the order of assignment of the functions based on the number of column or columns within the grid that the logic device to which the function is assigned can be located such that, for each column of the grid, the functions with a smaller number of column or columns within the grid that the logic device to which the function is assigned can be located are assigned first. In some embodiments, routing the operable connections between the one or more of the logic devices comprises except for the first column, for each of the device input values of each of the functions assigned to one of the logic devices in one of the columns of the grid, coupling a matching device output value of the device output values of the functions assigned to the logic devices in an immediately preceding column of the grid if possible and for any of the device input values of the functions assigned to the logic devices of the last column that do not match any of the device output values of the functions of the immediately preceding column, coupling each of the any of the device input values to a bypass output of a bypass device in the immediately preceding column. In some embodiments, the bypass output of the bypass devices is equal to a bypass input of the bypass devices. In some embodiments, routing the operable connections between the one or more of the logic devices comprises except for the first column, for each of the bypass devices of each of the immediately preceding columns whose bypass output is coupled to one of the any of the device input values, coupling to the bypass input a device output value of the device output values of the functions assigned to the logic devices in the immediately preceding column of the grid that matches the one of the any of the device input values if possible and for any of the any of the device input values of the functions assigned to the logic devices of the last column that do not match any of the device output values of the functions of the immediately preceding column, coupling each of the any of the any of the device input values to a bypass output of a bypass device in the immediately preceding column. In some embodiments, the logic cloud mapper starts with the last column and proceeds through the columns of the grid in order toward the first column when routing the operable connections between the one or more of the logic devices. In some embodiments, each of the logic devices comprise one or more multiplexors coupled with a lookup table.

A second aspect is directed to a processing network for receiving a source code having one or more code paths that are each associated with one or more conditions and one or more assignments of the source code. The network comprises a plurality of processing elements on a programmable microchip, wherein each of the processing elements comprise a MuxXor cloud including a predetermined number of MuxXor cells and a logic cloud coupled with the MuxXor cloud for receiving MuxXor output from the MuxXor cells, a plurality of on-chip routers on the microchip for routing the data between the processing elements, wherein each of the on-chip routers is communicatively coupled with one or more of the processing elements and a compiler stored on a non-transitory computer-readable memory and comprising a MuxXor cloud mapper that configures the MuxXor cells to implement one or more comparisons of the conditions of the source code. In some embodiments, the MuxXor cloud mapper determines the one or more comparisons by identifying a list of all comparisons within the conditions of the source code and pruning the list until the number of comparisons within the list is equal to the predetermined number of MuxXor cells. In some embodiments, the pruning is prioritized such that comparisons of the list involving smaller amounts of compared data are pruned before comparisons of the list involving larger amounts of compared data. In some embodiments, the source code comprises one or more dedicated MuxXor cloud comparison operators and the pruning is prioritized such that comparisons of the list associated with one of the dedicated MuxXor cloud comparison operators are immune from pruning until all comparisons of the list not associated with one of the dedicated MuxXor cloud comparison operators have already been pruned. In some embodiments, each of the MuxXor cells comprise two MuxXor inputs and the MuxXor output such that, after being configured, each of the MuxXor cells compare the data received on the two MuxXor inputs and output a first predetermined value (e.g. one) as the MuxXor output if the MuxXor inputs are the same and output a second predetermined value (e.g. zero) as the MuxXor output if the MuxXor inputs are not the same. In some embodiments, each of the MuxXor cells receive a primary input from outside the processing element and output the MuxXor output to the logic cloud. In some embodiments, each of the MuxXor cells comprise two multiplexors the each receive a different or the same one of the MuxXor inputs coupled to a comparator that compares the MuxXor inputs and outputs the MuxXor output based on the comparison.

A third aspect is directed to a compiler stored on a non-transitory computer-readable medium and configured to generate values based on source code that when programmed into one or more configuration registers of one or more processing elements on a programmable microchip cause the processing elements to implement the functionality defined by the source code, wherein the source code has one or more code paths that are each associated with one or more conditions and one or more assignments of the source code, each of the processing elements comprise one or more instruction tables and a logic cloud including a grid of logic devices, wherein a first column of the grid receives logic cloud input and a last column of the grid transmits logic cloud output and the compiler comprises a logic cloud mapper that, based on the grid of logic devices, assigns functions to one or more of the logic devices and routes operable connections between the one or more of the logic devices such that the logic cloud, in conjunction with the instruction tables, implement the conditions and the assignments of the code paths of the source code. In some embodiments, each function corresponds to one or more device input values and a device output value, and further wherein the logic device assigned one of the functions will output the device output value in response to inputting the device input values. In some embodiments, the device input values and device output value are selected from the group consisting of primary inputs that are to be received from the logic cloud input, intermediate results that are to be received from one of the logic devices or primary outputs that are the logic cloud output to be transmitted to the instruction tables. In some embodiments, the logic cloud mapper determines all possible serial chains of the functions that can be formed such that the device input values of the function at the start of each of the chains are one or more of the primary inputs, the device output value of the function at the end of each of the chains is one of the primary outputs and for every pair of the functions that are adjacent within each of the chains, the device output value of the preceding function of the pair matches at least one of the device input values of the other function of the pair. In some embodiments, for each of the functions the logic cloud mapper determines a longest chain of the chains that includes the function. In some embodiments, for each of the functions, the logic cloud mapper determines which column or columns within the grid that the logic device to which the function is assigned can be located such that the longest chain that includes the function can fit within the logic devices of a single row of the grid. In some embodiments, of the column or columns within the grid that the logic device to which the function is assigned can be located, the logic cloud mapper assigns the function to one of the logic devices in the column closest to the first column whose logic devices have not all already been assigned one of the functions. In some embodiments, the logic cloud mapper prioritizes the order of assignment of the functions based on the number of column or columns within the grid that the logic device to which the function is assigned can be located such that, for each column of the grid, the functions with a smaller number of column or columns within the grid that the logic device to which the function is assigned can be located are assigned first. In some embodiments, routing the operable connections between the one or more of the logic devices comprises except for the first column, for each of the device input values of each of the functions assigned to one of the logic devices in one of the columns of the grid, coupling a matching device output value of the device output values of the functions assigned to the logic devices in an immediately preceding column of the grid if possible and for any of the device input values of the functions assigned to the logic devices of the last column that do not match any of the device output values of the functions of the immediately preceding column, coupling each of the any of the device input values to a bypass output of a bypass device in the immediately preceding column. In some embodiments, the bypass output of the bypass devices is equal to a bypass input of the bypass devices. In some embodiments, routing the operable connections between the one or more of the logic devices comprises except for the first column, for each of the bypass devices of each of the immediately preceding columns whose bypass output is coupled to one of the any of the device input values, coupling to the bypass input a device output value of the device output values of the functions assigned to the logic devices in the immediately preceding column of the grid that matches the one of the any of the device input values if possible and for any of the any of the device input values of the functions assigned to the logic devices of the last column that do not match any of the device output values of the functions of the immediately preceding column, coupling each of the any of the any of the device input values to a bypass output of a bypass device in the immediately preceding column. In some embodiments, the logic cloud mapper starts with the last column and proceeds through the columns of the grid in order toward the first column when routing the operable connections between the one or more of the logic devices. In some embodiments, each of the logic devices comprise one or more multiplexors coupled with a lookup table.

A fourth aspect is directed to a compiler stored on a non-transitory computer-readable medium and configured to generate values based on source code that when programmed into one or more configuration registers of one or more processing elements on a programmable microchip cause the processing elements to implement the functionality defined by the source code, wherein the source code has one or more code paths that are each associated with one or more conditions and one or more assignments of the source code, each of the processing elements comprise a MuxXor cloud including a predetermined number of MuxXor cells and a logic cloud coupled with the MuxXor cloud for receiving MuxXor output from the MuxXor cell and the compiler comprises a MuxXor cloud mapper that configures the MuxXor cells to implement one or more comparisons of the conditions of the source code. In some embodiments, the MuxXor cloud mapper determines the one or more comparisons by identifying a list of all comparisons within the conditions of the source code and pruning the list until the number of comparisons within the list is equal to the predetermined number of MuxXor cells. In some embodiments, the pruning is prioritized such that comparisons of the list involving smaller amounts of compared data are pruned before comparisons of the list involving larger amounts of compared data. In some embodiments, the source code comprises one or more dedicated MuxXor cloud comparison operators and the pruning is prioritized such that comparisons of the list associated with one of the dedicated MuxXor cloud comparison operators are immune from pruning until all comparisons of the list not associated with one of the dedicated MuxXor cloud comparison operators have already been pruned. In some embodiments, each of the MuxXor cells comprise two MuxXor inputs and the MuxXor output such that, after being configured, each of the MuxXor cells compare the data received on the two MuxXor inputs and output a first predetermined value (e.g. one) as the MuxXor output if the MuxXor inputs are the same and output a second predetermined value (e.g. zero) as the MuxXor output if the MuxXor inputs are not the same. In some embodiments, each of the MuxXor cells receive a primary input from outside the processing element and output the MuxXor output to the logic cloud. In some embodiments, each of the MuxXor cells comprise two multiplexors the each receive a different or the same one of the MuxXor inputs coupled to a comparator that compares the MuxXor inputs and outputs the MuxXor output based on the comparison.

A fifth aspect is directed to a method of implementing a compiler stored on a non-transitory computer-readable medium of a computing device and configured to generate values based on a source code that when programmed into one or more configuration registers of one or more processing elements on a programmable microchip cause the processing elements to implement the functionality defined by the source code. The method comprises inputting the source code having one or more code paths with the computing device, wherein the code paths are each associated with one or more conditions and one or more assignments of the source code, wherein each of the processing elements comprise one or more instruction tables and a logic cloud including a grid of logic devices, wherein a first column of the grid receives logic cloud input and a last column of the grid transmits logic cloud output and based on the grid of logic devices, assigning functions to one or more of the logic devices with a logic cloud mapper of the compiler of the computing device and routing operable connections between the one or more of the logic devices with the logic cloud mapper such that the logic cloud, in conjunction with the instruction tables, implement the conditions and the assignments of the code paths of the source code. In some embodiments, each function corresponds to one or more device input values and a device output value, and the logic device assigned one of the functions will output the device output value in response to inputting the device input values. In some embodiments, the device input values and device output value are selected from the group consisting of primary inputs that are to be received from the logic cloud input, intermediate results that are to be received from one of the logic devices or primary outputs that are the logic cloud output to be transmitted to the instruction tables. In some embodiments, the method further comprises, with the logic cloud mapper, determining all possible serial chains of the functions that can be formed such that the device input values of the function at the start of each of the chains are one or more of the primary inputs, the device output value of the function at the end of each of the chains is one of the primary outputs and for every pair of the functions that are adjacent within each of the chains, the device output value of the preceding function of the pair matches at least one of the device input values of the other function of the pair. In some embodiments, the method further comprises, for each of the functions, determining a longest chain of the chains that includes the function with the logic cloud mapper. In some embodiments, the method further comprises, for each of the functions, determining with the logic cloud mapper which column or columns within the grid that the logic device to which the function is assigned can be located such that the longest chain that includes the function can fit within the logic devices of a single row of the grid. In some embodiments, the method further comprises, of the column or columns within the grid that the logic device to which the function is assigned can be located, assigning the function to one of the logic devices in the column closest to the first column whose logic devices have not all already been assigned one of the functions with the logic cloud mapper. In some embodiments, the logic cloud mapper prioritizes the order of assignment of the functions based on the number of column or columns within the grid that the logic device to which the function is assigned can be located such that, for each column of the grid, the functions with a smaller number of column or columns within the grid that the logic device to which the function is assigned can be located are assigned first. In some embodiments, routing the operable connections between the one or more of the logic devices with the logic cloud mapper comprises except for the first column, for each of the device input values of each of the functions assigned to one of the logic devices in one of the columns of the grid, coupling a matching device output value of the device output values of the functions assigned to the logic devices in an immediately preceding column of the grid if possible and for any of the device input values of the functions assigned to the logic devices of the last column that do not match any of the device output values of the functions of the immediately preceding column, coupling each of the any of the device input values to a bypass output of a bypass device in the immediately preceding column. In some embodiments, the bypass output of the bypass devices is equal to a bypass input of the bypass devices. In some embodiments, routing the operable connections between the one or more of the logic devices with the logic cloud mapper comprises except for the first column, for each of the bypass devices of each of the immediately preceding columns whose bypass output is coupled to one of the any of the device input values, coupling to the bypass input a device output value of the device output values of the functions assigned to the logic devices in the immediately preceding column of the grid that matches the one of the any of the device input values if possible and for any of the any of the device input values of the functions assigned to the logic devices of the last column that do not match any of the device output values of the functions of the immediately preceding column, coupling each of the any of the any of the device input values to a bypass output of a bypass device in the immediately preceding column. In some embodiments, the logic cloud mapper starts with the last column and proceeds through the columns of the grid in order toward the first column when routing the operable connections between the one or more of the logic devices. In some embodiments, each of the logic devices comprise one or more multiplexors coupled with a lookup table.

A sixth aspect is directed to a method of implementing a compiler stored on a non-transitory computer-readable medium of a computing device and configured to generate values based on a source code that when programmed into one or more configuration registers of one or more processing elements on a programmable microchip cause the processing elements to implement the functionality defined by the source code. The method comprises inputting the source code having one or more code paths with the computing device, wherein the code paths are each associated with one or more conditions and one or more assignments of the source code, wherein each of the processing elements comprise a MuxXor cloud including a predetermined number of MuxXor cells and a logic cloud coupled with the MuxXor cloud for receiving MuxXor output from the MuxXor cells and configuring the MuxXor cells to implement one or more comparisons of the conditions of the source code with a MuxXor cloud mapper of the compiler of the computing device. In some embodiments, the method further comprises determining the one or more comparisons with the MuxXor cloud mapper by identifying a list of all comparisons within the conditions of the source code and pruning the list until the number of comparisons within the list is equal to the predetermined number of MuxXor cells. In some embodiments, the pruning is prioritized such that comparisons of the list involving smaller amounts of compared data are pruned before comparisons of the list involving larger amounts of compared data. In some embodiments, the source code comprises one or more dedicated MuxXor cloud comparison operators and the pruning is prioritized such that comparisons of the list associated with one of the dedicated MuxXor cloud comparison operators are immune from pruning until all comparisons of the list not associated with one of the dedicated MuxXor cloud comparison operators have already been pruned. In some embodiments, each of the MuxXor cells comprise two MuxXor inputs and the MuxXor output such that, after being configured, each of the MuxXor cells compare the data received on the two MuxXor inputs and output a first predetermined value (e.g. one) as the MuxXor output if the MuxXor inputs are the same and output a second predetermined value (e.g. zero) as the MuxXor output if the MuxXor inputs are not the same. In some embodiments, each of the MuxXor cells receive a primary input from outside the processing element and output the MuxXor output to the logic cloud. In some embodiments, each of the MuxXor cells comprise two multiplexors the each receive a different or the same one of the MuxXor inputs coupled to a comparator that compares the MuxXor inputs and outputs the MuxXor output based on the comparison.

BRIEF DESCRIPTION OF THE DRAWINGS

FIG. 7C illustrates exemplary symbol databases according to some embodiments.

FIG. 7D illustrates a block diagram of generating one or more compiler instructions for each of the assignment statements within the code according to some embodiments.

FIG. 7G illustrates the generation of an exemplary bit file for the addresses described in the previous FIG. 7F according to some embodiments.

FIG. 7H illustrates an uncompressed bit file and a corresponding minimized bit file according to some embodiments.

FIG. 12 illustrates a procedure for breaking down a selected statement stack into a plurality of instructions if necessary according to some embodiments.

FIGS. 15A, 15B and 15C illustrate exemplary instruction tables and an associated instruction table block according to some embodiments.

FIG. 18 illustrates a method of mapping relocatable instructions according to some embodiments.

FIG. 19 illustrates a detailed method of an inclusivity phase of combining instruction table lines according to some embodiments.

FIG. 20 illustrates a detailed method of the step of determining and selecting one of the most inclusivity compatible instruction table lines according to some embodiments.

FIG. 21 illustrates a detailed method of the step of calculating the Hash or compatibility value of a pair according to some embodiments.

FIG. 22 illustrates a set of exemplary changes to the code path matrix during two iterations of the block/instruction combination process according to some embodiments.

FIG. 24 illustrates a detailed method of an exclusivity phase of combining instruction table lines according to some embodiments.

FIG. 25 illustrates a detailed method of the step of determining and selecting one of the most exclusivity compatible instruction table lines according to some embodiments.

Figure 1:
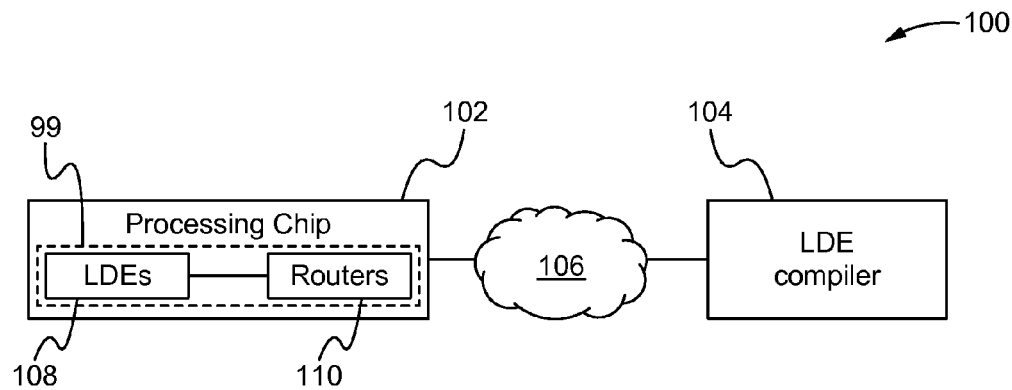
FIG. 1 illustrates a processing system including a compiler according to some embodiments.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments are directed to a lookup and decision engine (LDE) compiler for use with a matrix of on-chip routers interconnecting a plurality of lookup and decision engines (LDEs) located on, for example, an application-specific integrated circuit (ASIC). In particular, the ASIC is able to be a low latency software-defined network processing and/or switching microchip. Using a plurality of modules, the LDE compiler is able to break down a source code to determine all of the unique assignments within the code as well as all the conditions of the code, which are both then able to be stored in tables for later reference. Further, the modules are able to pair sets of assignments with sets of conditions of the code that must be satisfied for those assignments to be executed until all possible condition paths of the code are determined. Based on this data, the conditional logic and corresponding assignments are able to be simplified, combined and/or compressed such that as little data as possible is able to represent all permutations of the source code. Finally, these compressed permutations and/or associated assignments are able to be converted into an output file based on the configuration of the processing elements (e.g. multiplexers) on the LDE such that the LDE is able to perform the source code functionality when programmed with the output file. As a result, the LDE compiler is able to provide the benefit of translating, compressing and dynamically programming a source code into an output file that enables one or more LDEs to implement the program. In particular, by fleshing out all the permutations of a source code and then compressing fleshed out conditions, the LDE compiler is able to minimize the amount of storage and processing elements needed to implement the code. This is in contrast to a traditional compiler that merely provides a one to one translation from source to object code.

FIG. 1 illustrates a processing system 100 including a compiler according to some embodiments. As shown in FIG. 1, the processing system 100 comprises a computing device or processing microchip 102 communicatively and/or electrically coupled over a network 106 with a lookup and decision engine (LDE) compiler 104. As also shown in FIG. 1, the processing microchip 102 comprises a processing network 99 formed by one or more lookup and decision engines (LDEs) 108 communicatively and/or electrically coupled with one or more on-chip routers 110. In some embodiments, the network 106 is a wired network. Alternatively, the network 106 is able to be one or a combination of wired and wireless networks. The processing microchip 102 is able to be a software defined network (SDN) chip. For example, the microchip 102 is able to be a switch microchip for a data center top of rack switch. Alternatively, the processing microchip 102 is able to be any application specific integrated circuit (ASIC) chip, general purpose microchip or other types of processing microchip known in the art.

In some embodiments, the LDE compiler 102 is stored on a memory within the microchip 102 such that the network 106 is an internal network of the microchip 102 and the compiler 104 is integrated into the memory of the microchip 102. Alternatively, the LDE compiler 104 is able to be stored on a memory external from the microchip 102 such that the network 106 is an external network coupled between the memory and one or more of the I/O pins of the microchip 102. For example, the compiler 104 is able to be stored on a memory, wherein the memory and the microchip 102 are physically coupled together, but are separate components of an integrated circuit. As another example, the compiler is able to be stored on a memory of a server or other type of computing device remote from the microchip 102, wherein the LDE compiler 104 is a downloadable and/or remotely executable application or website on the server and/or a downloadable application on a computer that is able to be locally executed and the output downloaded onto the microchip 102. As a result, the LDE compiler 104 is able to convert, compress and otherwise manipulate a source code 98 (see FIG. 6) such that the resulting file is able to be used to implement the functionality of the source code 98 on the processing microchip 102 and specifically the LDEs 108 within the processing network 99. Although as shown in FIG. 1, a single LDE compiler 104 is coupled to a single processing microchip 102, it is understood that the system 100 is able to comprise any number of LDE compilers 104 coupled to any number of processing chips 102.

Figure 2:
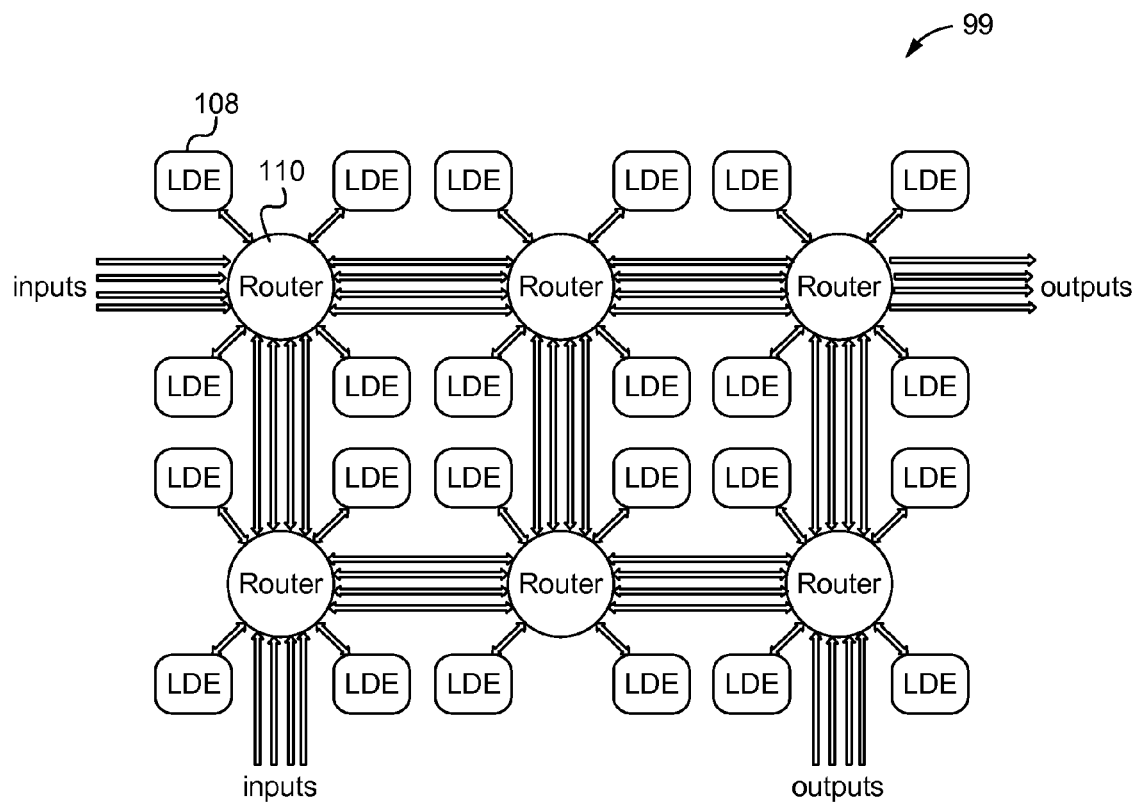
FIG. 2 illustrates a block diagram of the processing network of the configurable on-chip routers and LDEs according to some embodiments.

FIG. 2 illustrates a block diagram of the processing network 99 of the configurable on-chip routers 110 and LDEs 110 according to some embodiments. As shown in FIG. 2, each on-chip router 110 is coupled with four LDEs 108. However, an on-chip router 110 is able to couple with more or less LDEs 108 depending on application requirements, such as an area budget of the on-chip router. Each on-chip router 110 is also able to be coupled with other on-chip routers 110 to form the network 99. Although FIG. 2 illustrates each on-chip router 110 connecting to four nearest-neighboring on-chip routers 110 to form a 2-D mesh network, the number of nearest-neighboring on-chip routers coupled with an on-chip router 110 is able to be different for supporting different network topologies. For example, a 2-D mesh network can be upgraded to a 3-D mesh network by coupling each on-chip router 110 on a middle layer with nearest routers 110 on a top and/or bottom layer in a 3-D through-silicon-via based IC technology. As a result, the network 99 is flexible and easily scalable as the number of lookup and decision engines can change. To support a larger number of LDEs 108 on a microchip 102, each on-chip router 110 is able to be coupled with more LDEs 108, additional on-chip routers 100 are able to be added to the network 99, or both.

To reduce data congestion in the network 99 at router-to-router links, a router-to-router link is able to be wider than a router-to-LDE link. As illustrated in FIG. 2, router-to-router links are four times wider than router-to-LDE links so that each router-to-router link can carry four data packets in parallel. Alternatively, instead of using wider links, each router-to-router link can be multiple parallel lanes wherein each lane is independent. LDEs 108 inside the network 99 are able to communicate with other engines/blocks outside the network 99 through input and output ports of the on-chip routers 110 at the edge of the network 99 as illustrated in FIG. 2. This configuration eases the wiring physical layout for the network 99 in the microchip 102. Each on-chip router 110 receives input data packets from input ports and forwards these data packets to correct output ports. Rather than using a deterministic routing algorithm at the on-chip routers 110, each on-chip router 110 in the network 99 is equipped with configurable routing tables, which can be reprogrammable by software for adapting to network topology or addressing changes, for avoiding deadlock, and/or for reducing contention at output ports. Similarly, each of the LDEs 108 are able to comprise one or more configuration registers that enable to LDEs 108 to be programmable or reprogrammable such that they implement the functionality of a desired source code 98.

In other words, the LDEs 108 enable the microchip 102 to perform any desired processing program or source code 98 by simply adjusting the programming of the LDEs 108 based on the processing program. Thus, the LDEs 108 and their programmable nature provide the advantage of a flexible microchip 102 processing architecture that is able to efficiently implement multiple different functions described by different source codes/processing programs 98. In some embodiments, the LDEs 108 are able to be substantially similar to the processing engines described in U.S. patent application Ser. No. 14/144,260, entitled METHOD AND APPARATUS FOR PARALLEL AND CONDITIONAL DATA MANIPULATION IN A SOFTWARE-DEFINED NETWORK PROCESSING ENGINE, filed Dec. 20, 2013, which is hereby incorporated by reference. Alternatively, the LDEs 108 are able to be other types of programmable processing elements or engines known in the art.

Figure 3:
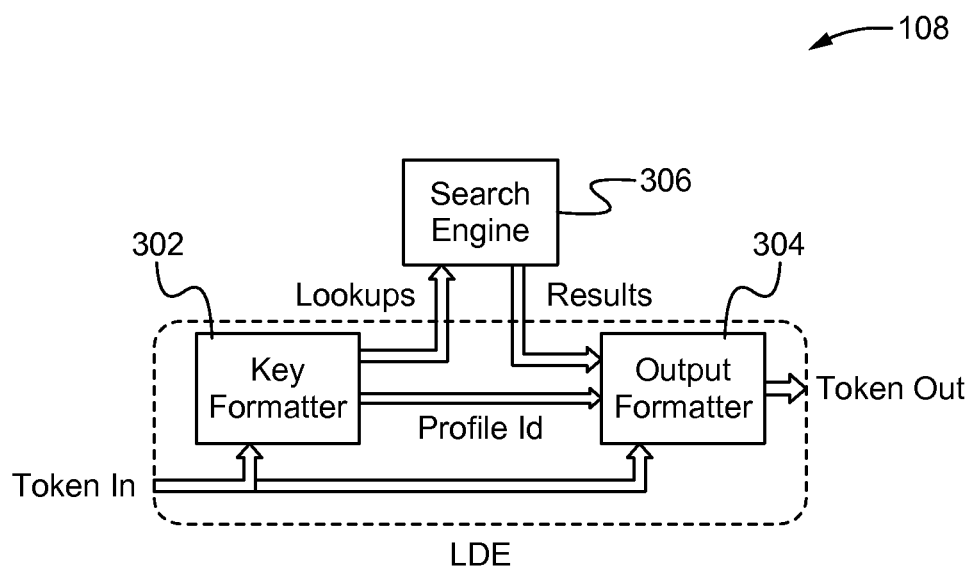
FIG. 3 illustrates an LDE according to some embodiments.

FIG. 3 illustrates an LDE 108 according to some embodiments. As shown in FIG. 3, the LDE 108 comprises a key formatter 302 and an output formatter 304. The key formatter 302 comprises several input wires that input an entire packet token, and several output wires that lead to a search engine 306 and the output formatter 304. The function of the key formatter 302 is to inspect the incoming data on the input wires, select a search profile ID depending on the combination of values of the various input fields of the incoming data, and format the output lines by copying various fields from the input to the output lines (e.g. to the search engine 306 elsewhere on the microchip 102, to the output formatter 304) as dictated by the search profile ID selected. Similarly, the output formatter 304 comprises several input wires that input the entire packet token (plus the selected search profile ID and the results of the search engine lookups), and several output wires to send the token out. The function of the output formatter 304 is to inspect the incoming data and depending on the combination of the values of the various fields, modify the outgoing token by copying various fields from the input to the token.

Figure 4:
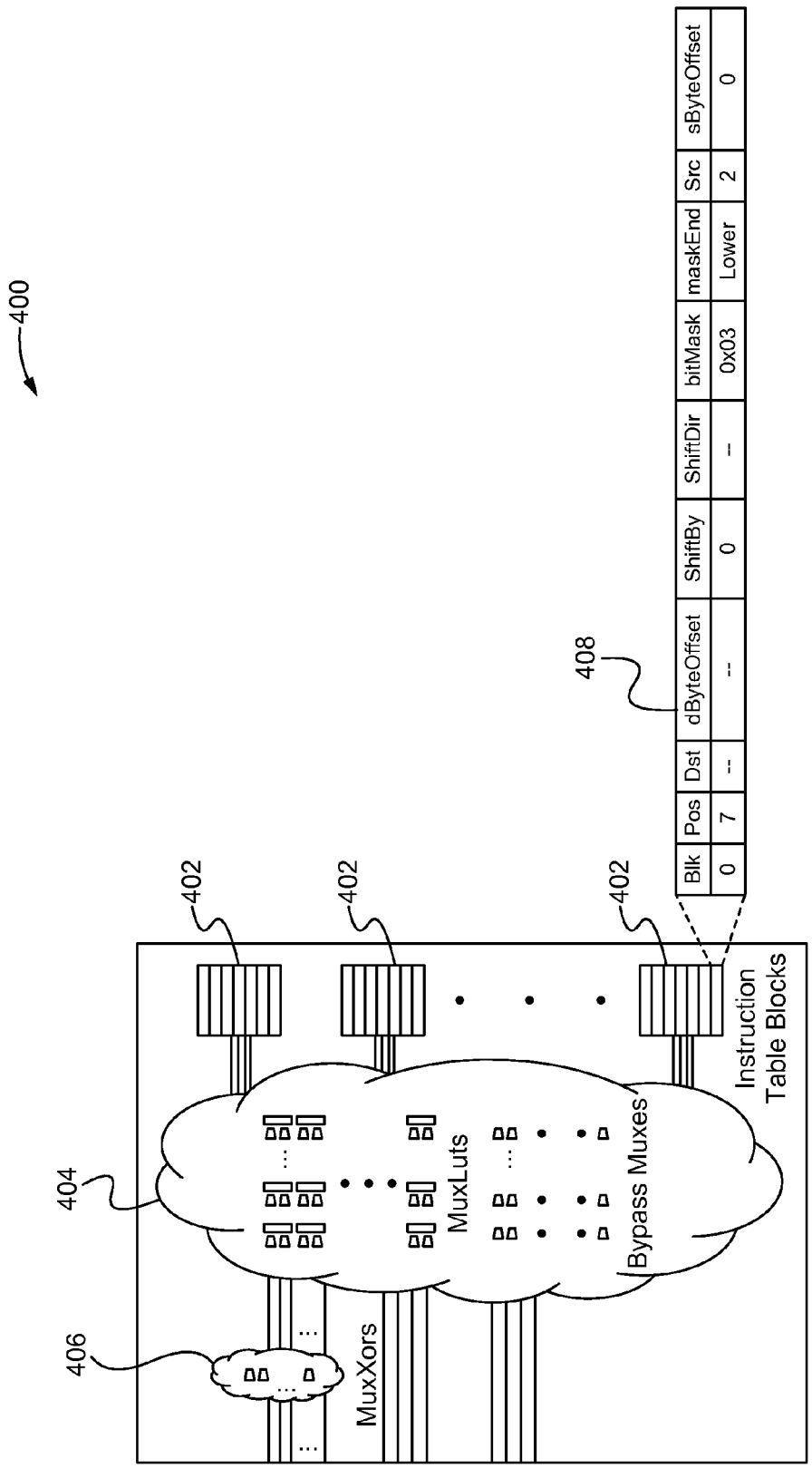
FIG. 4 illustrates a formatter (key or output) according to some embodiments.

FIG. 4 illustrates a formatter (key or output) 400 according to some embodiments. In particular, key formatters 302 and output formatters 304 are able to both comprise substantially similar components with the differences being in scale and organization. Thus, the specifics of the differences have been omitted herein for the sake of brevity and the similarities shown as the formatter 400. As shown in FIG. 4, the formatter 400 comprises one or more blocks of an instruction table 402, a logic cloud 404 and MuxXor cloud 406 all communicatively coupled together. Alternatively, the MuxXor cloud 406 is able to be omitted, for example, in the case of the key formatter 302. The instruction table blocks 402 together make up the instruction table and are each able to store a plurality of instructions 408 including data about the instruction separated into predetermined fields that enables one or more instructions or actions to be performed. For example, each of the instructions 408 are able to store data which indicate bits that are to be copied from a source location or address to a destination location or address. The instruction table is able to comprise any number of blocks 402 depending on the memory available on the microchip 102 for the LDE 108.

Figure 5A:
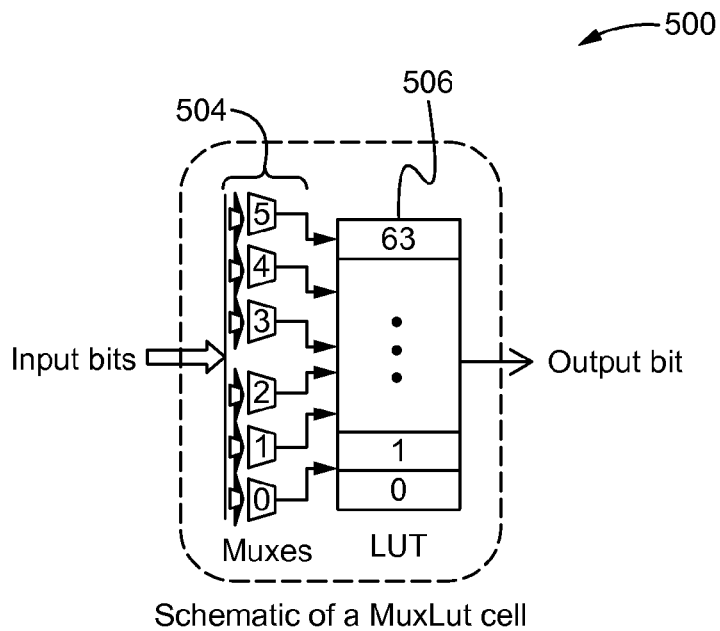
FIG. 5A illustrates a MuxLut cell according to some embodiments.
Figure 5B:
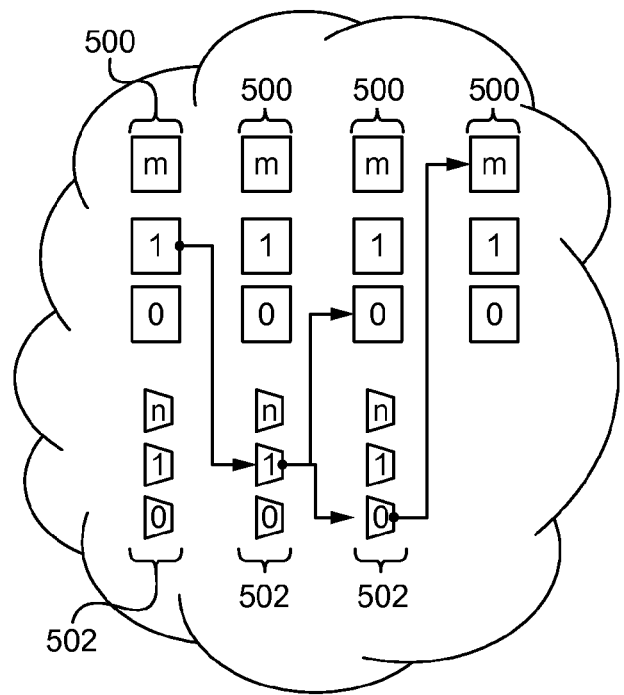
FIG. 5B illustrates a logic cloud according to some embodiments.

The logic cloud 404 is able to input a subset of the input (e.g. token) of the entire LDE 108, and after manipulating the input data, output the result as addresses into one or more of the instruction table blocks 402, wherein the values of the addresses determine which instruction or instructions are selected from each block 402 for execution. In order to provide this functionality, the logic cloud 404 is able to comprise a two dimensional array of multiplexor lookup table (MuxLut) cells 500 and a two dimensional array of bypass multiplexors (BypassMuxes) 502 as shown in FIGS. 5A and 5B respectively. As shown in FIG. 5A, each MuxLut cell 500 comprises one or more multiplexors 504 coupled with at least one lookup table 506 whose size is able to be based on the number of multiplexors 504. For example, if there are six multiplexors 504, the lookup table 506 is able to be 2^6 or 64 bits long such that table 506 is able to have a separate value for every possible combination of multiplexor values. Alternatively, more or less multiplexors 504 are able to make up each cell 500, wherein the lookup table 504 is equal to, greater than, or less than the maximum number of combinations of values produced by the number of multiplexors 504.

In operation, each multiplexor 504 is able to select one bit received on its input lines wherein the set of bits (e.g. 6 bits) chosen by the multiplexors 504 together forms an address that is fed into the lookup table 506. Then, from all of the bits (e.g. 64 bits) stored in the lookup table 506, the lookup table 506 outputs the bit at the index selected or indicated by the binary address. As a result, the cells 500 are able to implement any N-input binary logic function of any N of the input bits (where N is the number of multiplexors 504 in the cell 500) by programming values into the multiplexors 504 and lookup table 506 that correspond to the desired binary logic function. Accordingly, the LDE compiler 104 is necessary in order to provide the required programming values to the cells 500 to implement the desired logic functions that make up a desired source code input program 98.

As shown in FIG. 5B, each BypassMux 502 is coupled to the output of one or more of the cells 500 such that the BypassMux 502 is able to select one bit from its input bits (e.g. output values from cells 500) and pass that value to a different column or stage of cells 500 within the two dimensional matrix (e.g. grid) and/or a different column or stage of two-dimensional matrix of the BypassMuxes 502. In particular, the BypassMuxes 502 enable columns of the matrix of cells 500 to be skipped via the a column of the BypassMuxes 502 as necessary to pass output values as required as input to other columns within the cell 500 matrix. For example, as shown in FIG. 5B, the middle BypassMux 502 receives the output from a cell 500 of the previous column and passes that value to a BypassMux 502 in the next column as well as to cell 500 in that next column. In some embodiments, there is one BypassMux 502 for each column of cells 500. Alternatively, there are able to be any number of BypassMuxes 502 for each column of cells 500 such that multiple values from a column are able to be passed simultaneously by the BypassMuxes 502 associated with the column.

Figure 5C:
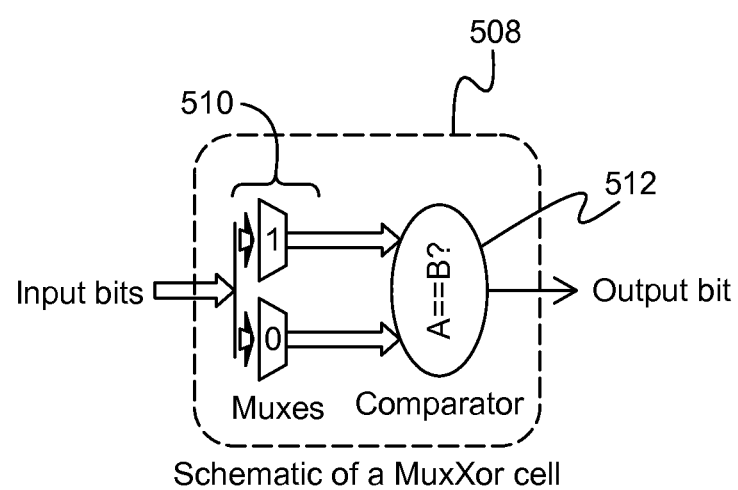
FIG. 5C illustrates a MuxXor cell according to some embodiments.

The MuxXor cloud 406 is able to comprise a single dimension array of MuxXor cells 508, wherein as shown in FIG. 5C, each MuxXor cell 508 comprises one or more multiplexors 510 coupled with a comparator 512. For example, the cloud 406 is able to comprise a column of eight cells 508. Alternatively, the MuxXor cloud 406 is able to comprise more or less cells 508 arranged in a single or multiple columns having one or more rows. In operation, the MuxXor cloud 406 inputs a subset of the input of the whole LDE 108 and each MuxXor cell 508 selects a pair of 16-bits (or other size bits) from the multiplexor inputs 510 and compares the pair with the comparator 512. If both of the 16-bit (or other size bit) sections compared have the same value, the comparator 512 (and cell 508) outputs a 1, otherwise the comparator 512 (and cell 508) outputs a zero. This output of the cells 508 is then fed as input (e.g. primary inputs) to the logic cloud 404 for use in the logic cloud 404 processing.

Figure 6:
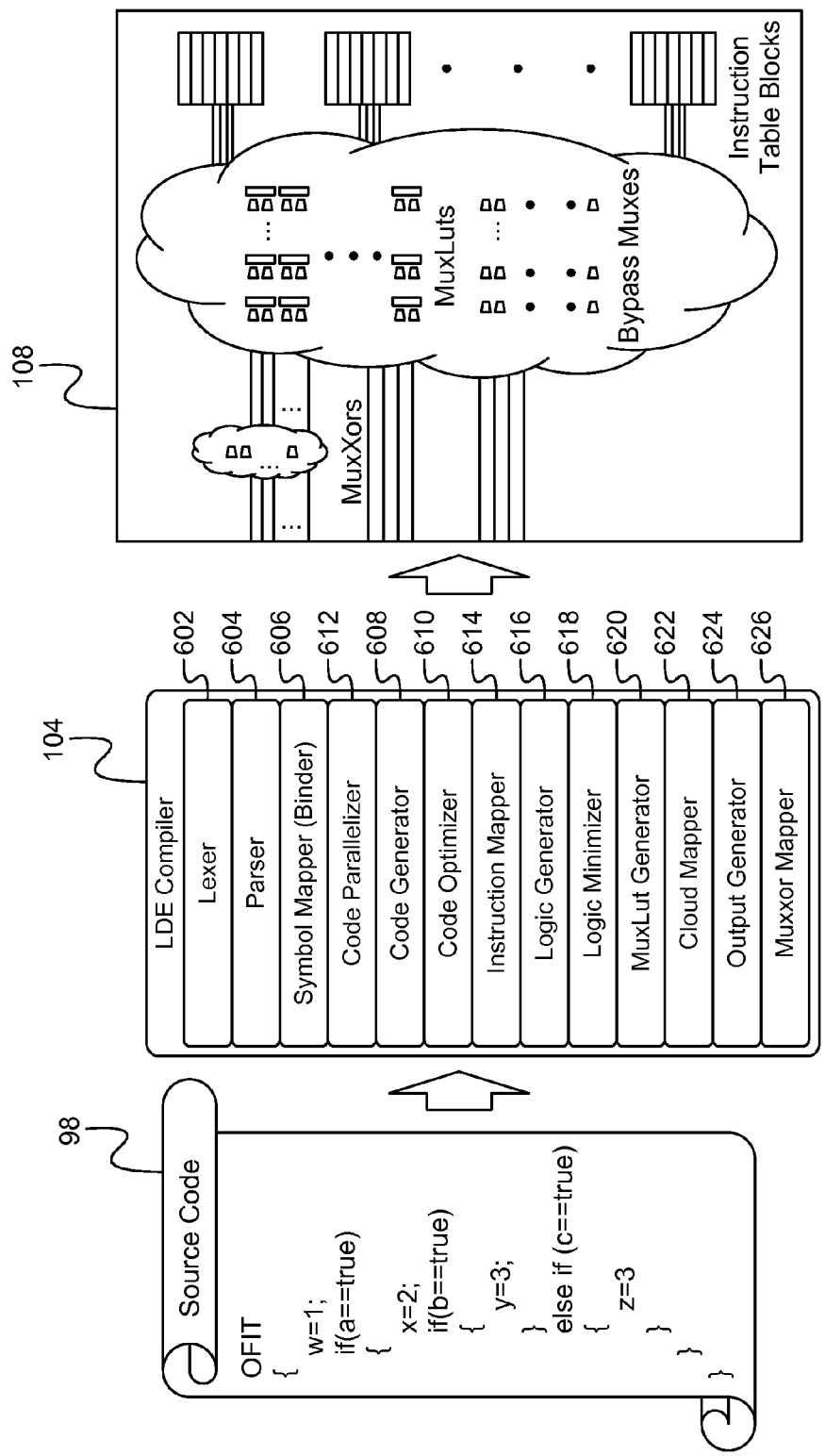
FIG. 6 illustrates a block diagram of the LDE compiler according to some embodiments.

FIG. 6 illustrates a block diagram of the LDE compiler 104 according to some embodiments. As shown in FIG. 6, the LDE compiler 104 comprises a plurality of modules 602-626 that together input a source code 98 and convert that code 98 to an output file that programmed into one or more LDEs 108 in order to cause the LDEs 108 to implement the functionality of the source code 98. Specifically, the compiler 104 is able to use the source code 98 to define search engine profiles, search engine tables, lookup keys, and token fields that are able to be referenced by the code 98. These definitions are then able to be used by the compiler 104 to build a symbol table, described in detail below, in which symbol variables of the code 98 are translated to wires that represent the symbols. Further, the compiler 104 enables the definition of macros at the basic level of text substitution in the source code 98, which allows a user to define shorter names in the place of their longer original names. Thus, generally speaking the compiler 104 provides the benefit of being able to input and interpret source code 98, and based on this source code 98 generate values for the instruction table blocks 402, the multiplexors 502, 504, 510, the lookup tables 506 and/or the comparators 512 such that these values make this hardware of the LDEs 108 implement the functionality expressed in the source code 98. It should be noted that in some embodiments one or more of the modules are able to be omitted.

Lexer and Parser Modules

Figure 7A:
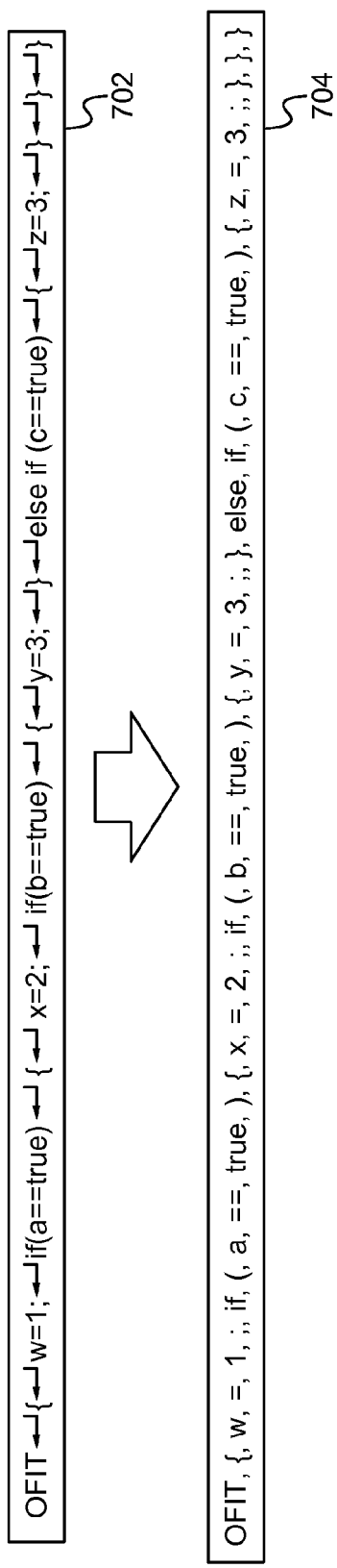
FIG. 7A illustrates an exemplary input character string and a corresponding exemplary output stream of tokens according to some embodiments.
Figure 7B:
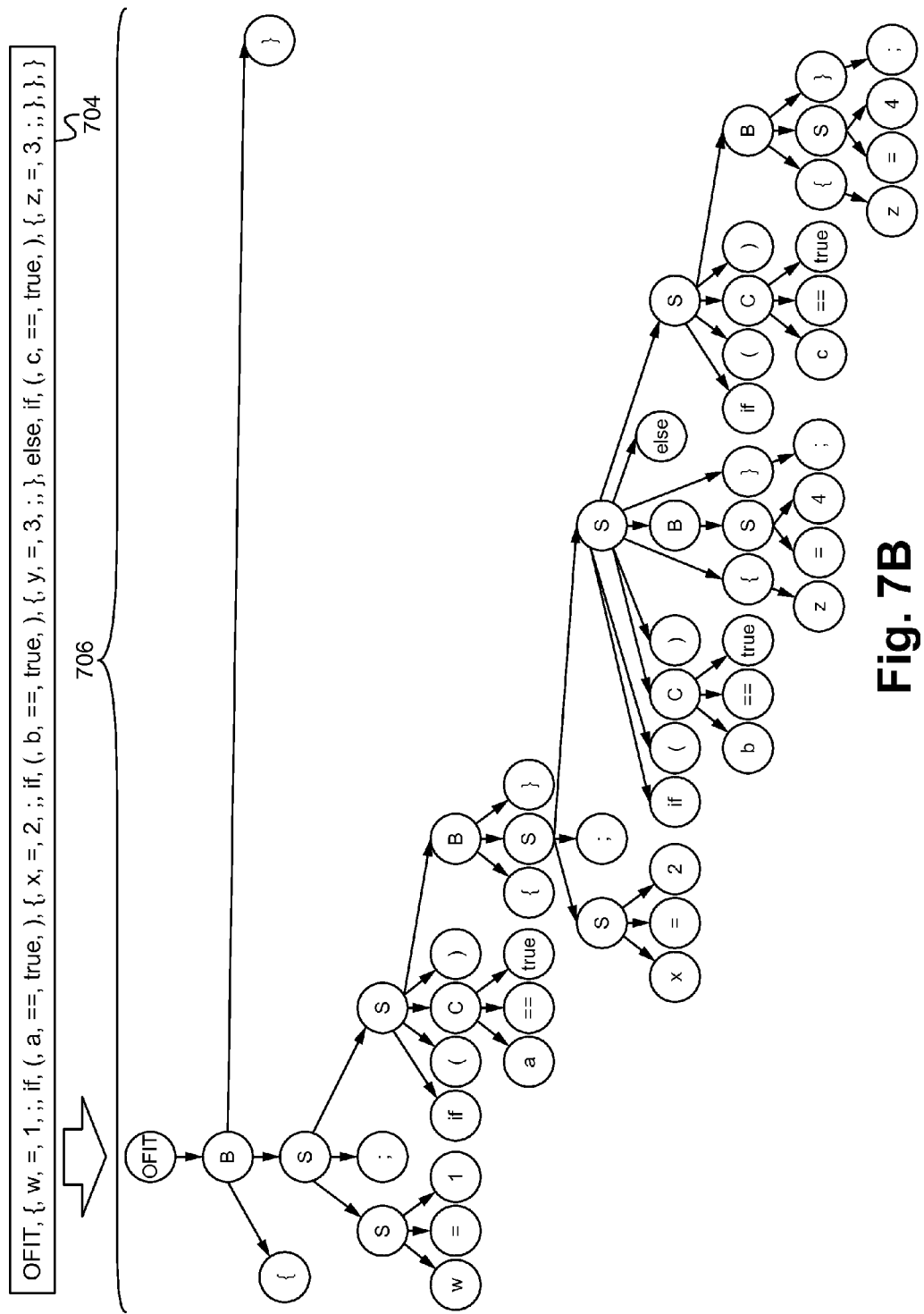
FIG. 7B illustrates an exemplary parse tree according to some embodiments.

The lexer module 602 of the LDE compiler 104 provides the function of converting input or source code 2898, which are generally in the form of a character string, into a stream of tokens by grouping characters together and eliminating spaces between characters. FIG. 7A illustrates an exemplary input character string 702 input by the lexer module 602 and a corresponding exemplary output stream of tokens 704. The parser module 604 provides the function of analyzing input/source code 2898 for syntactic correctness and/or that the code 2898 conforms to the grammar rules specified for the language of the code 2898. As shown in FIG. 7B, the parser module 604 provides this functionality by creating a parse tree 706 from the token stream 704 produced by the lexer 602. The parse tree 706 is configured such that the code 2898 is arranged in terms of logical units with a strict hierarchy imposed on it.

Figure 9:
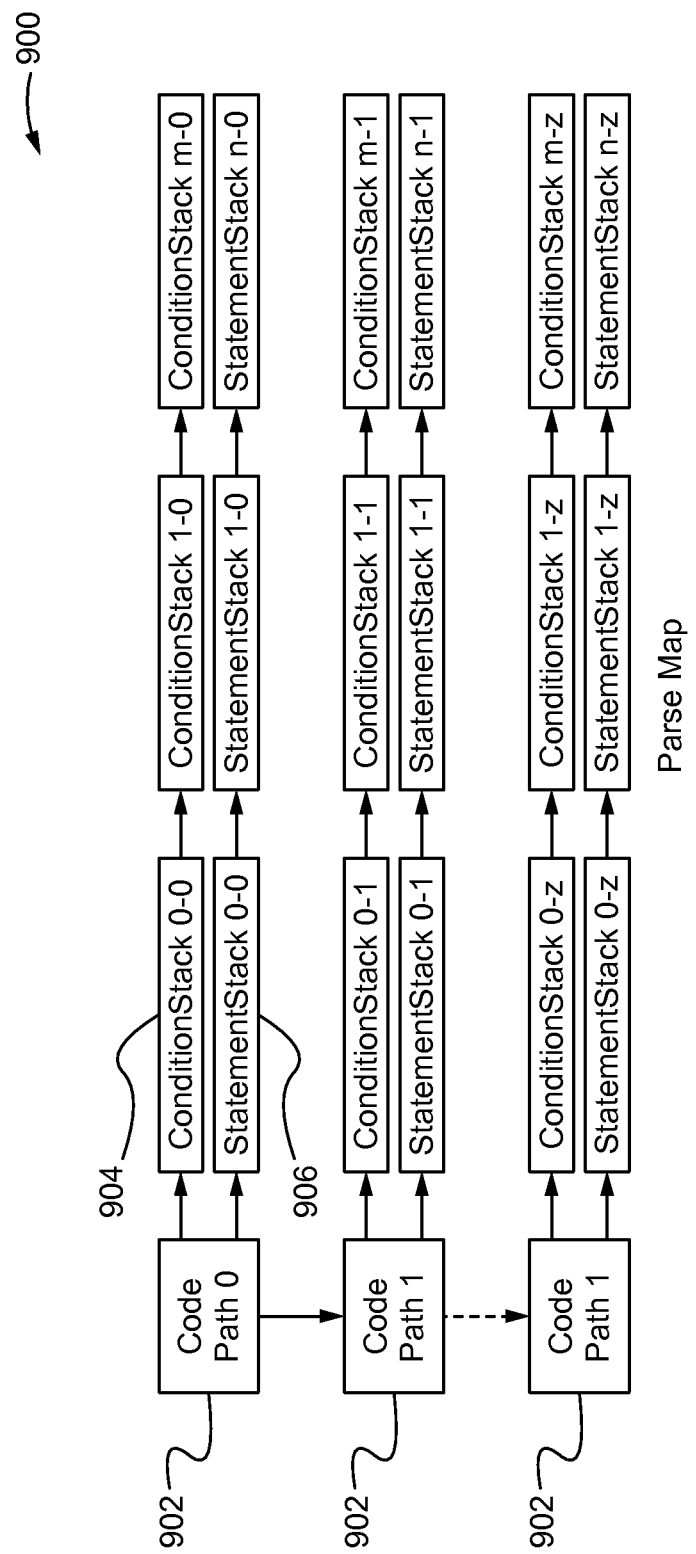
FIG. 9 illustrates a block diagram of a parse map according to some embodiments.

In some embodiments, the parser module 604 also provides the function of creating a parse map 900 as illustrated in FIG. 9 based on source code 2898 and/or parse tree 706. As shown in FIG. 9, the parse map 900 comprises an array wherein each row 902 of the array is associated with one of the possible code paths of the source code 2898 followed by a list of condition and statement stacks, 904, 906 that are included in the associated code path of that row 902. Each condition stack 904 represents a condition within the code 2898 and each statement stack 906 represents an assignment statement within the code 2898, wherein the conditions and assignment statements have been converted to a prefix notation in order to form the stacks 904, 906. Each of the stacks 904, 906 comprise one or more elements wherein each element is defined by a type/value pair. The types are able to be one of an operator, an identifier or an integer. For the operator type, the associated value is able to be one of a set of valid arithmetic logic unit (ALU) operators as are well known in the art or the assignment operator (e.g. "="). For the identifier type, the associated value is able to be an index into or location within the symbol databases 708, 710 (described below with reference to FIG. 7C). For the integer type, the associated value is able to be any integer value (e.g. a integer value that denotes an immediate operand). As a result, the list of condition stacks 904 of each row 902 are the conditions that must all be met in order for the code path of that row 902 to be executed. Similarly, the list of statement stacks 906 of each row 902 are the assignment statements that must all be executed if the code path of that row 902 (and its associated conditions) is executed.

As described above, a statement stack 906 represents an assignment statement in the code 2898 expressed in prefix notation. Exemplary, valid assignment statements of the code 2898 are shown below and are able to be in one of the following two formats:

1) LHS=RHS; (a three element stack) or
2) LHS=RHS1<AluOp> RHS2; (a five element stack)

where LHS, RHS, RHS1 and RHS2 are symbols or variables and "=" and "<AluOp>" are operators, wherein LHS is the left hand side symbol and RHS or RHS1 is the right hand side symbol of a first operator, and RHS2 is the right hand side of a second operator. Other larger element assignment statements are able to be broken down into stacks of 3 or 5 elements by the parser in order to create the parse map 900. Thus, the parser module 604 inputs some or all of the assignment statements within the code 2898 and converts them into the prefix notation for insertion into the parse map 900. For example, after the two assignment statements above are converted to prefix notation by the parser 604, the corresponding prefix stacks would be:

1) [=, LHS, RHS]; and
2) [=, LHS, AluOp, RHS1, RHS2].

In particular, in the prefix notation the operator is first, followed by the left side symbol and then the right side symbol, wherein this pattern is repeated for each operator. Accordingly, the parser module 604 is able to convert the conditions and/or assignment statements of the code 2898 into one or more condition and statement stacks 904, 906 (in a prefix notation format) and allocate the stacks 904, 906 within the parse map 900 array according to the code paths 902 with which they belong. This parse map 900 is then able to subsequently be used when generating instructions corresponding to the assignment statements.

Parser Module

Additionally, the parser module is able to comprise a preprocessor, an address space generator, one or more symbol databases and/or a database generator. The preprocessor inputs the source code 98 (e.g. an XPC file) and produces a preprocessed file. To achieve this, the preprocessor preprocesses/parses the source code 98 by looking for unconditional directives such as +include and +define. When the preprocessor reaches a +include, the preprocessor stops processing the source code 98 at that point and instead accesses and parses the file indicated by the +include. Once that file is fully parsed, including any nested +include directives, the preprocessor prepends/adds the fully parsed file to source code 98 where the +include was found and resumes parsing of the source code 98. At the same time, when the preprocessor reaches a +define, the preprocessor performs a find and replace of all the code matching the indicated +define. For example, the preprocessor, upon reaching +define ARRAY_LENGTH 20 within the source code 98, finds and replaces all instances of ARRAY_LENGTH with 20. As a result, the preprocessor is able to convert the source code 98 into a preprocessed source code.

The address space generator generates an address space comprising a plurality of dictionaries or tables that for each of a plurality of strings or symbols (e.g. found in the source code 98) defines one or more of a bit offset, a width, a block line and a block position where the data or instruction associated with the string is able to be found. Each of the dictionaries within the different address spaces are able to be dedicated to a different contextual use of the strings or symbols within the source code 98. As a result, the same string is able to be associated with different values in the different dictionaries of the different address spaces in order to reflect the contextual differences of each point in the source code 98 that the string is found. In some embodiments, a separate dictionary of a separate address space is able to be dedicated for the context of key formatter 302 control symbols/strings (e.g. within conditions of the code for the key formatter), for the context of key formatter 302 input data symbols/strings (e.g. symbols on the right hand side of the operator of assignments of the code for the key formatter), for the context of key formatter 302 output data symbols/strings (e.g. symbols on the left hand side of the operator of assignments of the code for the key formatter), for the context of output formatter 304 control symbols/ strings (e.g. within conditions of the code for the output formatter), for the context of output formatter 304 input data symbols/strings (e.g. symbols on the right hand side of the operator of assignments of the code for the output formatter), for the context of output formatter 304 output data symbols/strings (e.g. symbols on the left hand side of the operator of assignments of the code for the output formatter) and/or for the context of output formatter 304 MuxXor data symbols/strings (e.g. within explicitly called MuxXor assignments of the code for the output formatter and the MuxXor cloud). In some embodiments, the address space generator inputs an XML file and outputs a java package describing the address spaces.

The symbol databases store information about each of the symbols within the source code 98 such that the symbols are able to be understood and properly manipulated. The symbol databases are able to comprise a per construct database and a per address space database. The per construct database is able to be organized by the hierarchy of a database containing one or more database objects containing one or more database object factories. The per address space database is able to be divided into the dictionaries described above. In particular, it is able to comprise a key formatter 302 control symbols/strings database, a key formatter 302 input data symbols/strings database, a key formatter 302 output data symbols/strings database, an output formatter 304 control symbols/strings database, an output formatter 304 input data symbols/strings database an output formatter 304 output data symbols/strings database and/or an output formatter 304 MuxXor data symbols/strings database. In operation, during a definition phase where all constructs are able to be assumed as defined, as the source code 98 is parsed for definitions, the per construct database is populated by the database generator with each definition and the associated content (e.g. TABLE { . . . }) as object factories, objects and databases. During a clause phase, as the source code 98 is parsed for clauses (e.g. within the constructs or definitions), the per address space database is populated by the database generator with the symbols or strings of the code and the data associated with the symbol or string. In particular, the context indicated by the clauses of the code associated with each symbol is used to determine which of the instruction tables of the per address space database to which the symbol belongs. For example, if the clauses indicate that the symbol is a part of an assignment and on the right hand side of the operator of the assignment in the source code 98 (or the RHS value as reorganized in a prefix stack notation as described above), it is able to be added to the key formatter 302 input data symbols/strings database/dictionary. In some embodiments, if one or more of the symbols are not used, they are able to be omitted from the symbol databases. In some embodiments, the per address space databases are able to be the symbol databases 708, 710 (described in the associated texts in relation to FIG. 7C).

Figures 28A, 28B:
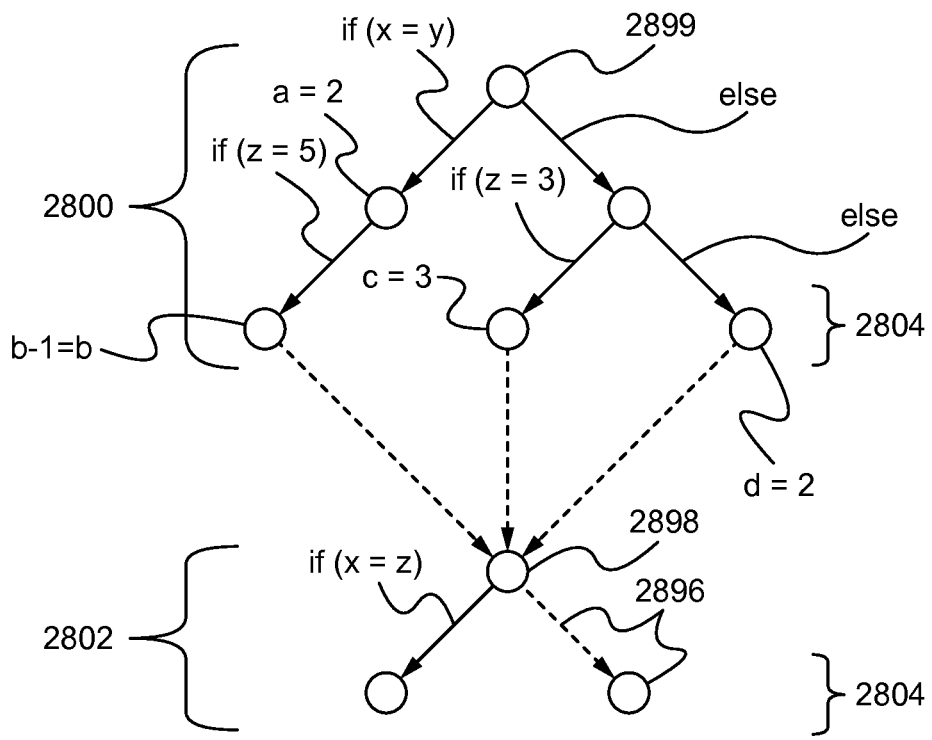
FIGS. 28A and 28B illustrate an exemplary source code having two clauses and the associated control tree respectively, according to some embodiments.

As described above, the database generator generates the definition/construct databases and the clause/address space/ symbol databases. Additionally, the database generator is able to generate a control tree, which is a representation of all of the possible code paths through the source code 98 including representations of each of the conditions and/or assignments associated with each code path. The conditions (e.g. if, else, else if) are turned into branches of the tree and the assignments (e.g. x=5; x=y) associated with the conditions are the nodes between the branches. FIGS. 28A and 28B illustrate an exemplary source code 98 having two clauses 2800, 2802 and the associated control tree respectively, according to some embodiments. In order to create the control trees, the database generator walks or parses through the source code 98 and adds nodes and/or branches as they are traversed within the code. After a starting dummy node 2899, for each clause 2800, 2802, the generator determines all the first level conditions and adds them as branches leading to new nodes (including any associated assignments) wherein any nested conditions are added as further sub-branches from the new nodes until each branch of the clause 2800 terminates with an associated assignment as the bottom node 2804 for that path of branches and nodes. In particular, this addition of sub-nodes is able to continue until all of the nesting 2897 of the clause 2800 (e.g. via sub-clauses) has been incorporated into the control tree for that clause 2800.

Once a clause 2800 has been traversed/parsed such that all of the bottom nodes 2804 for that clause 2800 have been determined, the database generator determines if there is a next clause 2802, and if so, if the next clause 2802 is a clause that is serial to the current clause 2800. In order to make this determination, the database generator is able to maintain a stack of conditions parsed and based on the conditions determine if the next clause is a further nesting clause 2897 or a serial clause 2802. In particular, by monitoring (e.g via flags) whether the preceding clause (or "if" condition) has been exited or not (e.g. by an "else" condition), the generator is able to determine that the subsequent clause is nesting (e.g. the previous clause/if has not been exited) or the subsequent clause is serial (e.g. the previous clause/if has been exited). In the same manner, nesting is able to be determined based on whether a previous condition of the previous clause has been exited (e.g. no nesting) or has not been exited (e.g. further nesting occurring). Thus, the database generator is able to determine whether each clause/ condition (e.g. if, else if, else) is serial or nesting and thereby accurately create the control tree(s).

If after the clause 2800 has been parsed and it is determined that there is a subsequent serial clause 2802, the dummy node 2898 for that serial clause 2802 is associated with each of the bottom nodes 2804 for the previous clause 2800 such that all of the bottom nodes 2804 couple to the dummy node 2898 for the serial clause 2802. As a result, this coupling is able to represent the code path of each of the bottom nodes 2804 separately continuing to the serial clause 2802 and its nodes and branches. In other words, a serial clause 2802 (which will generally be a serial "if" within the code) is able to be a clause that is after, but on the same hierarchical level a previous clause 2800 within the source code 98. Thus, a nested clause 2897 is not serial to the clause it is nested within, but a clause after the nesting has been completed could be serial to the first clause 2800. Additionally, this coupling of all of the bottom nodes 2804 to the serial clause dummy node 2898 saves space by not duplicating the tree for the serial clause 2802 for each of the bottom nodes 2804 of the previous clause 2800. Further, the database generator utilizes the bottom node 2804 to dummy node 2898 coupling method for serial sub-clauses found within the nesting of top or other level clauses of the code.

In other words, for each serial clause for any nesting level within the code, a dummy node is able to be created which is coupled to each of the bottom nodes of the paths for the previous clause. Moreover, the database generator is able to be configured to add a branch and node for any implied "else" conditions 2896 where there is an "if" condition, but no explicit else branch and/or associated node. Alternatively, the implied conditions 2896 are able to omitted from the control tree, and instead only considered in the creation of the parse map 900 as described below.

Thus, the database generator is able to traverse some or all of the source code 98 in order to create the control trees. In some embodiments, the database generator creates a separate control tree for the sections of the code related to the key formatter and related to the output formatter as indicated by the source code 98. Alternatively, the control tree for the key formatter and the control tree for the output formatter are able to be considered a single larger control tree wherein the top node branches between the key formatter code and the output formatter code and separate control trees start from those nodes respectively. In some embodiments, the database generator is able to create the databases and control trees via a single pass through the code (e.g. via a single parse). Alternatively, multiple passes are able to be used.

Finally, the database generator is able to walk to generated control tree(s) and create the parse map 900 by identifying each code path 902 associated with each terminating node it reaches within the tree(s). These code paths 902 provide both the order within the conditions and/or assignments as well as the pairing between each condition and/or assignment for each code path 902. In particular, the implied conditions 2896 and their associated implied terminating nodes are able to be considered by the database generator in order to include all the possible code paths 902 of the source code 98. Once all of the possible paths have been walked and the associated conditions and assignments have been added to the parse map 900, the parser module 604 is able to output the control tree and the symbol database to the back end of the compiler for processing.

Symbol Mapper Module

The symbol mapper module 606 provides the function of building one or more symbol databases 708, 710 of symbols or variables found within the source code 98 along with data required by the LDE compiler 104 to associate each of the symbols with hardware and/or a location in a memory (e.g. of the microchip 102). In some embodiments, the data for each symbol comprises one or more of an identifier, a name, a type (e.g. input layer data whether the data is from a token or a search engine 306 result), a source, a bit offset into the layer (e.g. where the symbol starts within the data), a length of the symbol (e.g. in bits) and/or a block within the database, a position within the block. Alternatively, more or less types of data about the symbol are able to be included in the databases. FIG. 7C illustrates exemplary first and second databases 708, 710 according to some embodiments. As shown in FIG. 7C, the first database 708 is able to be a control path database that receives symbols from inside a condition of the code 98. In contrast, the second database 710 is able to be a data path database that receives symbols from assignment statements within the code 98. As a result, the LDE compiler 104 is able to reference the location and/or other information within the databases 708, 710 when necessary to get a value for a desired symbol.

Code Parallelizer Module

Figure 7E:
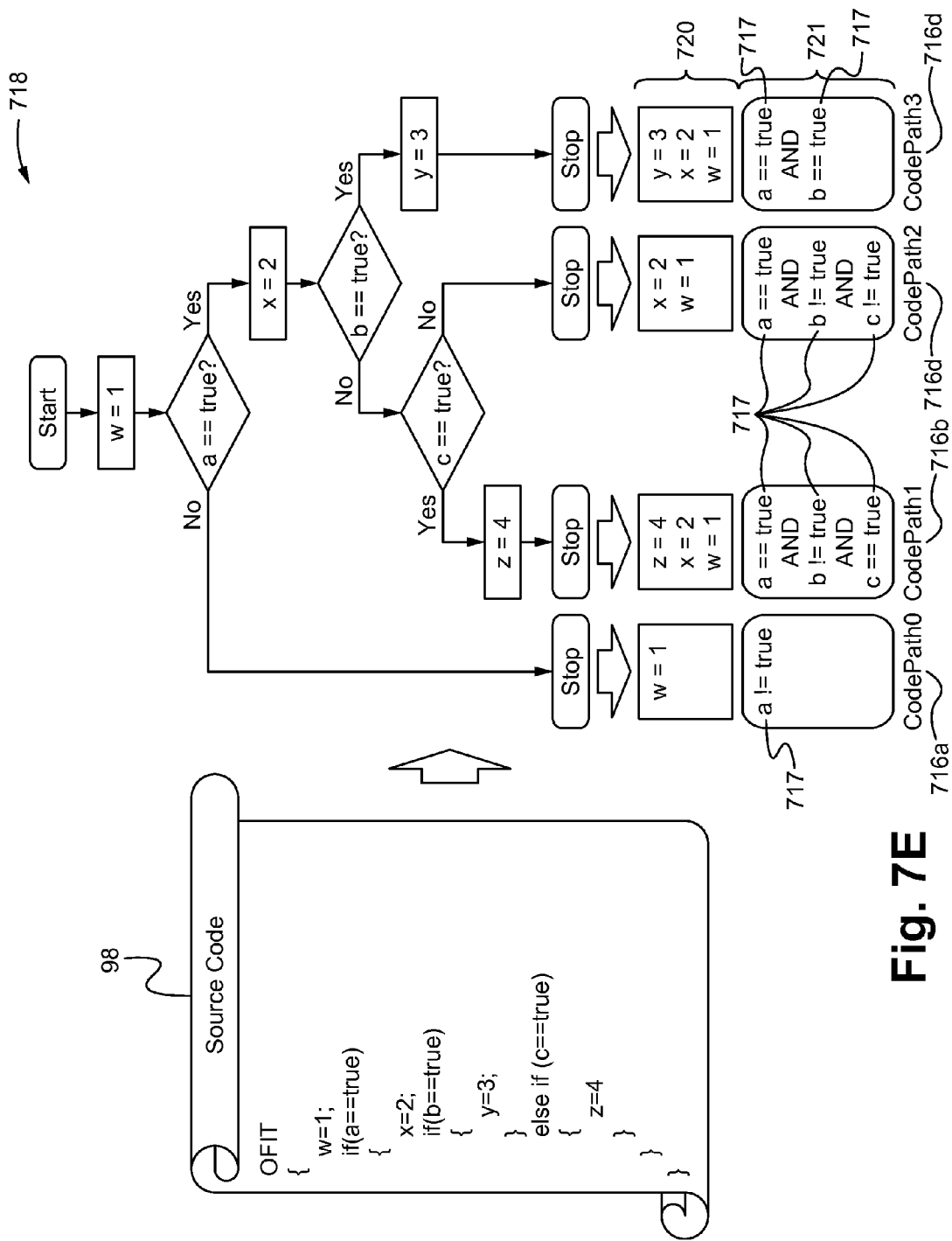
FIG. 7E illustrates visual indications of the possible logical paths through the source code and a corresponding flow chart according to some embodiments.

The code parallelizer module 612 provides the function of analyzing the code 98 and enumerates all the possible control paths or permutations 716 that can be taken when executing the input code 98. As a result, the paths 716 each comprise a set of condition statements 717 within the source code 98 that when satisfied result in the specified path 716. The condition statements 717 forming these paths 716 comprise sets 721 (with the conditions 717 being ANDed together via boolean logic) that are then each associated with the set of assignments 720 within the code 98 that would be executed if the associated path 716 where taken. The whole process resulting in pairs of condition sets 721 and assignment sets 720 for each code path 716. For example, FIG. 7E illustrates visual indications of the possible paths 716a-d through the source code 98 and a corresponding flow chart 718 according to some embodiments. As shown in FIG. 7E, for the exemplary source code 98, four paths 716 are possible in total, each path 716 being associated with a set or combination of values of input variables to the conditional clauses 717 that satisfy the clauses 717 and thereby cause that path 716 to be followed within the code 98. At the end of each path 716, the pairs of conditions 721 and assignment statements 720 that correspond to that path 716 are shown. Doing this allows the compiler 104 to build a set of all the possible parallel execution blocks (storing the assignment statements) and tag them with the condition sets 721 in the input that will lead to execution of those blocks.

Code Generator and Optimizer Modules

The code generator module 608 provides the function of generating one or more compiler instructions 408 for each of the assignment statements within the code 98. For example, based on the locations of the symbols as indicated in the data path database 710 (which includes all the symbols involved in assignment statements), the code generator module 608 is able to compute instruction value or values needed to cause the hardware of the LDEs 108 (e.g. logic cloud 404, MuxXor cloud 406) to implement each of the assignments. As shown in FIG. 7D, the generator 608 is able to take one of the assignment statements 712 from the code 98, and based on the corresponding entry 713 within the database 710, determine the location of the source (where the data/value should be read from on the memory) and the destination (where the resulting data/value should be written to on the memory), and then create a compiler instruction 408 that will cause the hardware to implement the functionality of the assignment 712. Essentially, the assignment statement 712 is converted to a format (e.g. block, position, length, destination byte offset, shift value, shift direction, bit mask, mask end, source, source byte offset) that can be implemented by the hardware of the LDE 108, wherein the symbols are replaced with memory locations (as indicated in the database 710) where the symbol values are stored. In some embodiments, the resulting set of compiler instructions 408 are then able to be minimized or optimized by a code optimizer module 610 in order to minimize the number of instructions used. Alternatively, the code optimizer module 610 is able to be omitted.

Figure 10:
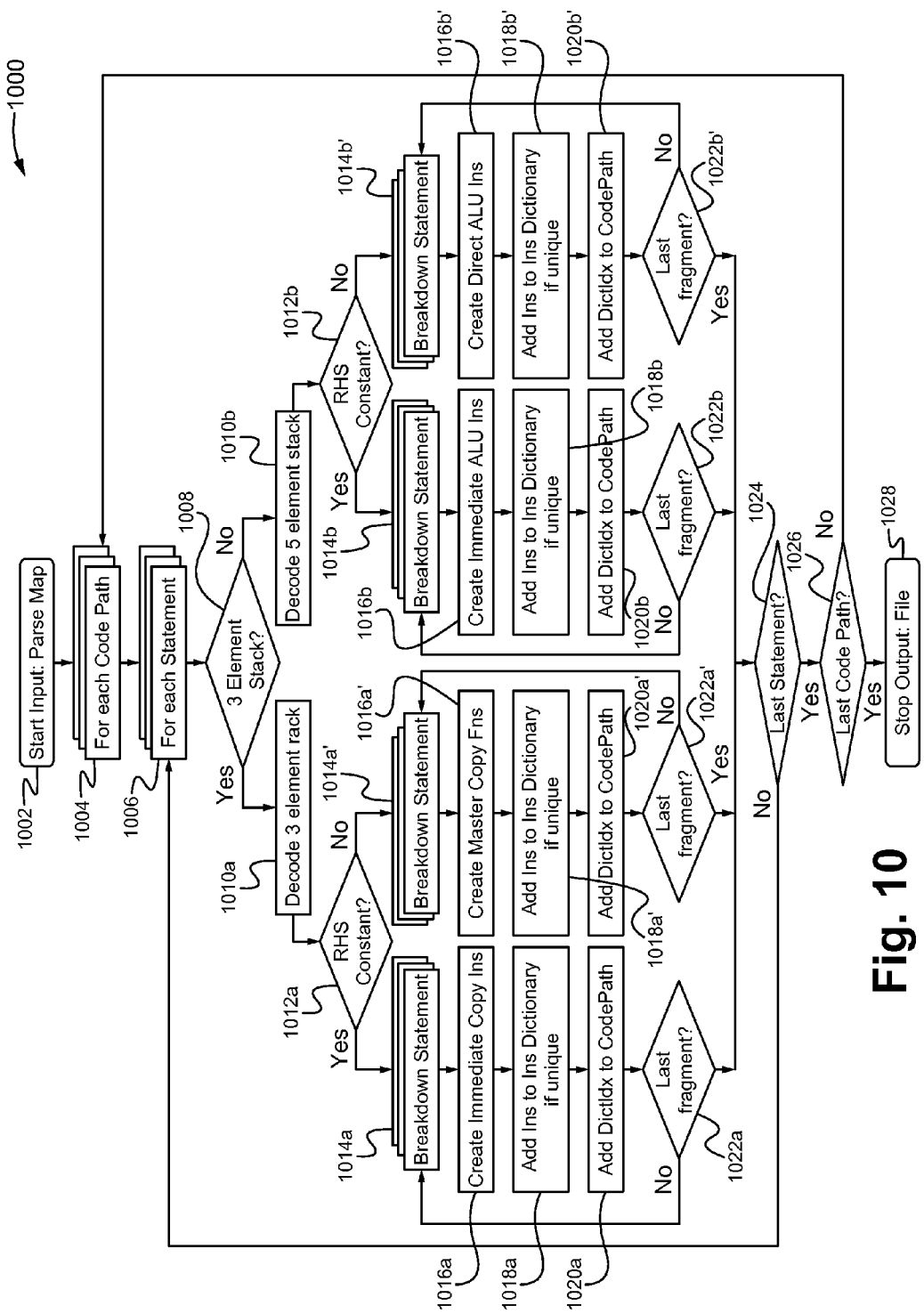
FIG. 10 illustrates a functional flow chart of the code generator module for creating the one or more compiler instructions according to some embodiments.

FIG. 10 illustrates a functional flow chart 1000 of the code generator module 608 for creating the one or more compiler instructions 408 according to some embodiments. As shown in FIG. 10, the code generator 608 inputs a parse map 900 for the code 98 at the step 1002. Based on the parse map 900, the code generator 608 selects the first or next code path or row 902 at the step 1004. Then based on the parse map 900, the code generator 608 selects the first or next statement stack 906 within the selected code path row 902 at the step 1006. Based on the selected statement stack 906, the code generator 608 determines if the statement stack 906 consists of three elements at the step 1008. If the code generator 608 determines that the statement stack 906 is a three element stack in step 1008, the code generator 608 decodes the three element stack at the step 1010*a*. Otherwise, the code generator 608 decodes the presumed five element stack at the step 1010*b*. Alternatively, the code generator 608 is able to check if the stack is a five element stack or otherwise at the step 1008.

Decoding the three or five element stacks at the steps 1010*a* or 1010*b* comprises verifying the format of the stack 906 and determining the sources, destinations and operations required by the assignment statement represented by the stack 906. Specifically, the code generator 608 is able to verify the format of the stack 906 by ensuring that the following requirements are met:
1) The number of elements within each stack must be either 3 or 5.
2) The first element of each stack must to be of type OPERATOR with a value of "=".
3) The second element (e.g. LHS) has to be of type IDENTIFIER, with a value of a valid symbol database 710.
4) The third element of a 3-element stack has to either be of type IDENTIFIER with a value of a valid Symbol Table index, or be of type INTEGER with a value of a valid integer.
5) The third element of a 5-element stack has to be of type OPERATOR with a value of a valid ALU operator.
6) The fourth element of a 5-element stack has to be of type IDENTIFIER, with a value of a valid Symbol Table index.
7) The fifth element of a 5-element stack has to either be of type IDENTIFIER with a value of a valid Symbol Table index, or be of type INTEGER with a value of a valid integer.

Alternatively, one or more of the above requirements are able to be omitted and/or one or more different requirements are able to be added to the verification process. In some embodiments, a violation of one or more of the verification requirements will cause the code generator 608 to quit the instruction generation process and produce an error message. Alternatively, a violation of one or more of the verification conditions will cause the code generator 608 to return the parse map 900 to the parser module 604 and/or a error module for fixing the detected violations.

The code generator 608 is able to determining the sources, destinations and operations required by the assignment statement represented by the stack 906 based on the elements within the prefix notation of the stack 906. Specifically, if the type is an integer, the code generator 608 is able to use the integer value indicated. If the type is an identifier, the code generator 608 is able to use the value (e.g. w, x or y) to determine the bits to fetch from the source and/or the location of the field to copy within the destination based on corresponding data for that value/symbol in the symbol database 710. If the type is operator, the code generator 608 is able to use the value to determine which ALU operation is required between the other non-operator elements. Thus, the code generator 608 is able to decode three element stacks in step 1010*a* and five element stacks in step 1010*b*.

Once a stack 906 is decoded in steps 1010*a* or 1010*b*, the code generator 608 determines if the right hand side (RHS) of the assignment statement represented by the stack 906 is a constant value (e.g. if the type is integer and the value is an integer value) at the corresponding steps 1012*a* or 1012*b*. The code generator 608 further determines if the assignment statement represented by the stack 906 is able to be implemented by a single instructions or instead needs to be broken down into a plurality of fragment instructions that together implement the assignment statement at the steps 1014*a*, 1014*a*', 1014*b* and 1014*b*' (see FIG. 12 described in detail below). If the code generator 608 determines that no breaking down is necessary, an instruction implementing the entire assignment statement is created and/or otherwise processed in the corresponding steps 1016-1020. Otherwise, a set of fragments determined at the corresponding step 1014 are individually created and/or otherwise processed in sequence (e.g. serially) in the corresponding steps 1016-1020. In some embodiments, the code generator 608 determines all the fragments necessary to implement the selected assignment stack 906 at the corresponding step 1014. Alternatively, the code generator 906 is able to determine the greatest size fragment that is able to be processed next without determining the size or number of the necessary subsequent fragments until the process returns to the corresponding step 1014 if necessary after the corresponding step 1022.

Figure 13:
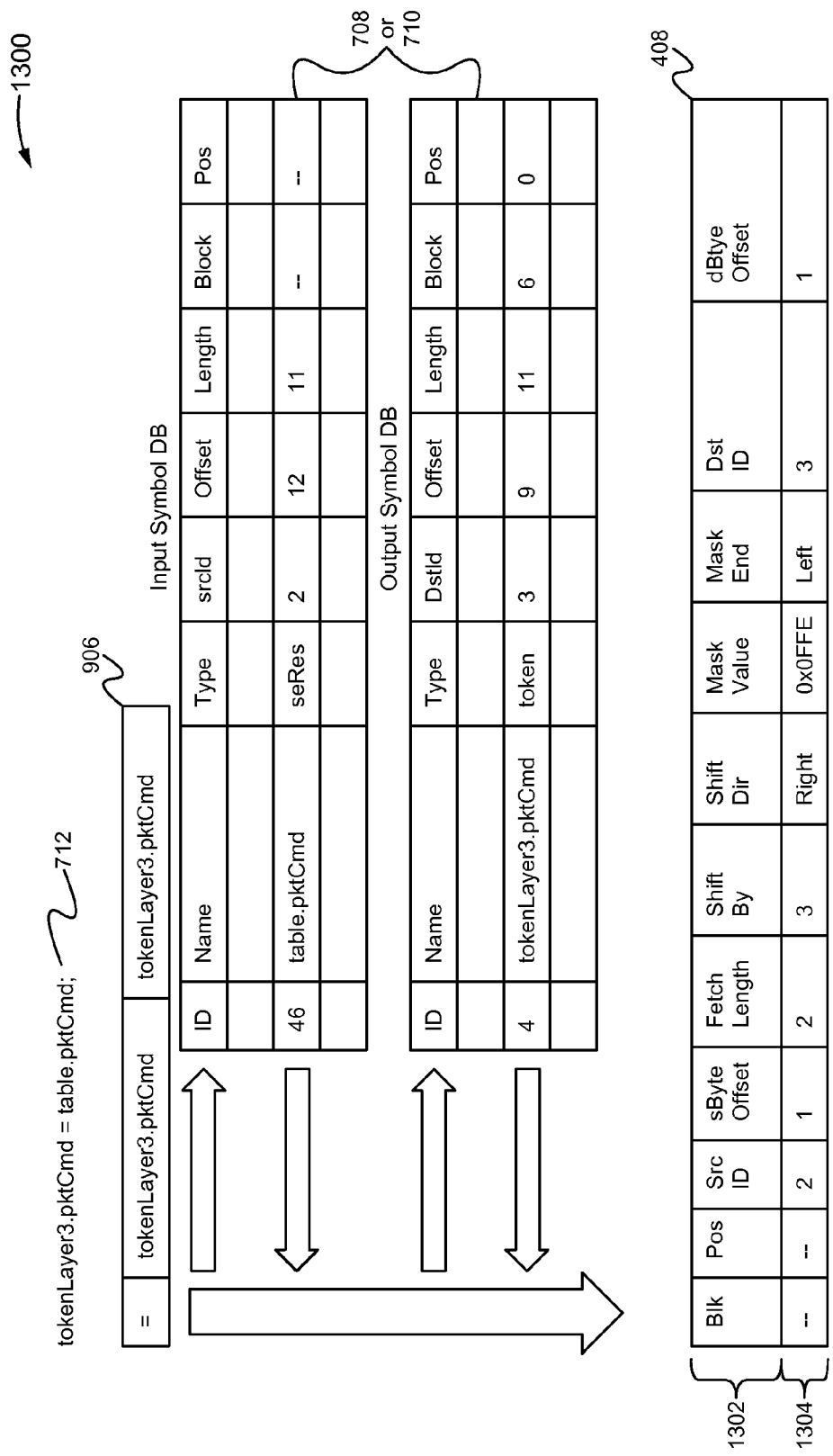
FIG. 13 illustrates a block diagram of the translation of an exemplary assignment statement into an instruction according to some embodiments.

If in steps 1010*a* or 1010*b* it is determined that the RHS of the stack 906 is a constant value, immediate copy or immediate ALU instructions (whole or fragment depending on steps 1014) are created at the steps 1016*a* and 1016*b*. If not, direct copy or direct ALU instructions (whole or fragment) are created at the steps 1016*a*' and 1016*b*'. Details of the creation of these instructions is shown in FIG. 13 as described below. Direct (assignment) instructions are instructions that assign the value of one symbol to another symbol (e.g. X=Y). Immediate (assignment) instructions are instructions that assign a known value to a symbol (e.g. X=3). In immediate instructions, the known value (e.g. 3) is able to be included in the instruction itself instead of needing to be fetched from a location indicated in the symbol database. Copy (assignment) instructions are instructions wherein the only requirement is to copy data from one location to another (e.g. X=3, X=Y), whereas ALU instructions involve at least one logical operation be performed between two or more of the operands (e.g. X=X+3, X=X+Y). Thus, the instructions are able to be direct copy, direct ALU, immediate copy or immediate ALU instructions.

These instructions created are able to be various types of instructions such as a KFIT Static Copy Instruction used in the non re-locatable blocks of the KFIT; a KFIT Dynamic Copy Instruction used in the re-locatable blocks of the KFIT; an OFIT Static Copy Instruction used in the non re-locatable blocks of the OFIT; an OFIT Static ALU Instruction used in the non re-locatable blocks of the OFIT with ALU support; an OFIT Dynamic Copy Instruction used in the re-locatable blocks of the OFIT; and an OFIT Dynamic ALU Instruction used in the re-locatable blocks of the OFIT with ALU support.

Once the instructions are created, the code generator 608 adds the instruction to an instruction dictionary database 1102 (see FIG. 11) if a duplicate (fragment and/or whole) instruction is not already stored in the instruction dictionary database 1102 at the corresponding steps 1018. For example, the code generator 608 is able to compare the created instruction to the instructions already stored in the instruction dictionary database 1102 and add the instruction as a new entry if a matching instruction is not found. In some embodiments, all of the instruction fragments representing an assignment statement are stored as a single entry within the dictionary database 1102. Alternatively, each instruction fragment is able to be located at a separate entry/location within the instruction dictionary database 1102. This provides the advantage of minimizing the quantity of instructions that need to be stored by not storing duplicate instructions. In some embodiments, the method further comprises the code generator 608 storing the assignment statement that corresponds to each of the instructions stored in the instruction dictionary database 1102 in an instruction string database 1106 (see FIG. 11). In such embodiments, the string and dictionary databases 1106, 1102 are able to be correlated such that the location of each instruction in the dictionary database 1102 is able to be the same as the location of the assignment statement string that corresponds each instruction within the string database 1106. As a result, the instruction string database 1106 is able to be used for logging and debugging purposes by the code generator 608.

Once the instructions are added to the instruction dictionary database 1102, the code generator 608 adds the location (e.g. index or address) within the dictionary database 1102 where the instruction was added or a matching instruction was found to a code path matrix 1104 (see FIG. 11) at the corresponding steps 1020. The code path matrix 1104 is able to be substantially similar to the parse map 900 except that lines of the stacks 904, 906 that make up each code path 902 row are replaced with location values that identify the location of the instructions that are executed by the code path 902 within the instruction dictionary database 1102.

Figure 11:
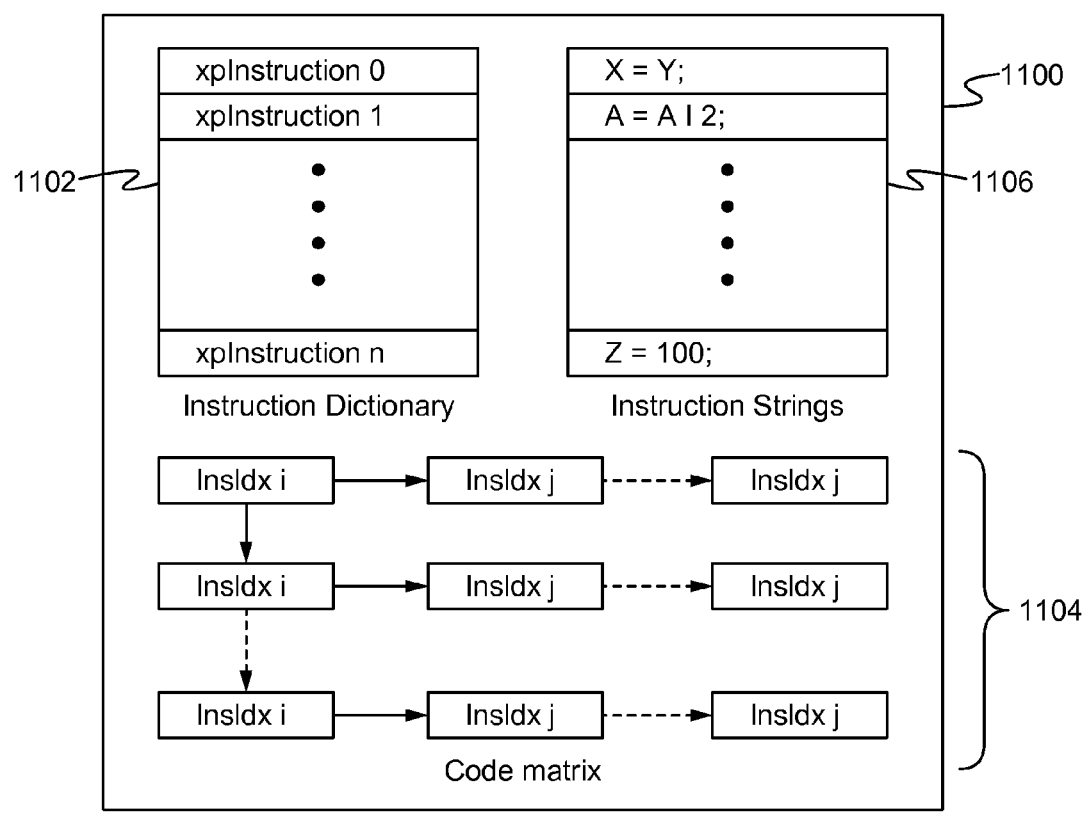
FIG. 11 illustrates a block diagram of a instruction output file for a statement stack according to some embodiments.

At the corresponding steps 1022, the code generator 608 then checks if the instruction fragment that was created/processed was the last fragment of the statement stack 906 selected at step 1006. If it was the last fragment, the code generator 608 continues to step 1024. If it was not the last fragment, the code generator 608 returns to the corresponding step 1014 and selects the next fragment. At step 1024, the code generator 608 determines if the statement stack 906 was the last statement of the code path 902 selected at step 1004. If it was the last statement stack 906, the code generator 608 continues to step 1026. If it was not the last statement stack 906, the code generator 608 determines returns step 1006 and selects the next statement stack 906 for the code path 902 selected in step 1004. At the step 1026, the code generator 608 determines of the code path 902 selected in step 1004 was the last code path 902 of the parse map 900. If it was the last code path 902, the code generator 608 outputs an instruction output file 1100 for the input parse map 900, as shown in FIG. 11, at the step 1028. If it was not the last code path 902, the code generator 608 returns to step 1004 and selects the next code path of the parse map 900 for the source code 98. As a result, the code generator 608 is able to convert the inputted parse map 900 into a instruction dictionary database 1102 with instructions in a executable format (and optionally a corresponding instruction string database 1106), and a code path matrix 1104 that references the dictionary database 1102 in order to indicate the instructions necessary to implement the assignment statements of each of the code paths 902.

As described above, the breakdown statement step 1014 is necessary because some of the assignment statements 712 are not able to be implemented using a single instruction 408. As a result, in such cases the code generator 608 intelligently breaks down the field being copied (as indicated by the statement 712) into the smallest number of subfields necessary such that each of the subfields are able to be copied using a single instruction. Thus, at the end of the processes, the multiple "fragment" instructions 408 together would implement the entire assignment 712 that could not be implemented by a single instruction 408. In some embodiments, the constraints that determine if multiple instructions 408 are necessary for an assignment 712 are as follows:

1) The maximum number of bytes that are able to be fetched by a single instruction. Generally, this value depends on the instruction block 402 where the instruction 408 belongs. In some embodiments, this value is equal to 2 or 4 bytes. Alternatively, other values are contemplated.

2) The alignment of the source field (i.e. bits to be copied) with a byte boundary. Specifically, the deeper into its starting byte (i.e. the further from the boundary of the byte) that the right edge of the bits to be copied are located within the source, and similarly the shallower into its ending byte that the left edge of the bits are located within the source, the fewer number of bits that will remain of the fetched bytes for the actual copy to the destination. In other words, many of the bits of the source bytes are not used due to the location of the bits to be copied within the bytes to be fetched in the source;

3) The alignment of the edges of the source bits and the edges of the destination bits with each other within their respective bytes. Specifically, this decides the direction and number of bit positions to shift the source field/bits in order to align them with the destination field/bits. If a shift is necessary to create edge alignment, the number of fetched bytes cannot be greater than the maximum number of bytes that are able to be handled at once by the bit shifter. In addition, the greater amount of a shift that is necessary for alignment, the fewer the number of bits remain of the fetched bytes for the copy because some are able to be "shifted" out of the fetched bytes in order to create the alignment; and 4) The alignment of one or more of the edges of the destination field with the destination byte boundary. Specifically, a bit mask is required for an instruction to mask off (i.e. switch to zero) any bits from the fetched (and possibly shifted) bytes in the source that should not be copied into the bytes of the destination field. In other words, this masking is necessary to limit the copy operation of the instruction strictly to the bits belonging to the field being copied. As a result, if the edges of the destination field are not byte aligned (either at their lower end or at their higher end), a mask must be applied on both ends of the fetched source bytes (to "zero out" the unwanted bits on either end). As a result, in such a case, the number of fetched bytes from the source cannot be more than the maximum number of bits that the bit mask is able to handle in bytes.

Alternatively, one or more of the above constraints are able to be omitted and/or additional different constraints are able to be added. In particular, these constraints are able to be determined based on the functional limitations of the LDEs 108 on the processing microchip 102.

With these constraints in mind, FIG. 12 illustrates a procedure 1200 for breaking down a selected statement stack 906 into a plurality of instructions 408 if necessary as in step 1014 according to some embodiments. In general, the process starts by attempting to copy all the bits in the source field in one instruction by checking this total number of bits in the field against each of the constraints one by one and reducing the number of bits to be copied until the number meets all of the constraints. This determined number is then assigned to be used to create an instruction 408, wherein for any remaining bits the process is repeated until no bits remain and the produced instructions 408 together represent the entire assignment statement 712.

As shown in FIG. 12, the term "SrcFieldBitStart" is the bit index of the start of the source field in the source layer, "DstFieldBitStart" is the bit index of the start of the destination field in the destination layer, "FieldBitLength" is the width of the field being copied in bits, "MaxFetchBytes" is the maximum number of bytes that is able to be fetched by instructions in the indicated block, "MaxShiftByte" is the maximum number of bytes that are able to be shifted by instructions in the indicated block, "MaxShiftPos" is the maximum number of bit positions that are able to be shifted by instructions in this block, and "MaxMaskBytes" is the maximum number of bytes that are able to be masked by instructions in this block. These values are all able to be input/calculated based on the elements within the stack 906 and/or the data for the elements/symbols within the symbol databases 708 and/or 710.

The procedure begins at step 1201 and at step 1202 where the code generator 608 determines if there are zero bits to be copied in the source field (FieldBitLength) and if so stops at step 1215 and otherwise continues to step 1203. At step 1203, the code generator 608 sets the size of the number of bits currently being attempted (SubFieldBitLength) equal the FieldBitLength, which at the outset will be equal to the entire source field indicated by the assignment statement 712 and later will be the remaining bits (see step 1213). Thus, as a default, the initial attempt will be will all of the source bits to be copied and if no reductions are necessary the entire set of source bits (and thus the entire assignment statement 712) will be implemented with a single instruction 408. At step 1204, the code generator 608 determines if a shift is necessary by comparing the edges of the source and destination fields. If the offset of the edge of the source field is greater than or equal to the offset of the edge of the destination field, then either there is no shift or a right shift is necessary. In part a, the shift amount is determined and in part b the value of the source offset is assigned to a DeeperOffset variable that represents the value of the greatest offset (either source or destination) will be used in subsequent calculations. At the step 1205, if the offset of the edge of the source field is not greater than that of the destination field, a left shift is necessary for alignment. In part a, the shift amount is determined and in part b the value of the destination offset is assigned to the DeeperOffset variable.

At the step 1206, the code generator 608 determines the number of bytes (set of 8 bits) that need to be fetched in order to obtain all of the bits indicated in the current SubFieldBitLength and the number of bits indicated by the DeeperOffset (rounded to the highest byte by adding 7). This addition of the DeeperOffset is to account for the offset (including the shift if needed) of the data to be copied in the first byte such that fetching that byte does not always fetch eight bits of the current number of bits to be fetched (SubFieldBitLength). Thus, steps 1204 to 1206 account for the second constraint described above. At the step 1207, the code generator 608 determines if the number of bytes necessary to fetch all the bits to be copied (including the DeeperOffset) exceeds the maximum amount of bytes that can be fetched at once (MaxFetchBytes). If it is greater, in part a the number of bytes to be fetched (SubFieldFetchBytes) is reduced to the maximum number and in part b the number of bits to be fetched is reduced to reflect this new amount of bytes being fetched (while also accounting for the necessary DeeperOffset). In other words, the amount of bits to be fetched is reduced to remove any bits that were located in the bytes that are no longer able to be fetched. This corresponds to the first constraint described above.

At the step 1208, the code generator 608 determines if the value of the SubFieldShiftBy is not equal to 0 meaning a shift is necessary and whether the number of bytes to be fetched (as determined in step 1206 and possibly reduced by step 1207) is greater than the max amount of bytes that are able to be shifted (MaxShiftBytes). If that is the case, it means that the shifter must be used and thus the number of fetched bytes cannot exceed the shifter capacity. As a result, in part a the number of bytes fetched is reduced to be equal to the max number of bytes that are able to be shifted by the shifter and in part b, similar to part b of step 1207, the number of bits to be fetched is reduced to reflect this new amount of bytes being fetched (while also accounting for the necessary DeeperOffset). This corresponds to the third constraint described above.

As the step 1209, the code generator 608 determines if the edges of the field to be copied to in the destination are not aligned with the boundaries of the bytes of the destination (DstNotByteAligned) and whether the number of bytes to be fetched (as determined in step 1206 and possibly reduced by steps 1207 and/or 1208) is greater than the max amount of bytes that are able to be masked (MaxMaskBytes). The destination byte alignment is checked because if one or both sides of the destination field are aligned with the destination byte boundaries, the mask byte constraint is not necessary as, at most, only the single non-aligned side of the fetched data will need to be masked. In other words, a mask for a single side will at most require the masking of seven bits on that one side of the byte (which the masker will always be capable of thereby eliminating its size as a constraint).

If instead there is no destination byte alignment, it means that both sides of the fetched bytes from the source must be masked and thus the number of fetched bytes cannot exceed the masker capacity. Accordingly, if the number of bytes to be fetched is greater than the max amount of bytes that are able to be masked and there is no shift necessary (i.e. SubFieldShiftBy=0) in part a, in part i the number of bits fetched is set to one byte (i.e 8 bits) minus the DeeperOffset and in part ii, the number of fetched bytes is adjusted to reflect the newly assigned amount of bits to be fetched. In particular, this step provides the advantage of setting up destination byte alignment in the next iteration of the process 1200 which will include the remaining bits to be fetched after the current iteration. In other words, part i determines what number of bits caused the non-destination byte alignment and selects those bits such that in the next iteration the remaining bits will be destination byte aligned and thus the masker constraint will not apply. As a result, any short term loss by this selection is able to be compensated for by a long term gain in subsequent iterations. If instead there is a shift detected in part a, the amount of bytes to be fetched is set to the maximum amount of bytes that the masker is able to handle and the amount of bits to be fetched is adjusted to reflect this newly assigned amount of bytes. This step corresponds to the fourth constraint described above.

At the step 1210, all of the constraints have been checked and thus the code generator 608 creates an instruction based on the determined number of bits to be fetched (SubFieldBitLength), the bit within the source where the number of bits start (SrcFieldBitStart) and the bit within the destination where the field to be copied to starts (DstFieldBitStart). At the steps 1211 and 1212, pointers to the starting points in the source and destination are advanced to keep track of where the next segment (i.e. bits to be fetched) is from and should be copied to. At the step 1213, the field indicating the bits to be fetched is reduced to reflect the bits that were turned into an instruction in this iteration such that the field indicates the remaining bits. Finally, at the step 1214 the process returns to step 1202 and repeats all of the steps 1202-1214 until no bits are remaining at step 1202 and the process ends at step 1215. Thus, the code generator 608 provides the advantage of intelligently breaking down the assignment statement stacks 906 into a plurality of executable instructions if necessary based on the constraints that together implement the assignment statement 712 associated with the stack 906.

It is contemplated that the order in which the constraints are checked and thus the value of the bits to be fetched is adjusted is able comprise any permutation of constraint orders. In some embodiments, the constraint with the smallest max value is checked first followed by the second smallest constraint and so on until all constraints have been checked. In some embodiments, if the size of the bits to be fetched is reduced by one of the constraints, checking of one or more of the other constraints is able to be skipped, for example, based on the size of the max value of the other constraints compared to the constraint that caused the reduction. Alternatively, the constraint with the largest max value is checked first followed by the second largest constraint and so on until all constraints have been checked.

FIG. 13 illustrates a block diagram of the translation of an exemplary assignment statement 712 and corresponding statement stack 906 into an instruction 408 as in step 1016 described above according to some embodiments. In order to create an appropriate instruction in step 1016 that is able to be carried out by the LDEs 108, the code generator 608 determines the values 1304 for one or more instruction fields 1302 based on the statement stack 906 and one or more of the referenced symbol databases 708, 710. The fields 1302 of the instruction 408 are able to comprise a block, a position (e.g. within the block), a source identifier (src ID), a source byte offset (sByte Offset), a fetch length, a shift by amount, a shift direction (shift dir), a mask value, a mask end, a destination ID (dest ID) and a destination byte offset (dByte Offset). Alternatively, different fields are able to be added and/or one or more of the fields 1302 are able to be omitted.

The block (blk) and position (pos) are able to be assigned by the instruction mapper module 614 as described below. The bit length (length), source ID (srcID) and destination ID (DstID) are able to be determined by the code generator 608 directly from the symbol databases 708 and/or 710 by looking up the data associated with the source and destination symbols or elements within the stack 906. For example, for the statement 712 of FIG. 13, the source (table.pktCmd) bit length is equal to 11 and the source ID is equal to 2 as shown in the input symbol database 708/710 whereas the destination ID of the destination (tokenLayer3.pktCmd) is equal to 3 as shown in the output symbol database 708/710. It should be noted that the output and input symbol databases 708/710 are able to be the same database or different databases depending on the symbols within the assignment statement 712.

The other values 1304 for the other fields 1302 required to create the instruction 408 are able to be calculated based on the above determined values along with the assignment statement 712 and/or the symbol databases 708/710 as follows:

1) The destination byte offset (DstByteOffset) is equal to the output symbol database offset divided by 8 (e.g. OutputSymbolDB.Offset/8), which for the example of FIG. 13 is equal to 1 (i.e. 9/8=1 (where the remainder is discarded)).
2) The source byte offset (SrcByteOffset) is equal to the input symbol database offset divided by 8 (e.g. inputSymbolDB.Offset/8), which for the example of FIG. 13 is equal to 1 (i.e. 12/8=1 (where the remainder is discarded)).
3) The fetch length is equal to the input symbol database length plus the source bit offset (SrcBitOffset) plus 7, the sum of which is then divided by 8 (e.g. inputSymbolDB.Length+SrcBitOffset+7)/8). The source bit offset (SrcBitOffset) is equal to the value of the input symbol database offset mod 8 (e.g. inputSymbolDB.Offset % 8 (the number of bits in a byte)), which for the example is equal to 4 (i.e. 12% 8=4). Thus, for the example of FIG. 13, the fetch length is equal to 2 (i.e. (11+4+7)/8=2 (discarding the remainder). It is noted that the addition of 7 is required to "round" the sum of the input symbol database length plus the source bit offset to the next byte when divided by 8 (i.e. the number of bits in a byte).
4) The shift amount (shift by) is equal to the absolute value of the source bit offset minus the destination bit offset (e.g. abs(SrcBitOffset−DstBitOffset)). The source bit offset is equal to 4 as described above. The destination bit offset (DstBitOffset) is equal to the output symbol database offset mod 8 (e.g. OutputSymbolDB.Offset % 8), which for the example is equal to 1 (i.e. 9% 8=1). Therefore, for the example of FIG. 13, the shift amount is equal to 3 (i.e. abs(4−1)).
5) The shift direction (ShiftDir) is dependent on which is greater, the source bit offset (meaning a right shift is necessary) or the destination bit offset (meaning a left shift is necessary) (e.g. (SrcBitOffset>DstBitOffset) ? Right : Left). For the example, the shift direction is right because source bit offset is greater than the destination bit offset (i.e. 4>1). It should be noted that if the shift amount is equal to zero, then the shift direction field is not applicable.
6) The mask value is equal to the bit length offset by the destination bit offset (e.g. MakeMask(BitLen)<<DstBitOffset), which for the example of FIG. 13 is 0x0FFE (i.e. a mask of 11 of the 16 bits or two bytes that is shifted by 1).
7) The mask end is by default equal to left and is only relevant for bit lengths that are greater than 16 or two bytes (i.e. the size of the mask).

As a result, the code generator 608 is able to create an instruction 408 that implements all or a fragment of the selected stack 906 corresponding to the assignment statement 712.

MuxXor Cloud Mapper Module

The MuxXor cloud mapper module 626 provides the function of identifying one or more logical comparisons (e.g. x==z, a !=b) of two data items (e.g. a pair of 16-bit fields associated with a pair of symbols from the symbol database) within conditions 717 of the source code 98, selecting one or more of the logical comparisons and assigning or programming each of the selected the logical comparisons into one of the MuxXor cells 508 of the MuxXor cloud 406 such that upon receiving the data items from the input to the LDE 108 the cloud 406 (via the cells 508) is able to output data representing the outcome of the comparisons to the logic cloud 404. In particular, the output data is able to be a single bit (0 or 1) indicating that the pair of data items matched (e.g. 1) or did not match (e.g. 0). As a result, the MuxXor cloud 406 is able to lessen the processing burden placed on the logic cloud 404 by reducing the incoming data size and/or number of operations/conditions of the source code 98 that the logic cloud 404 must perform.

The MuxXor cloud mapper 626 is able to identify the logical comparisons of the conditions 717 by reading the source code 98 (e.g. the conditions list of each of the parallel code blocks) and adding all of the comparisons to a list of comparisons. After each addition to the list, the list is sorted according to one or more priority factors and the one of the comparisons within the list at the bottom of the list according to the priority factors is able to be pruned or removed from the list. As a result, the list is able to be continuously limited to a predetermined number of comparisons equal to the total number of MuxXor cells 508 available in the target hardware (e.g. on the LDE 108). Alternatively, the sorting and pruning is able to wait until all of the comparisons have already been added to the list, wherein the pruning continues until the number of comparisons in the list equals the total number of MuxXor cells 508 available in the target hardware.

The priority factors are able to comprise one or more of the size of the pair of data items being compared by the comparison and whether the comparison was explicitly called out within the source code 98 via a dedicated MuxXor cloud operator. For example, comparisons that are explicitly delegated to the MuxXor Cloud 406 by the user using a special operator within the source code 98 are able to be prioritized over comparisons that use generic comparison operators (e.g. a==b, a !=b). This enables a user to ensure that the comparison is added to the MuxXor cloud 406 if possible. In other words, comparisons that were not explicitly called out will be pruned before any called out comparisons will be pruned from the list. As another example, priority is able to be given to the comparisons that uses fields/data item pairs with greater numbers of bits. In other words, if the comparisons are sorted by data item bit size, the bit size comparison with the smaller data items is are pruned before those with larger data items. As a result, the size based priority factor ensures the highest efficiency in the use of MuxXor cells 508 to reduce the burden on the logic cloud 404. Additionally, multiple priority factors are able to be combined and/or ranked. For example, generic operator comparisons are able to be pruned before special operator comparisons, wherein within the generic operator comparisons and/or the special operator comparisons the comparisons with the smaller data item bit sizes are pruned first. Alternatively, the comparisons with the smaller data item bit sizes are pruned first (regardless of generic or special operators), wherein if there is an equal bit size the generic operator comparisons are pruned first. Alternatively, other priority factors are able to be used and/or combined when pruning the list of comparisons.

In some embodiments, the MuxXor cloud mapper 626 is able to effectively expand the number of comparisons that can remain in the list by identifying any comparisons that are duplicates and only counting them as a single comparison for the purposes of pruning the list to the number of MuxXor cells 508 within the target hardware. In particular, when converting comparisons from the source code language of the conditions 717 (e.g. x==z) to configuration values that when stored in the MuxXor cells 508 cause the cells to implement the comparison, it is possible for comparisons with different source code language to result in the same configuration values. As a result, these two comparisons are able to be performed by the same MuxXor cell 508 and therefore effectively only count as a single comparison for the purposes of determining the size of the list compared to the number of MuxXor cells 508 available. In this case, the MuxXor output of the MuxXor cell 508 corresponding to the multiple comparisons is able to be output to all the locations in the logic cloud 404 that require the output from any of the multiple comparisons. This is also true in the case of matching comparisons repeated in multiple code blocks. This duplicate identification is able to be performed as each comparison is added to the list or after all of the comparisons have been added to the list.

As described above, once the selected comparisons are determined, the MuxXor cloud mapper 626 programs the comparisons into the MuxXor cells 508 of the target hardware. For example, the mapper 626 is able to lookup the symbols within each of the comparisons in the source code 98 within the symbol database 708 or 710. Then based on the data associated with the symbols within the database 708, 710, the mapper 626 is able to generate the corresponding configuration values necessary for programming each of the comparisons into the MuxXor cells 508. The configuration values are able to comprise one or more of a first symbol and/or second symbol source, byte position, shift, shift direction and bit mask. The symbol database 708, 710 values used to determine the configuration values are able to comprise one or more of data type, source, offset and length. For example, in some embodiments the following formulae are used to derive the configuration values from the symbol database values.

Mux_A Src=7; // muxXorSymbolDb(x).Source
Mux_A BytePosn=2; // muxXorSymbolDb(x).Offset/8
Mux_A ShiftBy=4; // ABS(MOD(muxXorSymbolDb(x).Offset, 8)−MOD(muxXorSymbolDb(z).Offset, 8))
Mux_A ShiftDir=Right; // (MOD(muxXorSymbolDb(x).Offset, 8)>MOD(muxXorSymbolDb(z).Offset, 8)) ? Right : Left
Mux_A BitMask=0xFFF8; // (MakeMask(muxXorSymbolDb(x).Length)<<MOD(muxXorSymbolDb(x).Offset, 8)) shifted Mux_A ShiftBy positions towards Mux_A ShiftDir direction.
Mux_B Src=9; // muxXorSymbolDb(z).Source
Mux_B BytePosn=1; // muxXorSymbolDb(z).Offset/8
Mux_B BitMask=0xFFF8; // (MakeMask(muxXorSymbolDb(z).Length)<<MOD(muxXorSymbolDb(z).Offset, 8))

Alternatively, other formulae are able to be used as are known in the art.

Finally, the MuxXor cloud mapper module 626 is able to update the conditions 717 (and the data associated therewith) that the selected comparisons came from within the source code. Specifically, the mapper 626 is able to replace the source code comparisons within the conditions 717 with reference to the configuration value comparison (e.g. the MuxXor output) of the corresponding MuxXor cell 508. This process is able to complete the MuxXor mapping and enables the logic cloud 404 to operate on the MuxXor output of the MuxXor cloud 406 instead of the original fields (e.g. the fields within the symbol database 708, 710 for the pair of data items). As a result, the MuxXor cloud mapper module 626 is able to provide the advantage of easing the processing load on the logic cloud 404 by performing one or more comparisons of the source code 98 and reducing them to single bit values indicating the result.

Figure 29:
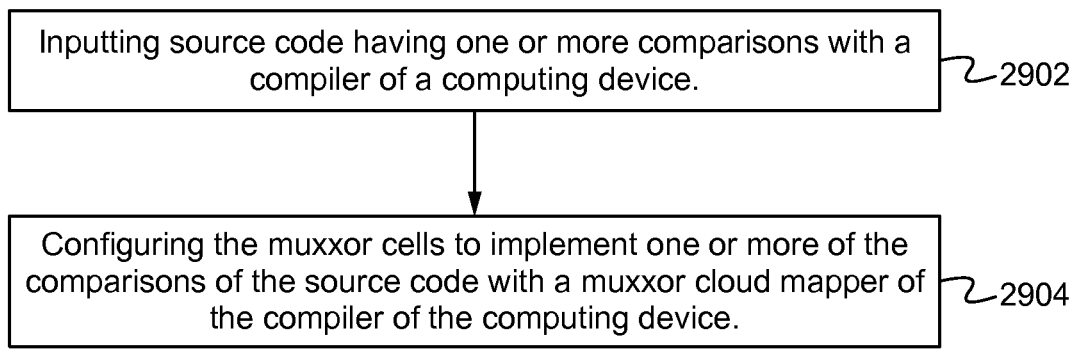
FIG. 29 illustrates a method of mapping the MuxXor cloud according to some embodiments.

FIG. 29 illustrates a method of mapping the MuxXor cloud 406 according to some embodiments. As shown in FIG. 29, the compiler 104 inputs the source code 98 including one or more conditions at the step 2902. Based on the source code 98, the MuxXor cloud mapper module 626 configures one or more of the MuxXor cells 508 of the LDEs 108 of the processing microchip 102 such that each of the cells 508 implement one of the comparisons of the source code 98 at the step 2904. Specifically, the mapper 626 is able to identify a list of all comparisons within the conditions 717 of the source code 98 and prune the list until the number of comparisons within the list is equal to the number of MuxXor cells 508 on the LDE 108 or LDEs 108 of the processing microchip 102. The pruning is able to be prioritized such that comparisons of the list involving smaller amounts of compared data are pruned before comparisons of the list involving larger amounts of compared data. In some embodiments, the source code 98 is able to comprise one or more dedicated MuxXor cloud comparison operators and/or the pruning is prioritized such that comparisons of the list associated with the dedicated MuxXor cloud comparison operators are immune from pruning until all comparisons of the list not associated with one of the dedicated MuxXor cloud comparison operators have already been pruned. Alternatively, different pruning priorities are able to be used and/or combinations of priorities are able to be used (e.g. nested priorities). As a result, the method is able to provide the advantage of mapping the MuxXor cloud 406 such that the most costly/large comparisons are performed by the MuxXor cloud 406 thereby maximizing the processing aid provided to the logic cloud 404.

Instruction Table Mapper Module

The instruction table mapper module 614 provides the function of determining where to store or lay out the instructions 408 (created by the code generator 608 and input via the instruction output file 1100) within the instruction table blocks 402 (of the key formatter 302 and/or the output formatter 304). The instruction mapper module 614 is able to do this by breaking down and combining the instructions 408 in various ways and finding a minimal layout of instructions 408 within the blocks 402 such that a success criteria is met wherein all code paths 716 are able to be executed by executing one line of instruction(s) 408 from one or more of the blocks 402. In determining an instruction layout that meets the success criteria, the mapper 614 performs one or more layout attempts each including one or more iterations when a change to the layout is performed. For each attempt, an iteration of instruction/block breaking down and combining is performed until no more such actions are possible. If at that point the instruction layout is not able to fit within the allotted instruction table blocks 402, the attempt has failed, the layout is reset and a new attempt is started.

Figure 7F:
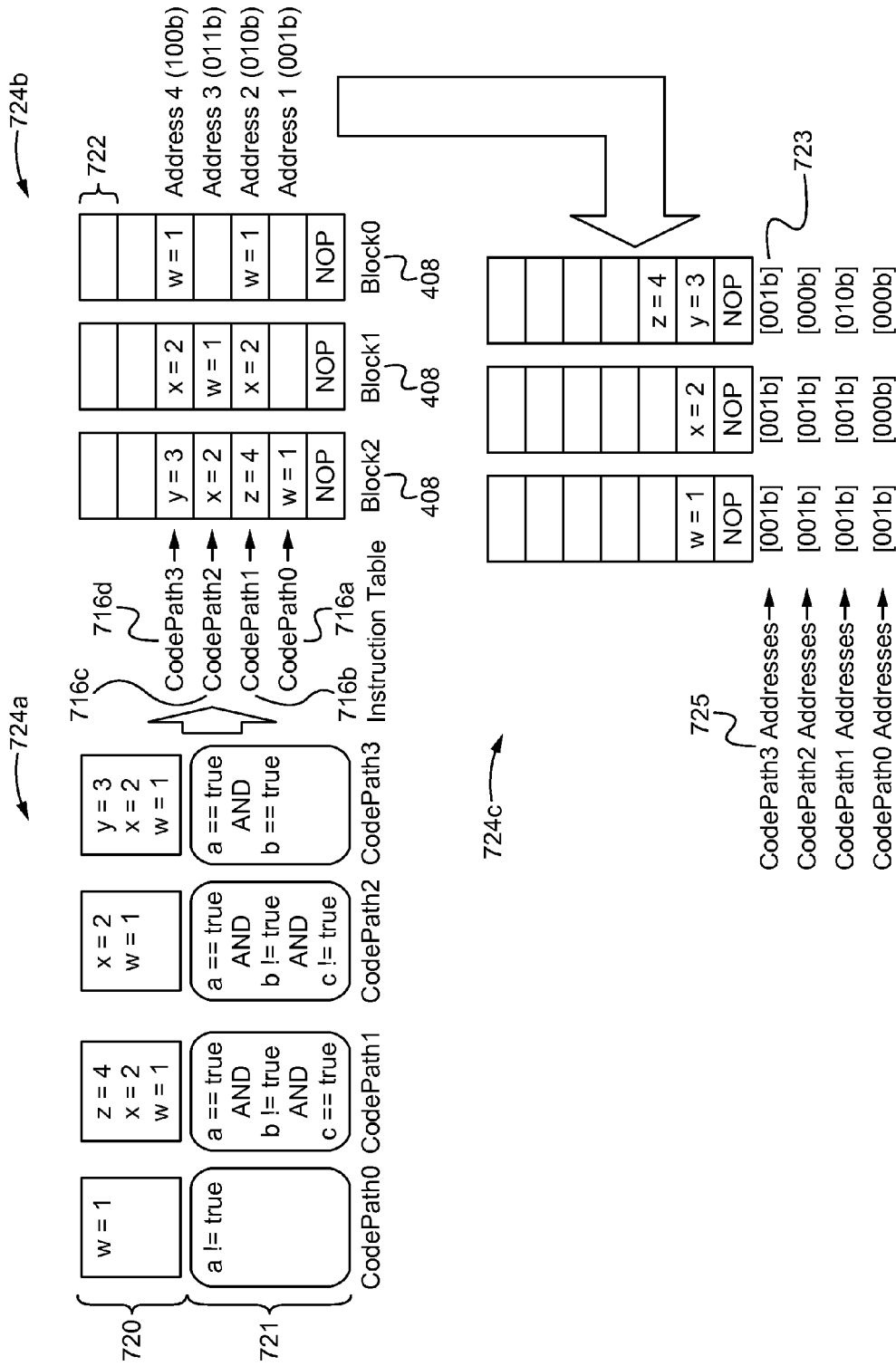
FIG. 7F illustrates a block diagram of determining where to store or lay out the instructions created by the code generator within the instruction table blocks according to some embodiments.

For example, as shown in FIG. 7F, the mapper 614 is able to take the instructions associated with the assignment sets 720 from one of the code paths 716 as shown by 724a and fill one line 722 (or one or more positions of one line 722) of the blocks 404 (e.g. at the same address 723 for each block 404) until all of the instructions of the sets of assignment statements 720 of all of the code paths 716 have been filled into the blocks 404 as shown by 724b. As will be described in detail below, the mapper 614 is then able to filter or compress this layout of the instructions within the blocks 404 based on logic while still meeting the success criteria. For example, the layout is able to be compressed such that each instruction 408 is listed no more than once per block 404 (and in some cases per all the blocks 404) as shown by 724c. The code paths 716 are then able to be associated with block addresses 723 wherein the block addresses 723 for a set of assignments 720 for a code path 716 are combined to create the code path block address 725. As a result, different paths 716 are able to reference the same block address (and the assignment statement/instruction therein) if the indicate that the same assignment is to be executed. Thus, the mapper 614 provides the benefit of minimizing the storage necessary to implement the source code 98 with the LDE 108. This is in contrast to other types of compilers which perform a one to one translation without any filtering or logical compression of the data.

Figure 15C:
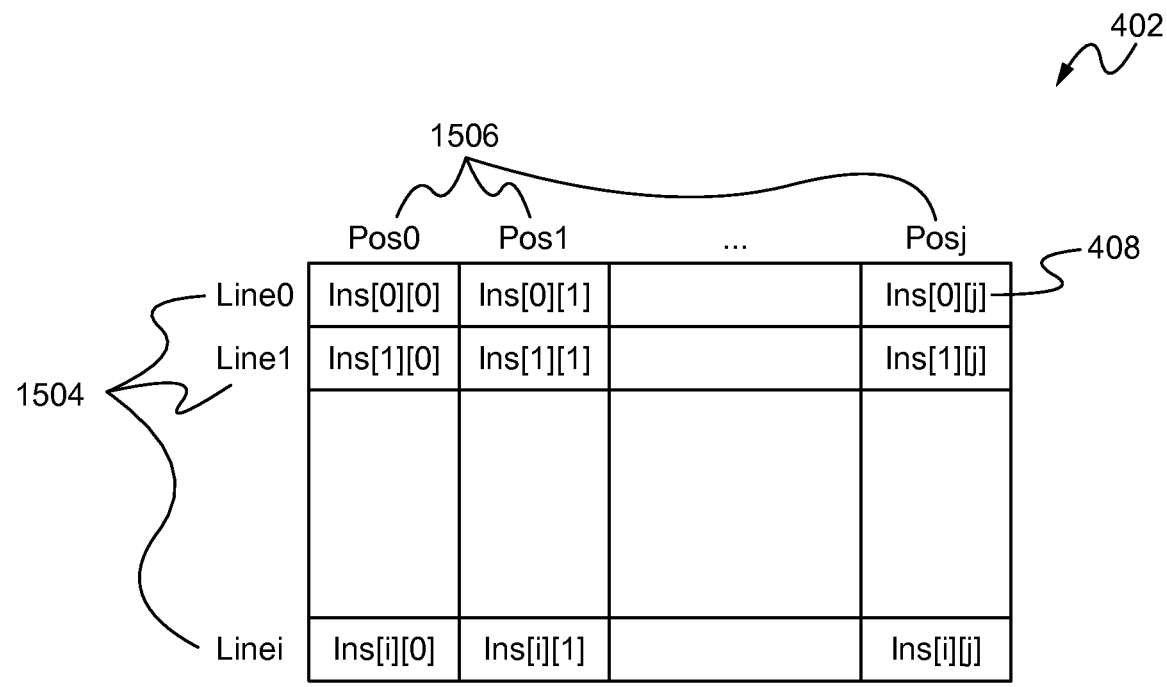

FIGS. 15A, 15B and 15C illustrate exemplary instruction tables 1500, 1500' and an associated instruction table block 402 according to some embodiments. In particular, FIG. 15A illustrates a key formatter instruction table (KFIT) 1500 of the key formatter 302 and FIG. 15B illustrates an output formatter instruction table (OFIT) 1500' of the output formatter 304. As shown in FIGS. 15A and 15B, the instruction tables 1500, 1500' are able to comprise one or more blocks 402 organized into one or more clusters 1502. As shown in FIG. 15C, each of the blocks 402 are able to comprise one or more lines 1504 each having one or more positions 1506. The number of positions 1504 is able to be the same for all of the lines 1502 of a block 402 and is referred to as the width of the block 402, whereas the number of lines 1502 within the block 402 is referred to as the depth of the block 402. Similarly, the blocks 402 within each cluster 1502 are able to have the same width, depth and/or mapping requirements (e.g. relocatable or non-relocatable). Thus, the clusters 1502 are able to be labeled as relocatable clusters 1502a if they receive relocatable instructions or non-relocatable clusters 1502b if they receive non-relocatable instructions.

Non-relocatable instructions are those that have a reserved (or fixed) position in the instruction table 1500, 1500'. These are special instructions that operate on predefined destinations in the token or elsewhere in the hardware. These instructions have to be assigned to their allotted block 402, line 1504 and position(s) 1506 within a non-relocatable cluster 1502b of the instruction table 1500, 1500'. In contrast, relocatable instructions are those that are able to be assigned to a plurality of (un-reserved) possible positions within a relocatable cluster 1502a. In other words, the position of a relocatable instruction within a cluster 1502a is not predefined and is able to be dynamically or otherwise changed as desired by the mapper 614 when mapping the instruction to the table 1500, 1500'. In some embodiments, a line 1502 is the smallest addressable unit in a block 402. Alternatively, the positions 1504 are able to be addressable within the lines 1502. Each instruction 408 is able to be mapped by the mapper 614 to one of the positions 1504 of one of the lines 1502 of a block 402. As a result, a single line 1502 is able to contain a plurality or set of instructions 408 that are each able to be executed upon selection of the line 1502 and/or pointed to by an address of the instruction table 1500, 1500'.

As shown in FIG. 15A, in some embodiments the KFIT 1500 is able to be divided into two clusters 1502. The cluster0 comprises six blocks 402 with a depth of 16 and a width of 4. All positions in this cluster are relocatable such that cluster0 is a relocatable cluster 1502a. In some embodiments, the instructions for writing the user defined fields in the Search Key go into these positions. The cluster1 comprises a single block 402 with a depth of 16 and a width of 2 and comprises a non-relocatable cluster 1502b. As a result, the non-relocatable instructions for writing the Profile Id and the Command Enable Vector of the Search Key are able to be mapped into these positions. As shown in FIG. 15B, in some embodiments the OFIT 1500' is able to be divided into 9 clusters 1502. In the embodiment shown in FIG. 15B, all of the clusters 1502 except clusters 5 (Scratchpad), 6 (Layers Data) and 9 (Local Memory Key) are non-relocatable clusters 1502b. The Cluster 6 comprises two blocks 5 and 6 whereas all other clusters 1502 hold one block 402 each. As described above, each cluster 1502 is able to have its own block depth and width specification. As also described above, each line 1504 in a non-relocatable cluster 1502b is able to store (possibly multiple) instructions 408 that write predefined fields in the hardware. In contrast, as described above, each position in a relocatable cluster 1502a stores a relocatable instruction 408 that writes a user-defined field of a particular type (e.g. Scratchpad, Layers Data, Local Memory Key), wherein such instructions are able to be assigned to any position 1506, any line 1504 and any block 402 within the same cluster 1502.

Figure 16:
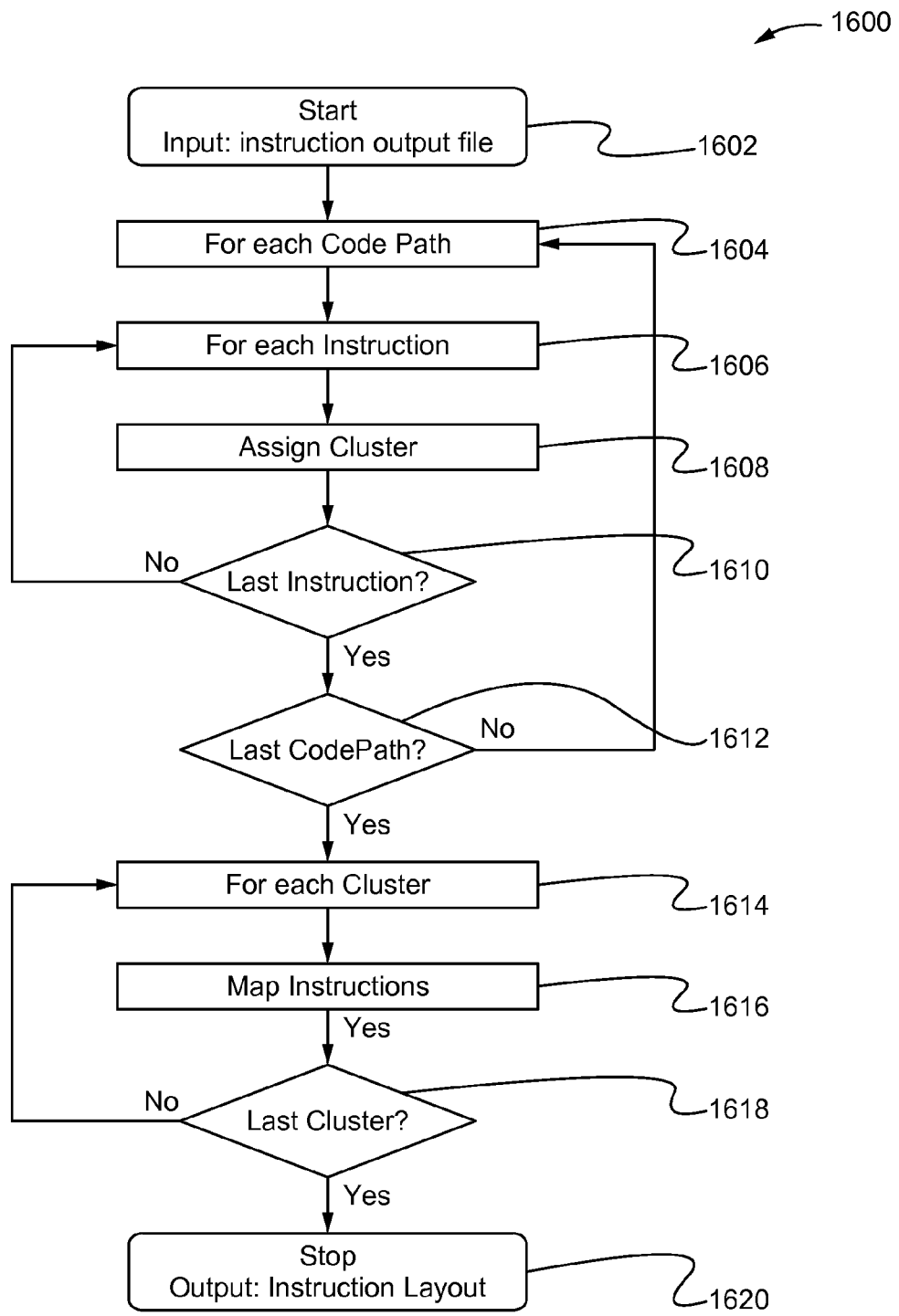
FIG. 16 illustrates a functional flow chart of the instruction table mapper module for mapping instructions from an instruction output file according to some embodiments.

FIG. 16 illustrates a functional flow chart 1600 of the instruction table mapper module 614 for mapping instructions 408 from an instruction output file 1100 according to some embodiments. As shown in FIG. 16, the mapper 614 inputs an instruction output file 1100 from the code generator 608 at the step 1602. As described above, the instruction output file 1100 comprises a code path matrix 1104 whose rows correspond to the different possible code paths (of the source code 98), wherein the values of the elements of the rows indicate the location within the dictionary database 1102 of the instructions that implement the code path (e.g. when executed implement the assignment statements that correspond to the code path). Then for each instruction of each code path of the matrix 1104, the mapper 614 categorizes the instruction into the cluster 1502 of the table 1500, 1500' to which the instruction belongs at the steps 1604-1610. For example, based on the symbols and/or values indicated within the fields of each of the instructions 408, the mapper 614 is able to reference the symbols and associated data within data path symbol database 710 to determine to which cluster 1502 the instruction 408 belongs.

Once some or all of the instruction cluster categorization is complete, for each cluster 1502, the mapper 614 maps the instructions 408 categorized within the cluster 1502 to one or more positions within the instruction table database 1500, 1500' where the cluster 1502 is located at the steps 1614-1618. If the cluster 1502 is a relocatable cluster 1502a, then a relocatable mapping process is used by the mapper 614 in step 1616 as described in detail in section 1 below. If instead the cluster 1502 is a non-relocatable cluster 1502b, then a non-relocatable mapping process is used by the mapper 614 in step 1616 as also described in detail in section 2 below. Subsequently, after all of the instructions 408 of all of the clusters 1502 have been successfully mapped, the mapper 614 outputs the created instruction layout file at the step 1620. Additionally, in some embodiments steps 1604-1614 are able to be omitted such that all the instructions 408 are mapped together, instead of groups of instructions 408 separated by cluster 1502.

1. Relocatable Mapping

Relocatable mapping is the process performed by the mapper 614 of determining a layout of the instructions 408 within a relocatable cluster 1502a. To do so, the mapper 614 groups the instructions 408 and stores or maps the instructions 408 within the cluster 1502a according to the groups such that the amount of space required to store the instructions 408 is reduced until all the instructions are able to fit into the blocks 402 of the cluster 1502a. In particular, the relocatable process described herein is able to be configured to determine a layout that fits the space requirements and then stopping the minimization process even if the layout is able to be further minimized. This is because "over-optimizing" and thereby confining the instructions 408 to a smaller or the smallest possible portion of the available space within the cluster 1502a places a higher burden on the logic cloud 404 and/or the logic cloud mapper module 622 because it must select the correct instruction lines 1504 for all the code paths 902 (or 716) using fewer number of address bits (i.e. because fewer address locations within the cluster 1502a are utilized).

Indeed, in some embodiments even if an acceptable layout is determined with regard to the space within the cluster 1502a, the mapper 614 is able to determine a new layout if the cloud mapper 622 is unable to map one or more portions of the source code 98 to the logic cloud 404 based on the available components of the cloud 404 (e.g. MuxLuts, BypassMuxes). In such embodiments, the mapper 614 is able to be configured to stop the reduction process before the amount of reduction that was present in the previous layout is reached thereby ensuring that the burden on the could mapper 622 is eased. In some embodiments, the layout is determined on a single (relocatable) cluster 1502a basis such that only the instructions 408 associated with that cluster 1502a are included within the layout. Alternatively, the layout is able to be determined for a plurality of clusters 1502a and/or all of the (relocatable) clusters 1502a and the associated instruction 408 at a time.

Figure 17:
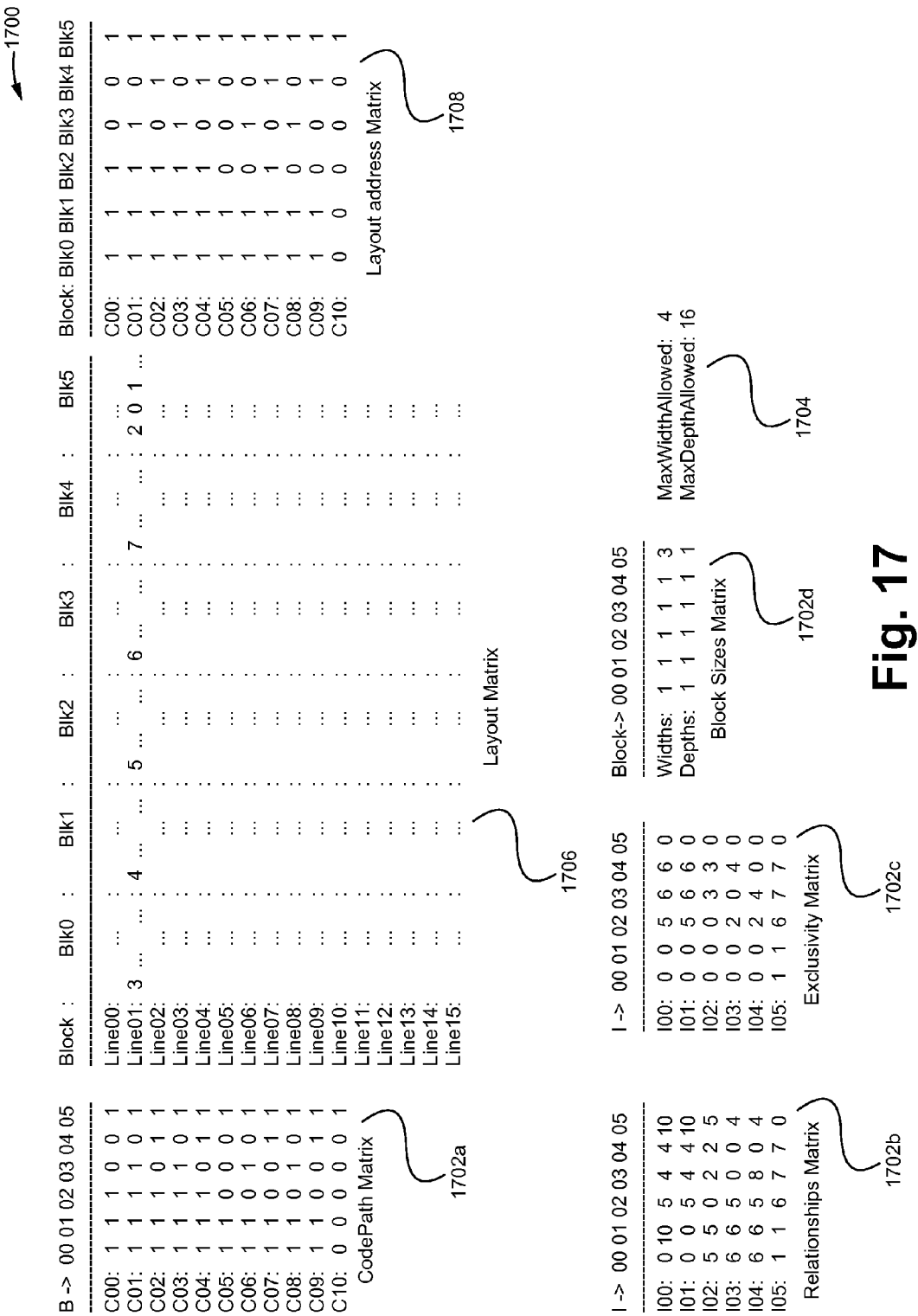
FIG. 17 illustrates an exemplary relationship database of the mapper according to some embodiments.

To prepare for the relocatable mapping, the mapper 614 determines different relationship data about the instructions 408 and code paths 716 and stores the calculated data in a relationship database. FIG. 17 illustrates an exemplary relationship database 1700 of the mapper 614 according to some embodiments. As described above, the relationship database 1700 is able to be calculated and utilized to store metadata about the usage or relationship of an instruction line 1504 and/or block 402 (and the instruction(s) 408 currently mapped therein) with respect to all other instruction lines 1504 and/or blocks 402 (and the instruction(s) 408 currently mapped therein) in a particular cluster 1502a. There are two main aspects of the calculated instruction relationships between the pairs of instruction lines 1504: inclusivity and exclusivity. Regarding inclusivity, for each instruction line 1504 and/or block 402 (and the instruction(s) 408 currently mapped therein) pair, the inclusivity between the pair is able to be defined as the number of code paths 902 (or 716) where the instructions 408 within the pair of instruction lines 1504 and/or blocks 402 are both executed (in order to execute the code path). In other words, inclusivity creates a value for the number of code paths 902 (or 716) that require both of the instructions 408 of the first line 1504 and the second line 1504 to be executed.

In contrast, for each instruction line 1504 and/or block 402 (and the instruction(s) 408 currently mapped therein) pair, the exclusivity between the pair is able to be defined as the number of code paths 902 (or 716) where the instructions 408 within the pair of instruction lines 1504 and/or blocks 402 are used mutually exclusively. In other words, exclusivity creates a value for the number code paths 902 (or 716) that require only one of the instructions 408 of the first line 1504 and the second line 1504 to be executed. Additionally, exclusivity or total exclusivity is able to be broken down into right exclusivity and left exclusivity. For each instruction line 1504 and/or block 402 (and the instruction(s) 408 currently mapped therein) pair, the right exclusivity between the pair is able to be defined as the number of code paths where the instructions 408 within the first of the pair of instruction lines 1504 and/or blocks 402 is used, but the second of the pair is not. Similarly, for each instruction line 1504 and/or block 402 (and the instruction(s) 408 currently mapped therein) pair, the left exclusivity between the pair is able to be defined as the number of code paths where the instructions 408 within the second of the pair of instruction lines 1504 and/or blocks 402 is used, but the first of the pair is not. In other words, right and left exclusivity is a relative value depending on which line 1504 and/or block 402 of the pair is first or second (i.e. on the "right" or on the "left"). As a result, right/left exclusivity is able to measure, of the mutually exclusive instructions 408 between the pair, which line 1504 and/or block 402 of the pair uses more of these mutually exclusive instructions 408.

As shown in FIG. 17, the relationship database 1700 comprises one or more relationship matrixes 1702 that contain this inclusivity, exclusivity and/or other usage or relationship metadata. In particular, the code path matrix 1702a is a matrix whose rows represent code paths 902 (or 716) and columns represent blocks including one or more instructions 408 as a set. If a code path uses an instruction/block, a "1" is placed in the matrix 1702a at the intersection of the instruction/block column and code path row, otherwise a "0" is placed at the intersection. For example, in FIG. 17 the instruction 00 is used by all of the code paths C00-C10 whereas the instruction 05 is only used by code paths C00-004. As a result, the code path matrix 1702a is able to illustrate all of the code paths 902, 716 and which of the instructions 408 that they utilize (based on the blocks where the instructions are currently mapped). The code path matrix 1702a is updated after each iteration of each attempt of the instruction mapping process by the mapper 614 in order to reflect any changes to a layout matrix 1706 (described below). For example, if two sets of instructions 408 from a pair of blocks are combined together (i.e. mapped to the same line 1504 of a block 402) the matrix 1702a is able to be updated such that the values of the columns of the two sets of instructions 408 are combined into values of a single column and the matrix values are updated accordingly. Similarly, other types of updates to the matrix rows, columns and/or values are possible based on the mapping process each iteration as described in detail below. Consequently, the mapper 614 ensures that the code path matrix 1702a always reflects the current state of the instruction mapping process.

The relationship matrix 1702b is a matrix that indicates the inclusivity and exclusivity of each of the possible pairs of instructions 408 (for some or all of the code paths 902, 716). As shown in FIG. 17, the rows and columns both separately represent the set of instructions 408 (as currently grouped), wherein the values above the main diagonal of the matrix 1702b represent the inclusivity between the pair of instructions 408 of the corresponding column and row and the values below the main diagonal of the matrix 1702b represent the exclusivity between the pair of instructions 408 of the corresponding column and row. For example, in FIG. 17 the inclusivity (i.e. above the diagonal) of instructions 00 and 01 (i.e. column 2, row 1) is equal to 11 because, as shown in the code path matrix 1702a, the instructions 00 and 01 are both used by all 11 code paths (C00-C10). In contrast, in FIG. 17 the exclusivity of the instructions 00 and 01 (i.e. column 1, row 2) is equal to 0 because none of the code paths used just one of the instructions 00 or 01. As a result, the relationship matrix 1702b is able to indicate both the inclusivity and exclusivity of all of the possible pairs of instructions 408. It should be noted that the main diagonal values of the matrix 1702b are not used because the comparison of an instruction to itself is indicative of any inclusivity or exclusivity. Also, similar to the code path matrix 1702a, the relationship matrix 1702b is updated after each iteration of each attempt of the instruction mapping process by the mapper 614 in order to reflect the current state of the layout matrix 1706 (described below). In particular, instructions 408 that have been grouped/combined together in the mapping process are given a single column and row and the matrix values are recalculated based on the new columns/rows.

The exclusivity matrix 1702c is a matrix that indicates the right and left exclusivity of each of the possible pairs of instructions 408 (for some or all of the code paths 902, 716). As shown in FIG. 17, the rows and columns both separately represent the set of instructions 408 wherein the values above the main diagonal of the matrix 1702b represent the right exclusivity between the pair of instructions 408 of the corresponding column and row and the values below the main diagonal of the matrix 1702b represent the left exclusivity between the pair of instructions 408 of the corresponding column and row. For example, in FIG. 17 the left exclusivity of instruction 07 compared to instruction 05 (i.e. column 5, row 7) is equal to 2 because only two of the code paths (C07 and C09) use instruction 07, but not instruction 05 and the right exclusivity of instruction 07 compared to instruction 05 (i.e. column 7, row 5) is equal to 3 because only three of the code paths (C00, C01 and C03) use instruction 05, but not instruction 07. Again the diagonal of the matrix is able to be unused. Also, similar to the other matrices, the exclusivity matrix 1702c is updated after each iteration of each attempt of the instruction mapping process by the mapper 614 in order to reflect the current state of the layout matrix 1706 (described below). Again, instructions 408 that have been grouped/combined together in the mapping process are given a single column and row and the matrix values are recalculated after each iteration based on the new columns/rows.

The block size matrix 1702d has columns representing each of the blocks 402 within the cluster 1502a and rows that indicate the current width (or the largest number of positions 1506 currently occupied by one or more instructions 408 in one of the lines 1504) and the current depth (or number of lines 1504 occupied by one or more instructions 408) of the corresponding block 402. This matrix 1702d is updated after each iteration of the instruction mapping process by the mapper 614 in order to reflect any changes to the current width and depth of any of the blocks 402 as indicated by the layout matrix 1706 (described below). As a result, the mapper 614 is able to compare the current widths and depths of the blocks 402 to the maximum allowed widths and depths 1704 for the cluster 1502a. If after an iteration one or more blocks 402 meets a maximum width and/or depth, during subsequent iterations the mapper 614 will ensure that no combinations or other instruction mapping steps are made that further increase the met value (width and/or depth) for those blocks 402 in the layout matrix 1706. Therefore, if no mapping changes are able to be made in a subsequent iteration without violating one of the maximum values 1704 for one or more of the blocks 402 the mapper 614 ends that attempt of mapping the cluster 1502a during the mapping process 1616. Presumably, the attempt will have been a failed attempt because otherwise the mapper 614 would have already ended the attempt as a success because it had already met the instruction layout requirements (e.g. fit within the number of blocks 402 available for the cluster 1502a wherein all code paths 716 are able to be satisfied by executing the instruction 402 mapped to one address 723 from one or more of the blocks 402).

The relationship database 1700 is able to further comprise the layout matrix 1706 and a layout address matrix 1708. These two matrixes are able to be used to represent and keep track of the current mapping of the instructions 408 as it changes for each iteration during the mapping process 1616. The columns of the layout matrix 1706 represent blocks 402, the rows represent lines 1504 within the blocks 402, wherein each line 1504 is able to receive a number of values (i.e. instructions mapped to that location within the block 402) up to the max width allowed 1704. At the outset, the layout matrix 1706 is given as many lines as the max depth allowed 1704 and as many blocks or columns as there are instructions 408 such that each instruction 408 occupies one position 1506 in one line 1504 of one block 402. This is to represent a hypothetically infinitely large cluster of blocks, wherein the mapper 614 is able to then reduce the number of block (or columns) needed until it is equal to or below the actual number of blocks 402 in the cluster 1502a. The columns of the layout address matrix 1708 also represent the blocks 402, but the rows represent each of the code paths 902, 716 similar to the code path matrix 1702a. The values of the matrix 1708 indicate which lines 1504 (the line address within the layout matrix 1706) for each of the blocks 402 currently contain instructions 408 that are executed by the code paths 902, 716. Thus, the layout address matrix 1708 will have the same values as the code path matrix 1702a until multiple lines 1504 are used for at least one of the blocks 402 (such that the address matrix value will indicate one of the multiple used lines based on the code path). Like the other matrices, the layout address matrix 1708 is updated each iteration to reflect the changes to the layout matrix 1706.

All of this data within the relationships database 1700 is able to be calculated and stored by the mapper 614 for each set of data (e.g. cluster and associated instructions/code paths) desired. Alternatively, one or more of the tables 1702 are able to be omitted and/or new tables are able to be calculated and included in the database 1700. In some embodiments, the relationship database 1700 is created on a cluster basis including only the instructions 408 used within the specified cluster 1502. Alternatively, the relationship database 1700 is able to be created on a plurality of clusters and/or all of the (relocatable) clusters 1502a and the associated instructions 408.

Once the initial relationship data within the relationship database 1700 has been calculated, the mapper 614 is able to proceed with mapping the instructions (step 1616). Generally, the relocatable mapping proceeds in two phases: an inclusivity compatibility phase combining layout matrix lines and an exclusivity compatibility phase combining layout matrix blocks. In some embodiments, the inclusivity phase is performed first followed by, if necessary, the exclusivity phase. Alternatively, the exclusivity phase is able to be performed first or exclusivity and inclusivity phases are able to be interwoven or selectively toggled between on an iteration basis. In any case, as described above because the mapper 614 initially assumes that there are as many blocks 402 available in the cluster 1502a as the total number of instructions 408 across all code paths 902, 716 (for the cluster 1502a), the instruction layout matrix 1706 initially includes one block 402 storing just one of the instructions 408 in one position 1506 of one line 1504.

Inclusivity Compatibility Phase

During the inclusivity line compatibility phase, the mapper 614 reduces the number of blocks 402 within the matrix 1706 required to store the instructions 408 by combining instructions in different lines 1504 in different blocks 402 into a single line 1504 of a single block 402. Starting with the initial values of the instruction layout matrix 1706, the mapper 614 determines one or more of the most compatible pairs of lines 1504 within the matrix 1706 based on the instructions 408 currently mapped to those lines 1504. In particular, this phase compatibility value is able to be based on the inclusivity of the pairs. Alternatively, the compatibility value is able to be based on one or more of the inclusivity, exclusivity, right exclusivity and/or left exclusivity of the pairs (e.g. see the heuristic algorithm described below). One of these pairs is then selected and one or more of the instructions 408 from one of the lines 1504 is moved into the other line 1504 of the pair. Thus, if all the instructions 408 are moved, the first line 1504 will be empty and the block 402 is able to be removed from the layout matrix 1706. These iterations of determining compatible pairs, combining instructions from the pairs and removing resulting empty blocks 402 are repeated until either no more lines/blocks are able to be combined, based on the logic capacity of the logic cloud 404/406, or based on the current number of blocks 402 within the matrix 1706 is less than or equal to the number of actual blocks 402 in the cluster 1502a.

Exclusivity Compatibility Phase

During the exclusivity compatibility phase, the mapper 614 reduces the number of blocks 402 within the matrix 1706 required to store the instructions 408 by combining instructions 408 in different lines 1504 in different blocks 402 into separate lines 1504 of a single block 402. Starting with the initial values of the instruction layout matrix 1706, the mapper 614 determines one or more of the most compatible pairs of lines 1504 within the matrix 1706 based on the instructions 408 currently mapped to those lines 1504. In particular, this phase compatibility value is able to be based on the exclusivity of the pairs. Alternatively, the compatibility value is able to be based on one or more of the inclusivity, exclusivity, right exclusivity and/or left exclusivity of the pairs. One of these pairs is then selected and one or more of the instructions 408 from one or more of the lines 1504 of one of the blocks 402 is moved into one or more unoccupied lines 1504 of the other block 402. Thus, if all the instructions 408 are moved from the first block 402 of the pair, the block 402 will be empty and is able to be removed from the layout matrix 1706. These iterations of determining compatible pairs, combining instructions from the pairs and removing resulting empty blocks 402 are repeated until either no more lines/blocks are able to be combined, based on the logic capacity of the logic cloud 404/406 or based on the current number of blocks 402 within the matrix 1706 is less than or equal to the number of actual blocks 402 in the cluster 1502a. If after the second phase the layout matrix 1706 still has more blocks 402 than are available in the cluster 1502a, the attempt has failed, the matrix 1706 is reset and a new attempt is started with a different set of mapping parameters as described below such that the new attempt creates a different layout than the failed attempt.

Compatibility Adjustment/Termination

In both the inclusivity and exclusivity phases, the mapper 614 performs the combinations based on one or more of a plurality of factors including a success criteria, cluster/block limitations, the relationship data from the relationship database 1700 and one or more mapping parameters. The success criteria is the requirement that at each iteration all the code paths 716 would be able to be implemented by executing just one line 1504 from one or more of the blocks 402. Therefore, any determined combination of lines/blocks of the matrix 1706 that would conflict with the success criteria is either disqualified or adjusted (e.g. by creating a new block and/or line with one or more instructions) such that the criteria is met. The block limitations comprise the number of blocks 402 and the max width and depth 1704 of the blocks 402 within the cluster 1502a. As described above, the mapper 614 updates block size matrix 1702d for each iteration and disqualifies any determined combination of lines/blocks of the matrix 1706 that would result in a block 402 of the layout matrix 1706 exceeding the max width or depth 1704. Similarly as described above, the mapper 614 ends the combining and/or the mapping process 1616 once the number of blocks 402 in the layout matrix 1706 is less than or equal to the number of blocks 402 in the cluster 1502a.

The relationship data 1700 comprises the (continuously updated) inclusivity, exclusivity, right exclusivity and left exclusivity of the lines/blocks of the layout matrix 1706. The mapper 614 uses this data 1700 to calculate the compatibility values of the possible pairs of lines/blocks in order to determine a set of the most compatible pairs from which one of the pairs is selected and combined. For example, the mapper 614 is able to plug one or more of the types of relationship data 1700 into one or more compatibility algorithms (described below) in order to calculate the compatibility values.

At the same time, the mapper 614 is able to adjust the compatibility algorithms, the determination of the set of most compatible pairs and/or which of the set of pairs is selected based on the mapping parameters: order, cfactor and relationship weights. The relationship weights are able to be incorporated into the algorithms in such a way to reduce or enlarge the effect/value of the inclusivity, exclusivity, right exclusivity and/or left exclusivity values and thereby affect the ultimate compatibility values produced by the algorithms. Thus, the values produced by the compatibility algorithms are able to be adjusted by varying the weight values. In some embodiment, the weight values comprise a first weight alpha that is multiplied with the inclusivity value, a second weight beta that is multiplied by the exclusivity value and a third weight gamma that is multiplied with the greater of the right and left exclusivity values. In some embodiments, the value of the relationship weights are adjusted based on the current number of iterations and/or attempts. For example, the mapper 614 is able to create one or more arrays of possible weight values, wherein the iteration and attempt numbers are used as indices to determine which value within the array is assigned to one or more of the weight values. Alternatively, a random number generator or other value variation means are able to be used to vary the weights based on iteration, attempt and/or other factors.

The cfactor mapping parameter is able to be used by the mapper 614 to determine a lower compatibility threshold below which the combinations are ceased. In other words, when determining the most compatible pairs of lines/blocks if the value for a pair is below the cfactor value the pair is disqualified. Thus, if all compatibility values of the pairs fall below the cfactor value, that phase of combining (inclusive or exclusive) is ended. In some embodiments, the same cfactor value is used as both the inclusive and exclusive combining threshold. Alternatively, the inclusive and exclusive combining are able to have separate thresholds. Similar to the relationship weights, the cfactor value is able to be varied in order to vary the mapping results. In some embodiments, the mapper 614 is able to create an array of size cFactorDim, wherein the iteration and/or attempt numbers are used to determine which value within the array is assigned to the cfactor (e.g. cfactor=cFactorArray[Attempt % cFactorDim]). In the case of separate values for inclusive and exclusive combining, two different arrays (e.g. cFactorArray and eFactorArray) are able to be created. Alternatively, a random number generator or other value variation means are able to be used to vary the cfactor value based on iteration, attempt and/or other factors.

The order mapping parameter is able to be used by the mapper 614 to determine which pair of the set of most compatible pairs of lines/blocks is selected to be combined. For example, the set of pairs are able to be ranked based on their compatibility values, wherein the order value is able to indicate what number of the ranking is selected (e.g. $1^{st}$, $2^{nd}$, last). Also, similar to the relationship weights and cfactor, the order value is able to be varied in order to vary the mapping results. In some embodiments, the mapper 614 is able to create an array having a predefined number of rows (numOrderRows) and columns (numOrderColumns), wherein the value that is picked as the order value for the attempt i and iteration j is Order[i % numOrderRows] [j % numOrderColumns]. In such embodiments, for an attempt or iteration value greater than the array dimension, the array wraps around and starts from the first value. Alternatively, a random number generator or other value variation means are able to be used to vary the order value based on iteration, attempt and/or other factors.

Thus, the mapping parameters are able to be used by the mapper 614 to adjust the layout determined each iteration and/or attempt in order to search for a layout that is able to fit in the cluster 1502a and meets the success criteria. In some embodiments, one or more of the mapping parameters are adjusted every iteration. Alternatively, the adjustments are able to be at every attempt, at every two iterations, or at any other attempt and/or iteration intervals. Additionally, the adjustment intervals are able to be different for two or more of the mapping parameters.

Relocatable Mapping Method

FIG. 18 illustrates a method of mapping relocatable instructions according to some embodiments. As shown in FIG. 18, the term "InstructionsCluster" is the selected cluster 1502a of instruction table blocks 402, "xpcode" is the instruction output file 1100 for the cluster 1502a, "attempt" is the current number of attempts that the mapper 614 has thus far performed and begun performing in order to map the cluster 1502a, the term "InstructionsCluster" is the cluster 1502a of instruction table blocks 402 with instructions 408 laid out, the term "InstructionTableAddresses" is a two-dimensional array whose rows represent code paths and columns represent addresses into instruction table blocks and the term "result" is a value that is true if an acceptable layout has been calculated.

The procedure begins at steps 1801, 1802 and 1803 where the mapper 614 creates a layout matrix 1706 with initial values as described above such that all of the instructions 408 from the instruction dictionary 1102 are placed in one line 1504 of one block 402 of the matrix 1706. The mapper 614 is then able to create the layout address matrix 1708 wherein the values correspond to the created layout matrix 1706 such that each code path row value of the matrix 1708 points to a line in one or more of the blocks 402 of the layout matrix 1706 where an instruction for that code path is stored/mapped at the step 1804. Similarly, the mapper 614 creates the relationship matrixes 1702 and the max size thresholds 1704 within the relationship database 1700 based on the instruction output file 1100 as described above at the step 1805. The mapper 614 initializes the numOfBlocks, which tracks the number of blocks being used, to be equal to the total number of instructions and the iteration to be equal to zero at the steps 1806 and 1807. The mapper 614 then determines if number of blocks currently being used in the layout matrix 1706 is less than or equal to the number of blocks in the cluster 1502a, and if so, proceeds to step 1812 at the step 1808. Also, the mapper 614 determines if the highest inclusivity compatibility of two selected blocks (based on the instructions within those blocks) is less than a cfactor threshold value of a cfactorarray (determined by the value at the index of Attempt % cFactorDim), and if so, proceeds to step 1812 at the step 1808.

It should be noted that the cfactor threshold value is able to be set sufficiently low that the highest inclusivity compatibility will always be greater that the value. In such cases, the combination process will continues based on highest inclusivity until no more combinations are possible or a combinational loop is reached wherein further combining outside of the loop is not possible. It should also be noted that in some embodiments, the cfactor threshold value is able to be based on the size of the logic cloud 404 and/or 406. Specifically, as the number of blocks in the current layout matrix 1706 is reduced, it increases the processing/networking capability required to implement the logic (e.g. sets of conditions 721) associated with the source code 98. As a result, in some embodiments the cfactor threshold value is based one or a combination of, in the cloud, the number of MuxLut cells 500, the number of BypassMuxes 502, the number of columns of cells 500, the number of input bits per multiplexor 504, the size of the LUT 506 for each cell 500, network connectivity constraints, the number of MuxXor cells 508, and/or the number of inputs per multiplexor 510 of the MuxXor cells 508. Generally, the greater the capacity of the cloud 404, 406, the smaller the cfactor threshold value is able to be.

Otherwise the mapper 614 proceeds to step 1809 where the mapper 614 combines two selected lines of instruction(s) 408 based on the cluster 1502a, the instruction addresses, the relationship databases 1700, the iteration and/or the attempt. In particular, step 1809 is described in detail in FIG. 19 below. At the steps 1810 and 1811, the mapper 614 increments the iteration value and returns to step 1808 such that steps 1808-1811 repeat until the conditions described in step 1808 are met. As described above, once the conditions of step 1808 are met, the mapper 614 proceeds to step 1812 where the iteration value is reset to zero. Then, similar to step 1808, the mapper 614 determines if the number of blocks currently being used in the layout matrix 1706 is less than or equal to the number of blocks in the cluster 1502a, and if so, proceeds to step 1817 at the step 1813. Also, the mapper 614 determines if the highest exclusivity compatibility of two selected blocks (based on the instructions within those blocks) is less than a cfactor threshold value of an efactorarray (determined by the value at the index of Attempt % eFactorDim), and if so, proceeds to step 1817 at the step 1813. Alternatively, the same array used for the inclusivity combining (i.e. cfactorarray and cFactorDim) is able to be used for the exclusivity combining.

Similar to above, it should be noted that the cfactor threshold value is able to be set sufficiently low that the highest exclusivity compatibility will always be greater that the value. In such cases, the combination process will continues based on highest exclusivity until no more combinations are possible or a combinational loop is reached wherein further combining outside of the loop is not possible. It should also be noted that in some embodiments, the cfactor threshold value is able to be based on the size of the logic cloud 404 and/or 406. Specifically, as the number of blocks in the current layout matrix 1706 is reduced, it increases the processing/networking capability required to implement the logic (e.g. sets of conditions 721) associated with the source code 98. As a result, in some embodiments the cfactor threshold value is based one or a combination of, in the cloud, the number of MuxLut cells 500, the number of BypassMuxes 502, the number of columns of cells 500, the number of input bits per multiplexor 504, the size of the LUT 506 for each cell 500, network connectivity constraints, the number of MuxXor cells 508, and/or the number of inputs per multiplexor 510 of the MuxXor cells 508. Generally, the greater the capacity of the cloud 404, 406, the smaller the cfactor threshold value is able to be.

Otherwise the mapper 614 proceeds to step 1814 where the mapper 614 combines two selected lines of instruction(s) 408 based on the cluster 1502a, the instruction addresses, the relationship databases 1700, the iteration and/or the attempt. In particular, step 1809 is described in detail in FIG. 19 below. At the steps 1815 and 1816, the mapper 614 increments the iteration value and returns to step 1813 such that steps 1813-1816 repeat until the conditions described in step 1813 are met. As described above, once the conditions of step 1808 are met, the mapper 614 proceeds to step 1817 where if the number of blocks currently being used in the layout matrix 1706 is less than or equal to the number of blocks in the cluster 1502a, or if the current number of attempts is greater than or equal to the maximum attempts allowed, the mapper 614 proceeds to step 1820 at the step 1817. Otherwise, the previous attempt has failed and the mapper 614 increments the attempt value and returns to step 1802 for the start of a new attempt at the steps 1818 and 1819. If instead, the mapper 614 reached step 1820, the mapper 614 returns the resulting layout if the number of blocks currently being used in the layout matrix 1706 is less than or equal to the number of blocks in the cluster 1502a meaning the attempt was successful at the steps 1820 and 1821. Although as described herein, the inclusivity combinations are performed before the exclusivity combinations, the reverse and/or a plurality of switching between the two combinations methods before reaching their stopping threshold is contemplated.

Inclusivity Compatibility Phase Combination Methods

FIG. 19 illustrates a detailed method of an inclusivity phase of combining instruction table lines 1809 according to some embodiments. As shown in FIG. 19, the term "InstructionsCluster" is the selected cluster 1502 of instruction table blocks, the term "InstructionTableAddesses" is a two-dimensional array whose rows represent code paths and columns represent addresses into instruction table blocks and the term "result" is a value that is true if an acceptable layout has been calculated, the term "RelationshipsDatabase" is the relationships database 1700, the term "Iter" is the current iteration of instruction/block combing of the current attempt, and the term "attempt" is the current number of attempts that the mapper 614 has thus far performed and begun performing in order to map the cluster 1502a.

The procedure begins at steps 1901 and 1902 where the mapper 614 begins and fetches a selected pair of the most compatible sets of instructions 408 mapped to different blocks 402 in the current configuration of the layout matrix 1706. The mapper 614 combines the fetched pair to form a new instruction block 402 including at least a partial combination of the two sets of instructions 408 at the steps 1903 and 1904. For example, some or all of the instructions 408 on each of the blocks 402 are able to be moved onto the new block. Alternatively, instead of creating a new block, some or all of the instructions 408 on one of the blocks 402 are able to be moved onto the other block 402 of the selected pair. The mapper 614 then updates the values for the code paths in the layout matrix 1706 of the relationship database 1700 to reflect the new block locations of the instructions 408 after the combination at the step 1905. At the step 1906, the mapper 614 determines if any blocks or columns within the layout matrix 1706 of the relationship database 1700 are now unused and deletes the unused blocks/columns. The mapper 614 then updates the values for the code paths in the various matrixes of the relationship database 1700 to reflect the changes to the layout matrix 1706 including any deleting of blocks/columns 402 at the step 1907. Finally, the mapper 614 returns the updated relationship database 1700 after the combination and ends the combination process for that iteration at the steps 1908 and 1909.

FIG. 20 illustrates a detailed method of the step of determining and selecting one of the most inclusivity compatible instruction table lines 1902 according to some embodiments. As shown in FIG. 20, the term "RelDbase" is the relationship database 1700 and the matrixes therein, the term "Iter" is the current iteration of instruction/block combining of the current attempt, and the term "attempt" is the current number of attempts that the mapper 614 has thus far performed and begun performing in order to map the cluster 1502a.

The procedure begins at steps 2001 and 2002 where the mapper 614 determines the size (PathForward) of a Best-Hashes Array based on the value of an Order Array (Params.Order) at the indices corresponding to the current attempt and iteration. The mapper 614 then creates the BestHashes Array having the determined size for storing compatibility values of the pairs of sets of instructions (in the blocks 402) having the highest compatibility such that the values of the most compatible pairs occupy the positions within the BestHashes Array at the step 2003. Additionally, the mapper 614 creates corresponding FirstOfPair and SecondOfPair Arrays having the determined size for storing representations of or the actual pairs of sets of instructions (in the blocks 402) that correspond to the compatibility values stored in the BestHashes Array. Thus, the PathForward value (based on the order array) determines the lowest rank of compatibility values/pairs that will be stored in the created Arrays. The BestHashes Array is able to be initially filled with the lowest possible compatibility values and the "pair" arrays are filled with null or "none" values.

After the arrays are created, for each possible combination or pair of the sets of instructions of the blocks 402 of the layout matrix 1706, if the mapper 614 determines that the combination of the pair results in a new instruction set having more instructions 408 than fit within the positions 1506 of a single line 1504 of the blocks 402, as indicated by the max width allowed 1704, the mapper 614 proceeds to step 2009, at the steps 2004-2006. Otherwise, the mapper 614 proceeds to step 2007 where the mapper 614 computes the Hash or compatibility value for the current selected pair (i,j) based on the compatibility algorithm (CompatibilityHash which is adjusted by the iteration and/or attempt as described in FIG. 21). Based on the computed Hash value, the mapper 614 determines of the Hash value is greater than the lowest Hash value in the BestHashes Array, or in the case that the computed Hash value has the same value as the lowest Hash value, the mapper 614 determines if the number of instructions in the current pair (e.g. number of instructions in set i plus number of instructions in set j) is greater than the number of instructions of the pair having the lowest Hash value at the step 2008. If either case is true, the mapper 614 replaces the lowest Hash value with the computed Hash value for the current pair in the BestHashes Array, and replaces the sets of instructions corresponding to the replaced pair in the FirstOfPair and SecondOfPair Arrays with the sets of instructions corresponding to the selected pair having the computed Hash value. Thus, the mapper 614 ensures that the top Hash values (and corresponding pairs) are stored in the Arrays with the lowest value being replaced by any pair determined to have a higher value as it evaluates all the possible pairs.

At steps 2009 and 2010, the mapper 614 determines if the current set of instructions j or i is the last of the sets of instructions (j or i<RelDbase.NumOfInstructions), and if so, returns to step 2005 or 2004, respectively. Specifically, steps 2009 and 2010 combined with steps 2004 and 2005 cause the mapper 614 to cycle through all the possible pairs (performing steps 2007 and 2008 on each possible pair) by going through the permutations of possible every i combined with every possible j. Thus, after all of the pairs have been evaluated in steps 2004-2010, the mapper 614 finishes the method and selects the pair of sets of instructions and the associated compatibility value that is the lowest of those stored in the Arrays at the steps 2011 and 2012. In particular, based on the Order array value which determines the size of the Arrays and thus the rank of the lowest compatibility value stored in the Arrays, the mapper 614 is able to select the highest compatibility value (if the size of the Arrays is 1) and associated pair or the second highest value (if the size of the Arrays is 2) or any other rank value based on the size of the Arrays created. Accordingly, the method of FIG. 20 provides the benefit of adjusting which pairs are selected based on the current attempt and/or iteration via the PathForward value.

FIG. 21 illustrates a detailed method of the step 2007 of calculating the Hash or compatibility value of a pair according to some embodiments. As shown in FIG. 21, the term "RelDbase" is the relationship database 1700 and the matrixes therein, the term "Iter" is the current iteration of instruction/block combining of the current attempt, the term "attempt" is the current number of attempts that the mapper 614 has thus far performed and begun performing in order to map the cluster 1502a, the term "i" is the first set of instructions of the selected pair, and the term "j" is the second set of instructions of the selected pair.

The procedure begins at steps 2101 through 2104 where the mapper 614 begins by calculating the relationship weights alpha, beta and gamma based on predefined values indicated by attempt and/or iteration indices within corresponding alpha, beta and gamma arrays. The mapper 614 then determines the inclusivity of the pair (i, j) based on the relationships matrix 1702b of the relationship database 1700 at the step 2105. Similarly, the mapper 614 determines the right and left exclusivity of the pair (i, j) based on the exclusivity matrix 1702c of the relationships database 1700 and equates a HigherExc value to the greater of the right and the left exclusivity in the steps 2106 and 2107. Alternatively, in some embodiments, the mapper equates the HigherExc value to the difference between the right and left exclusivity. Finally, based on the computed relationship weights, the inclusivity, the exclusivity and the HigherExc value (the greater of right or left exclusivity), the mapper 614 computes and returns the hash or compatibility value for the pair at the steps 2108, 2109 and 2010. Specifically, one or more of the weights are able to be multiplied with the inclusivity, exclusivity and right/left exclusivity values in order to adjust the determined compatibility value. For example, as shown in FIG. 21, alpha and gamma are able to increase or decrease the value of the inclusivity and right/left exclusivity, and beta is able to do the same for the difference between the total number of code paths minus the number of those code paths that are exclusive for the selected pair. Accordingly, the method is able to calculate a hash or compatibility value for each of the pairs, wherein the value produced is able to be adjusted each attempt and/or iteration based on the attempt and/or iteration value.

Inclusivity Compatibility Phase Combination Examples

Figure 23:
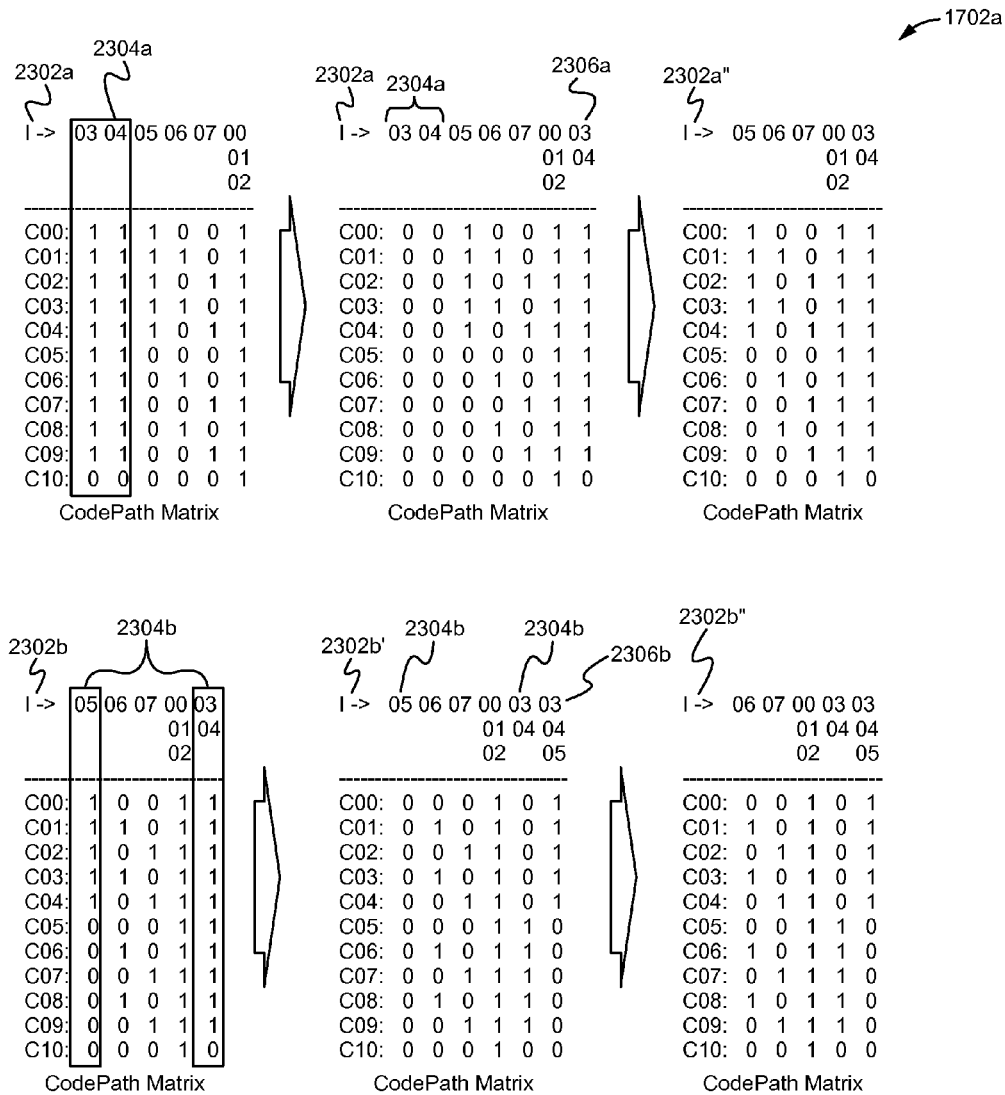
FIG. 23 illustrates a set of exemplary changes to the code path matrix during two iterations of the block/instruction combination process according to some embodiments.

FIGS. 22 and 23 illustrate a set of exemplary changes to the code path matrix 1702a during four iterations of block/instruction combination process according to some embodiments. As shown in FIG. 22, during a first iteration a pair of sets of instructions (as determined by their compatibility) 2204a is selected from the current code path matrix 2202a for combination. This pair 2204a is combined to create a new set of instructions (00, 01) wherein the sets of the original pair 2204a are emptied (set to all zeros) as shown from the code path matrix 2202a'. Finally, the iteration is completed by removing the resulting blocks having all zeros as values resulting in the updated code path matrix 2202a''. Alternatively, instead of creating a new column/block, one of the blocks forming the pair are able to be used for the combined set of instructions. As also shown in FIG. 22, during a second iteration a second pair of sets of instructions (as determined by their compatibility) 2204b are selected from the updated code path matrix 2202b for combination. This pair 2204b is similarly combined to create a new set of instructions (00, 01, 02) wherein the sets of the original pair 2204b are emptied (set to all zeros) as shown from the code path matrix 2202b'. Finally, the second iteration is completed by removing the resulting blocks having all zeros as values resulting in the updated code path matrix 2202b''. As is apparent from FIG. 22, during the combinations of the blocks, any code paths where the values for the pair of sets of instructions are the same or shared (i.e. both are a "1" or a "0") are able to be combined into a single value "1" or "0" in the new or combined blocks for those code paths. Thus, if there is 100 percent value sharing for a pair a block will be eliminated by the combination.

As shown in FIG. 23, during a third iteration a pair of sets of instructions (as determined by their compatibility) 2304a is selected from the current code path matrix 2302a for combination. This pair 2304a is combined to create a new set of instructions (03, 04) wherein like the previous iterations the sets of the original pair 2304a are emptied (set to all zeros) as shown from the code path matrix 2302a'. Finally, the iteration is completed by removing the resulting blocks having all zeros as values resulting in the updated code path matrix 2302a''. It is noted, that in this iteration the first two blocks (03 and 04) are chosen for combining instead of the last block (00, 01, 02) because the exclusivity of the last code path (C10) between either of the first two blocks (03 or 04) and the last block (00, 01, 02) lowers their compatibility below that of the selected pair (03, 04). As also shown in FIG. 23, during a fourth iteration a pair of sets of instructions (as determined by their compatibility) 2304b are selected from the updated code path matrix 2302b for combination. This pair 2304b is combined to create a new set of instructions (03, 04, 05) wherein the sets of the original pair 2304b are partially emptied (set to zeros) as shown from the code path matrix 2302b'. However, because as noted above only code paths that have the same value (0 or 1) for sets of instructions are able to be combined to a single value (0 or 1), only the values for code paths C00-C04 and C10 are able to be combined into a single value in the new block 2306b and removed from the previous blocks 2304b.

The result is that only one of the blocks 2304b is completely emptied such that it is able to be removed as shown in the updated code path matrix 2302b''. It should also be noted that in this exemplary fourth iteration, the blocks (00, 01, 02) and (03, 04) were not selected as the pair to be combined because the resulting combined block (00, 01, 02, 03, 04) would have too many instructions 408 such that it would exceed the width threshold 1704 of 4. Accordingly, the pair 2304b was instead selected as it was the highest compatibility pair that would result in a block (03, 04, 05) having a width of less than or equal to 4 (i.e. 3). As apparent from the fourth iteration of FIG. 23, when at least one of the code paths has values are not the same or shared for the pair (meaning the pair has at least partial exclusivity), a block will not be eliminated because the unshared instruction(s) will remain in the previous block such that it is not fully emptied. Indeed, if the lack of code path sharing (exclusivity) is found for both sides of the pair (meaning the pair has at least partial right and left exclusivity), a block will be added because the unshared instruction(s) will remain from both previous blocks of the pair such that they are both not fully emptied. As a result, the consideration of the mapper 614 of the shared code path values (e.g. inclusivity if shared "1s"), the non-shared code path values (e.g. exclusivity) and/or the difference between and/or the greater of the right and left exclusivity is highly beneficial as it is able to reduce the number of blocks added by the selected pair combinations.

Additionally, it is understood that although the changes to the code path matrix 1702a in FIGS. 21 and 22 are shown for the sake of clarity, these changes are the result of mapping changes to the layout matrix 1706 (based on the code path matrix 1702a) wherein the code path matrix 1702a (and the other matrixes of the relationship database 1700) is updated to reflect the changes to the layout matrix 1706.

Exclusivity Compatibility Phase Combination Methods

FIG. 24 illustrates a detailed method of an exclusivity phase of combining instruction table lines 1809 according to some embodiments. As shown in FIG. 19, the term "InstructionsCluster" is the selected cluster 1502 of instruction table blocks, the term "InstructionTableAddesses" is a two-dimensional array whose rows represent code paths and columns represent addresses into instruction table blocks and the term "result" is a value that is true if an acceptable layout has been calculated, the term "RelationshipsDatabase" is the relationships database 1700, the term "Iter" is the current iteration of instruction/block combining of the current attempt, and the term "attempt" is the current number of attempts that the mapper 614 has thus far performed and begun performing in order to map the cluster 1502a.

The procedure begins at steps 2401 and 2402 where the mapper 614 begins and fetches a selected pair of the most compatible sets of instructions 408 based on exclusivity mapped to different blocks 402 in the current configuration of the layout matrix 1706. The mapper 614 combines the fetched pair to form a new instruction block 402 including a plurality of lines 1504 separately being mapped with the sets of instructions 408 of the lines 1504 from the pair of blocks 402 at the steps 2403 and 2404. For example, some or all of the lines of instructions 1504 on each of the blocks 402 are able to be moved onto separate lines on the new block 402. Alternatively, instead of creating a new block, some or all of the lines of instructions 1504 on one of the blocks 402 are able to be moved onto the other block 402 of the selected pair. Unlike the inclusivity phase combinations, these combinations do not combine instructions 408 from different blocks 402 into the same line on a new block, rather it adds each instruction line 1504 to a separate unoccupied instruction line on the new block.

The mapper 614 then updates the values for the code paths in the layout matrix 1706 of the relationship database 1700 to reflect the new block locations of the lines of instructions 1504 after the combination at the step 2405. At the step 2406, the mapper 614 determines if any blocks or columns within the layout matrix 1706 of the relationship database 1700 are now unused and deletes the unused blocks/columns. The mapper 614 then updates the values for the code paths in the various matrixes of the relationship database 1700 to reflect the changes to the layout matrix 1706 including any deleting of blocks/columns 402 at the step 2407. Finally, the mapper 614 returns the updated relationship database 1700 after the combination and ends the combination process for that iteration at the steps 2408 and 2409.

FIG. 25 illustrates a detailed method of the step of determining and selecting one of the most exclusivity compatible instruction table lines 2402 according to some embodiments. As shown in FIG. 25, the term "RelDbase" is the relationship database 1700 and the matrixes therein, the term "Iter" is the current iteration of instruction/block combining of the current attempt, and the term "attempt" is the current number of attempts that the mapper 614 has thus far performed and begun performing in order to map the cluster 1502a.

The procedure begins at steps 2501 and 2502 where the mapper 614 determines the size (PathForward) of a MostExc Array based on the value of an Order Array (Params.Order) at the indices corresponding to the current attempt and iteration. The mapper 614 then creates the MostExc Array having the determined size for storing compatibility values of the pairs of sets of instructions (in the blocks 402) having the highest compatibility such that the values of the most compatible pairs occupy the positions within the MostExc Array at the step 2503. Additionally, the mapper 614 creates corresponding FirstOfPair and SecondOfPair Arrays having the determined size for storing representations of or the actual pairs of sets of instructions (in the blocks 402) that correspond to the compatibility values stored in the MostExc Array. Thus, the PathForward value (based on the order array) determines the lowest rank of compatibility values/pairs that will be stored in the created Arrays. The MostExc Array is able to be initially filled with the lowest possible compatibility values and the "pair" arrays are filled with null or "none" values.

After the arrays are created, for each possible pair of blocks (or the lines of the sets of instructions currently mapped to the blocks 402) of the layout matrix 1706, if the mapper 614 determines that the combination of the pair of blocks results in a new block having more lines 1504 than fit within the blocks 402 of the cluster 1502a, as indicated by the max depth allowed 1704, the mapper 614 proceeds to step 2510, at the steps 2504-2506. Otherwise, the mapper 614 proceeds to step 2507 where it determines of the inclusivity value for the current selected pair (i,j) based on the relationships matrix 1702b is equal to zero. If the inclusivity is equal to zero the mapper 614 proceeds to step 2510, otherwise it proceeds to step 2508. As the step 2508, the mapper 614 equates an element Exc with the value of the exclusivity of the current selected pair (i, j) based on the exclusivity matrix 1702c. Then at the step 2509, the mapper 614 determines if the Exc value is greater than the lowest Exc value in the MostExc Array. If so, the mapper 614 replaces the lowest Exc value with the computed Exc value for the current pair in the MostExc Array, and replaces the blocks or lines of sets of instructions corresponding to the replaced pair in the FirstOfPair and SecondOfPair Arrays with the blocks or lines of sets of instructions corresponding to the selected pair having the computed Exc value. Thus, the mapper 614 ensures that the top Exc values (and corresponding pairs) are stored in the Arrays with the lowest value being replaced by any pair determined to have a higher value as it evaluates all the possible pairs.

At steps 2510 and 2511, the mapper 614 determines if the current set of instructions j or i is the last of the sets of instructions (j or i<RelDbase.NumOfInstructions), and if so, returns to step 2505 or 2504, respectively. Specifically, steps 2510 and 2511 combined with steps 2504 and 2505 cause the mapper 614 to cycle through all the possible pairs by going through the permutations of possible every i combined with every possible j. Thus, after all of the pairs have been evaluated in steps 2504-2511, the mapper 614 finishes the method and selects the pair of blocks or lines of sets of instructions and the associated compatibility value that is the lowest of those stored in the Arrays at the steps 2512 and 2513. In particular, based on the Order array value which determines the size of the Arrays and thus the rank of the lowest compatibility value stored in the Arrays, the mapper 614 is able to select the highest compatibility value (if the size of the Arrays is 1) and associated pair or the second highest value (if the size of the Arrays is 2) or any other rank value based on the size of the Arrays created. Accordingly, the method of FIG. 25 provides the benefit of adjusting which pairs are selected based on the current attempt and/or iteration via the PathForward value.

Exclusivity Compatibility Phase Combination Examples

Figure 26:
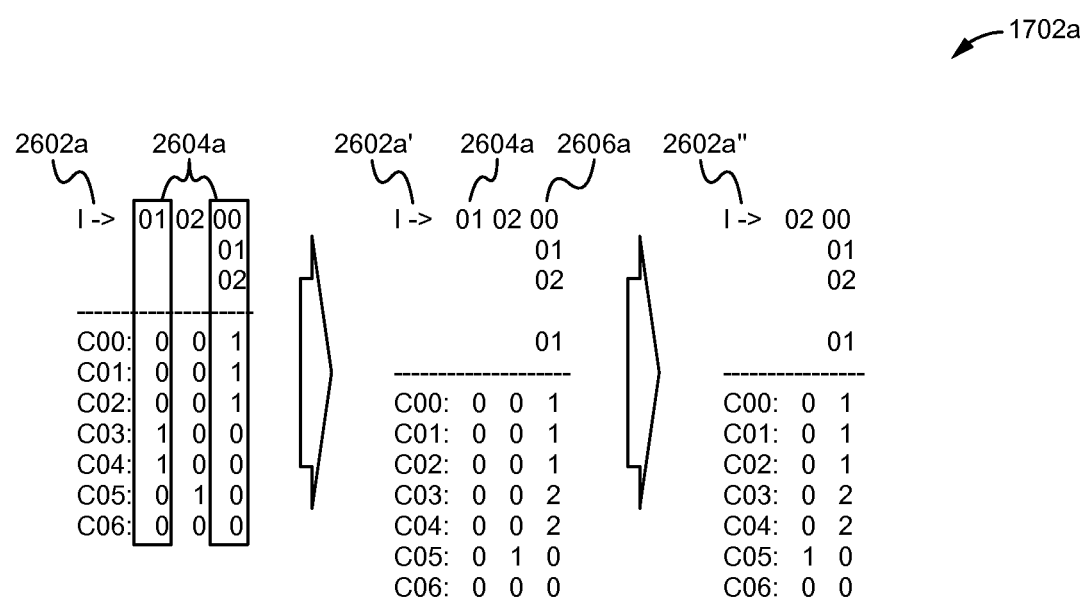
FIG. 26 illustrates a set of exemplary changes to the code path matrix during an iteration of the block/instruction combination process according to some embodiments.

FIG. 26 illustrates a set of exemplary changes to the code path matrix 1702a during an iteration of block/instruction combination process according to some embodiments. As shown in FIG. 26, during the iteration a pair of blocks 2604a (as determined the exclusivity compatibility of the instructions mapped to the lines of the blocks) is selected from the current code path matrix 2602a for combination. This pair 2604a is combined by adding one or more of the lines/instructions (01) from one block of the pair 2604a to the other block of the pair 2604a such that the other block includes the added lines/instructions (01) in one or more separate lines 1504 from its existing lines/instructions. Specifically, as shown from the code path matrix 2602a', the instruction (01) of the first block is added to the second line of last block (as indicated by the values "2") such that the first block is emptied and the second block includes the instructions (00, 01, 02) in the first line and the instruction (01) in the second line. Finally, the iteration is completed by removing all the resulting blocks having all zeros as values creating the updated code path matrix 2602a''. Alternatively, instead of modifying one of the blocks of the pair 2604a, a new block is able to be created wherein the lines of instructions 1504 from both blocks of the pair 2604a are moved to different lines of the new block. In either case, care must be taken to update the address matrix 1708 (along with the other matrixes of the database 1700) to reflect the new blocks and/or lines where the instructions 408 are stored or mapped to after the block combination. For example, in the first iteration above, code paths C03 and C04 must be altered in the address matrix 1708 to reference line 2 of the last/modified block instead of line one of the first block. Further, similar to the width threshold 1704 consideration for the inclusivity phase combinations, the depth threshold 1704 is considered during the exclusivity phase combinations such that if a combination would cause the modified/new block to have more lines than the threshold the combination is not selected.

2. Non-Relocatable Mapping

Non-relocatable mapping is the process performed by the mapper 614 of determining the locations (e.g. blocks, lines, positions) within a non-relocatable cluster 1502b where instructions 408 are required to be mapped based on their characteristics and mapping the instructions to those locations. Specifically, the mapper 614 is able to lookup the desired block and/or position of an instruction 408 within the symbol database 710 based on the left hand side (LHS) symbol of the assignment statement and then map the instruction 408 to that block and/or position. In general, a single code path will have only one of each kind of non-relocatable instruction because only one designated place exists for the instruction to go into. However, there are able to be some exceptions. Specifically, for a Mirror Mask destination, the mapper 614 is able to collapse multiple assignment statements to one effective statement. For example, two assignment statements for a Mirror Mask are Mirror Mask=1 and Mirror Mask |=2, the mapper 614 is able to collapse the statements in the same code path into the single statement Mirror Mask=3. Additionally, assignments are able to reset all previous assignments and ORs. For example, for the statements Mirror Mask=1, Mirror Mask |=2, Mirror Mask=4 and Mirror Mask |=1, the mapper 614 is able to collapse the statements in the same code path into the single statement Mirror Mask=5.

Therefore, the instruction table mapper module 614 is able to provide the advantage of determining an acceptable mapping layout for a plurality of instructions 408 that will fit within the available blocks 402 of the instruction tables while maintaining the success criteria that each code path of the source code 98 is able to be implemented by selecting and executing the instructions within just one line from one or more of the blocks.

Logic Generator and Minimizer Modules

The logic generator module 616 provides the function of, for each bit 726 of the code path block addresses 725, generating a bit expression such that the expressions together form a bit file 728. Specifically, the generator module 616 is able to use a boolean OR operation to logically combine all of the sets of conditions 721 (as ANDed together) of the code paths 716 that utilize a bit 726 (as indicated by their block addresses 725) to create the bit expression for that bit 726. For example, as shown in FIG. 7G, as indicated by the bits b3, b4 and b5 of the block address 725 for block1, the code paths 1-3 all utilize line 1 of block1 (binary 001=1), which stores the assignment or instruction "X=2" as shown in FIG. 7F. In particular, bit b3 of the block1 address 725 is a 1 for the code paths 1-3. As a result, the set of conditions 721 associated with each of the code paths 1-3 are logically ORed together by the generator 616 to form a bit expression for b3 that represents all of the combinations of inputs that need to result in b3 being equal to 1 (which combined with the other bit expressions, e.g. b4 and b4, will cause the instruction in line 1 of block1 to be executed when b3=1, and b4 and b5=0). These bit expressions together for all of the block addresses 725 form a bit file 728 that includes an expression for each of the bits of the addresses 725. If a bit 726 is 1 for the address 725 of all of the code paths 716, the ORed expression is able to be replaced with a constant value 1 (or 1'b1). Similarly, if a bit 726 is 0 for the address 725 of all of the code paths 716, the ORed expression is able to be replaced with a constant value 0 (or 1'b0). FIG. 7G illustrates the generation of an exemplary bit file 728 for the addresses 725 described in the previous FIG. 7F according to some embodiments.

Figure 27:
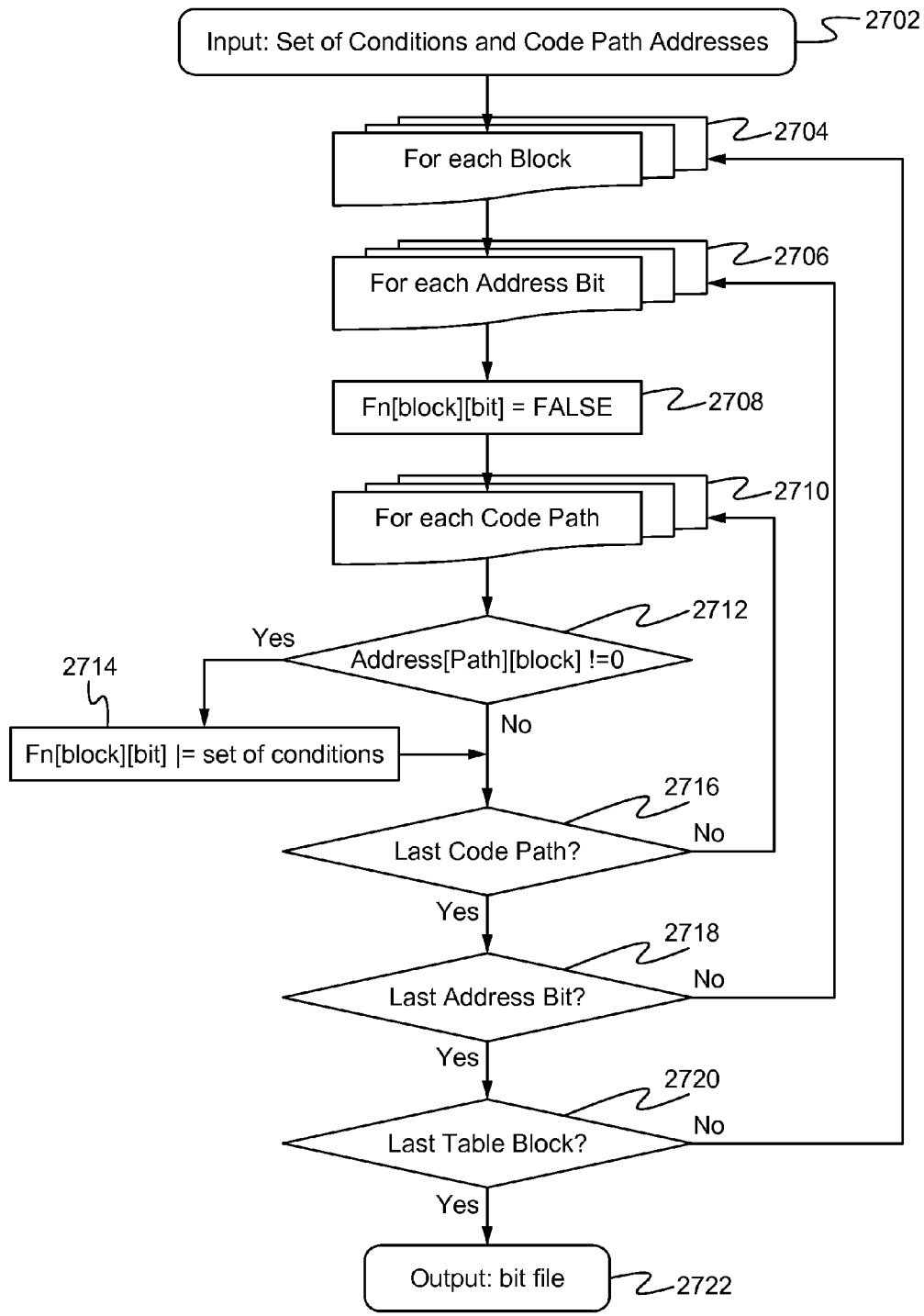
FIG. 27 illustrates a method of generating a bit file according to some embodiments.

FIG. 27 illustrates a method of generating a bit file according to some embodiments. As shown in FIG. 27, the logic generator 616 inputs the code path addresses 725 and the set of conditions 721 associated with each of the code paths at the step 2702. In steps 2704-2708, for each bit of the address for each block 402, a bit expression for the selected bit is initialized to false. Then at the steps 2710 and 2712, for each code path 716 the value of the selected bit 726 of that code path's address is determined. If the bit value is zero the method continues to step 2716. Alternatively, if the bit value is not zero, the set of conditions 721 associated with the selected code path 716 is assigned to the bit expression for the selected bit at the step 2714. In either case, at the step 2716 it is determined if the selected code path 716 is the last code path or if there are any remaining code paths. If it is determined that there are remaining code paths 716, steps 2710-2714 are repeated until all the code paths 716 have been selected and it is determined that the selected code path 716 is the last code path. During these code path iterations (steps 2710-2716), any additional set of conditions 721 associated with selected code paths 716 after an initial assigned set of conditions 721 are ORed with the existing bit expression (e.g. the conditions 721 from previous iterations) in the step 2714. Thus, once all the code paths 716 have been selected and their associated condition sets 721 added to the bit expression is necessary, a completed bit expression is generated for the selected bit 726.

It is then determined if the selected bit 726 is the last bit or if there are any remaining bits 726 of the portion of the address 725 associated with the selected block 402 at the step 2718. If it is determined that there are remaining bits 726, steps 2710-2718 are repeated until the selected address bit 726 is the last bit 726 for the selected block 402. It is then determined if the selected block 402 is the last block 402 or if there are any remaining blocks 402 at the step 2720. If it is determined that there are remaining blocks 402, steps 2710-2720 are repeated until the selected block 402 is the last block 402. Consequently, the bit expressions for each address bit 726 of each block 402 are able to be combined in a list to form an output bit file 728 at the step 2722. In some embodiments, the method is able to further comprise submitting the output bit file 728 to the logic minimizer 618, which logically minimizes each of the bit expressions based on the set of conditions 721 forming them and returns a minimized bit file 728' including a list of minimized bit expressions.

The logic minimizer module 618 provides the function of simplifying the boolean or bit expressions created for each bit 726 in the bit file 728 by the logic generator module 616 thereby creating a minimized bit file 728'. For example, as shown in FIG. 7H, the logical expressions for bits b0, b1 and b3 are able to be logically reduced to a AND b, a AND !b AND c, and a, respectively. As a result, the logic minimizer module 618 is able to provide the advantage of minimizing the logical expressions that need to be mapped to the hardware (e.g. cells 500, 508, BypassMuxes 502) thereby freeing some of the hardware components to perform other operations. In some embodiments, the minimizer module 618 is able to be a pluggable module outside of the compiler such that the compiler outputs the bit file 728 to the pluggable minimizer module 618 and receives back the minimized bit file 728'. Alternatively, the minimizer module 618 is able to be a part of the compiler. In some embodiments, the logic minimizer 618 logically minimizes one or more of the bit expressions by combining a plurality of the bit expressions that are logically equivalent such that a plurality of the bits 726 are represented by a single bit expression. For example, the bit expressions for a plurality of the bits 726 are able to be combined in the same manner as the inclusivity and/or exclusivity combining process described above. In some embodiments, the compiler is able to comprise a script that transfers the bit file 728 to the logic minimizer module 618 along with a script that invokes the minimizer such that the logic minimizer 618 returns the minimized bit file 728'. In some embodiments, the minimized bit file 728' is returned by the minimizer 618 as truth tables in a BLIF format (e.g. BLIF file). The compiler is then able to be parse the BLIF file generated by the logic minimizer module 618 in order to create the truth tables stored in the BLIF file.

MuxLut Value Generator

The MuxLut value generator 620 provides the function of taking the minimized logical expressions from the minimized bit file 728' (e.g BLIF file) and generating the required values that need to be mapped or stored in the components of the logic cloud 404, 406 to implement the logical expressions (and therefore the conditions 717 of the source code 98). Specifically, based on the bit expressions of the bit file 728', the value generator 620 is able to determine the values for the Muxes 502, 504, 510 by translating the input symbol names from the conditions 717 that need to be selected (within the logical bit expressions) using the symbol control path database 708 and using the muxes absolute bit indices. In other words, the MuxLut value generator 620 is able to create a MuxLut cell 500 for each of the truth tables or minimized logical expressions in the minimized bit file 728' and comes up with configuration values for each of the six Muxes 504 of the cell 500 and the LUT 506 to implement the binary logic function represented by the truth table (and therefore the conditions 717 of the source code 98).

Figure 7I:
FIG. 7I illustrates an exemplary mapping of a plurality of multiplexor lookup table cells according to some embodiments.

For example, as shown in FIG. 7I, for bit0 the logical bit expression (including the minimized set of conditions 721 for used code paths) indicates that symbols a and b are referenced such that the value generator 620 assigns the locations (as indicated in the database 708) of symbols a and b to inputs Mux0 and Mux1 730 of the multiplexer 502, and the same is done for the remaining bits 726. In some embodiments, each bit expression of the bit file 728' is performed by a single multiplexer 502 or MuxLut cell 500. Alternatively, two or more bit expressions are able to be assigned to the same MuxLut cell 500 and/or single bit expressions are able to be performed by a combination of MuxLut cells 500. As also shown in FIG. 7I, in order to generate LUT 506 values that correspond to the bit expression, the value generator 620 starts with all zeroes and then puts a 1 in the indices indicated by the bit values of the inputs 730 as determined by the binary logical expression mapped to the input 730 as described above. For example, for the bit expression of b0, it is indicated that the output should only be a 1 if the variables a and b (in this case inputs Mux0 and Mux1) are both equal to 1. As a result, because Mux0 and Mux1 both being equal to 1 corresponds to the fourth value of the LUT 506, the LUT 506 is populated with values such that the fourth value is assigned a 1. If an LUT 506 is being referenced by fewer than 6 bits (e.g. fewer than all six multiplexor inputs 730 are being used), the same pattern is able to be repeated as many times as needed to fill the LUT 506 such that for b0 every fourth value is set to 1. Additionally, if as described above the minimized logical expression was reduced to a 1 (because all code paths 716 used the bit 726) then all of the LUT 506 values are able to be set to 1 such that a 1 will always be output.

Logic Cloud Mapper

The logic cloud mapper 622 provides the function of assigning each MuxLut cell 500 whose logic values were generated by the value generator 620 a position in the two dimensional array of MuxLut cells 500 in the Logic Cloud 404 such that the cells 500 satisfy the constraints of all their active condition variable inputs (the source of their data) and their outputs (the destination of their data). Fox example, a MuxLut cell 500 that uses the output of another MuxLut cell 500 as one of its inputs can only be placed in a stage towards the right of the latter MuxLut cell 500. Conversely, a MuxLut cell 500 whose output is being used as an input by another MuxLut cell 500 is only able to be placed in a stage to the left of the latter MuxLut cell 500. As a result, when necessary the logic cloud mapper 622 assigns and utilizes one or more BypassMuxes 502 to route signals within the logic cloud 404 from where they are available to where they are needed. For example, the cloud mapper 622 is able to "walk" the MuxLut cells 500 from the rightmost (output) stage to the leftmost (input) stage of the matrix, wherein for each stage, if there is a MuxLut cell 500 that needs an input that is not available in the previous stage, a BypassMux 502 is used in the previous stage to transmit the needed value to the associated MuxLut cell 500 in the next or subsequent stages. As the cloud mapper 622 walks backwards, the BypassMuxes 502 previously assigned and utilizes will themselves need to resolve their input signal needs (in the same manner as the MuxLut cells 500) and in some cases another BypassMux 502 is assigned and utilized by the mapper 622. This process continues until a stage is reached where the needed signal is available or the input stage is reached (wherein the signal should be available). As a result, once all of the input/output needs have been resolved, the cloud 404 is fully mapped such that the cloud 404 is able to implement the logical expressions (of the source code 98) programmed into the cells 500.

Figure 30:
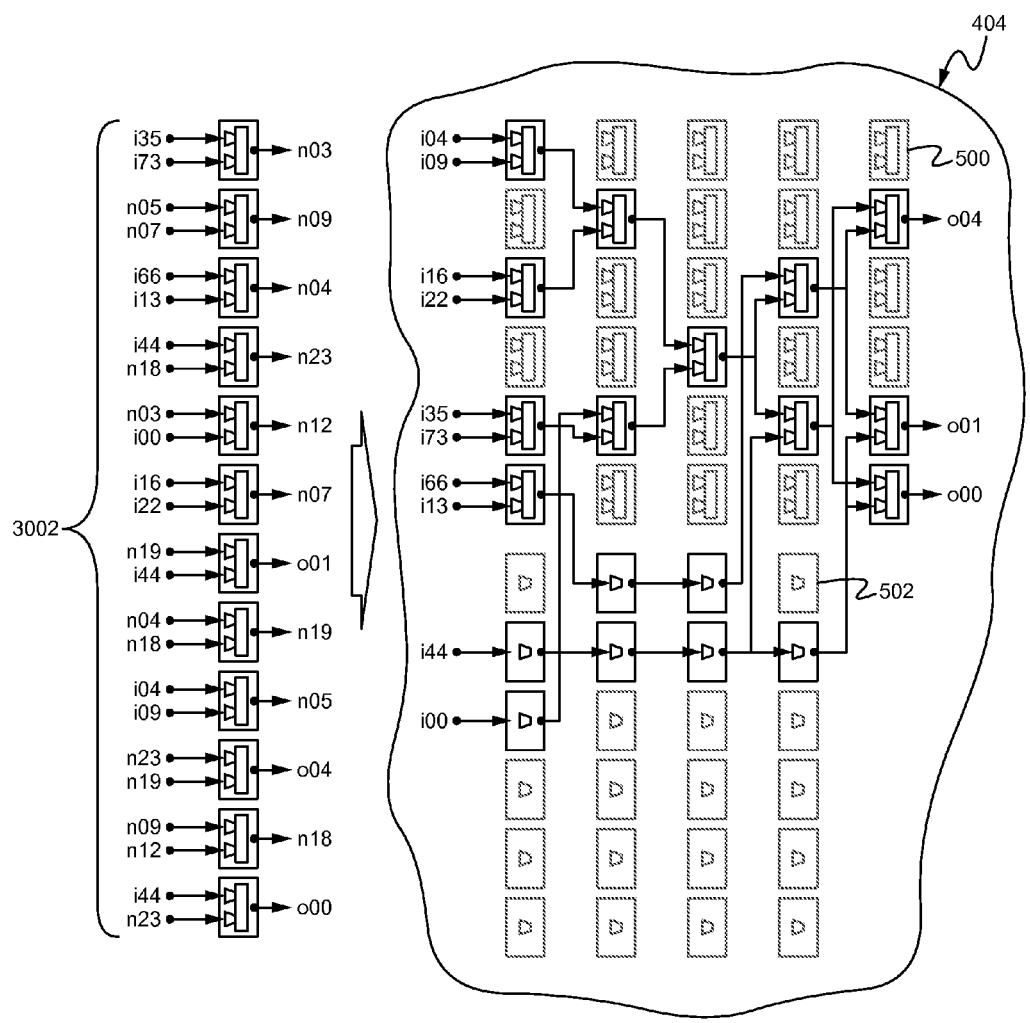
FIG. 30 illustrates a list of MuxLut functions and an associated possible mapping and routing of those functions to MuxLuts within the logic cloud according to some embodiments.

FIG. 30 illustrates an exemplary list of MuxLut functions 3002 and an associated possible mapping and routing of those functions 3002 to MuxLuts 500 within the logic cloud 404 according to some embodiments. As shown in FIG. 30, each of the truth tables associated with one of the minimized logic expressions 728' are able to be listed a MuxLut function within the list of the MuxLut functions 3002. In particular, the list of MuxLut functions 3002 represents all of the functions that need to be mapped to a MuxLut 500 within the grid of MuxLuts within the logic cloud 404 using the BypassMuxes 502 if necessary for signal routing between non-adjacent columns of the grid. Although FIG. 30 illustrates twelve functions mapped to a 5×5 grid of MuxLuts 500 and a 4×6 grid of BypassMuxes 502, more of less functions mapped to different sized MuxLut and/or BypassMux grids are contemplated. Additionally, although as shown in FIG. 30 each of the MuxLut cells 500 comprise two inputs (e.g. two muxes 504), one or more of the MuxLut cells 500 are able to have more or less inputs and/or different numbers of inputs from other MuxLut cells 500.

The list 3002 includes functions whose inputs refer to primary inputs into the logic cloud (e.g. inputs received from outside the logic cloud 404) as well as those whose inputs refer to the outputs of other functions (e.g. inputs received from other MuxLuts 500 or BypassMuxes 502 within the logic cloud 404). Similarly, there are functions whose outputs are intermediate results (e.g. output to other MuxLuts 500 or BypassMuxes 502 within the logic cloud 404) as well as functions whose outputs are final/primary outputs to be output out of the logic cloud 404 (e.g. instruction table address bits to be received from the logic cloud 404 by the instruction table blocks 402). As shown in FIG. 30, the input signals labeled ixx (e.g. i66) are primary inputs into the Logic Cloud 404 and those labeled oxx (e.g. o01) are final outputs out of the Logic Cloud 404. Additionally, the input or output signals named nxx (e.g. n12) are intermediate signals that need to be connected as inputs to other MuxLut cells 500. As described above with respect to FIG. 5B, the BypassMuxes 502 are used to carry a signal from one MuxLut stage (e.g. column of the MuxLut grid) to a non-adjacent stage. As shown in FIG. 30, the BypassMuxes 502 have one multiplexer each, enabling them to select one bit out of all their input bits and connect or "bypass" the input to the output. The highlighted blocks shown in FIG. 30 are MuxLut cells and/or BypassMuxes that are being used by the Logic Mapper 622 for the exemplary layout and the greyed out MuxLut cells and/or BypassMuxes are those that are available in the hardware (e.g. LDE 108), but are left unused after the mapping is complete.

Function Mapping

Figure 31:
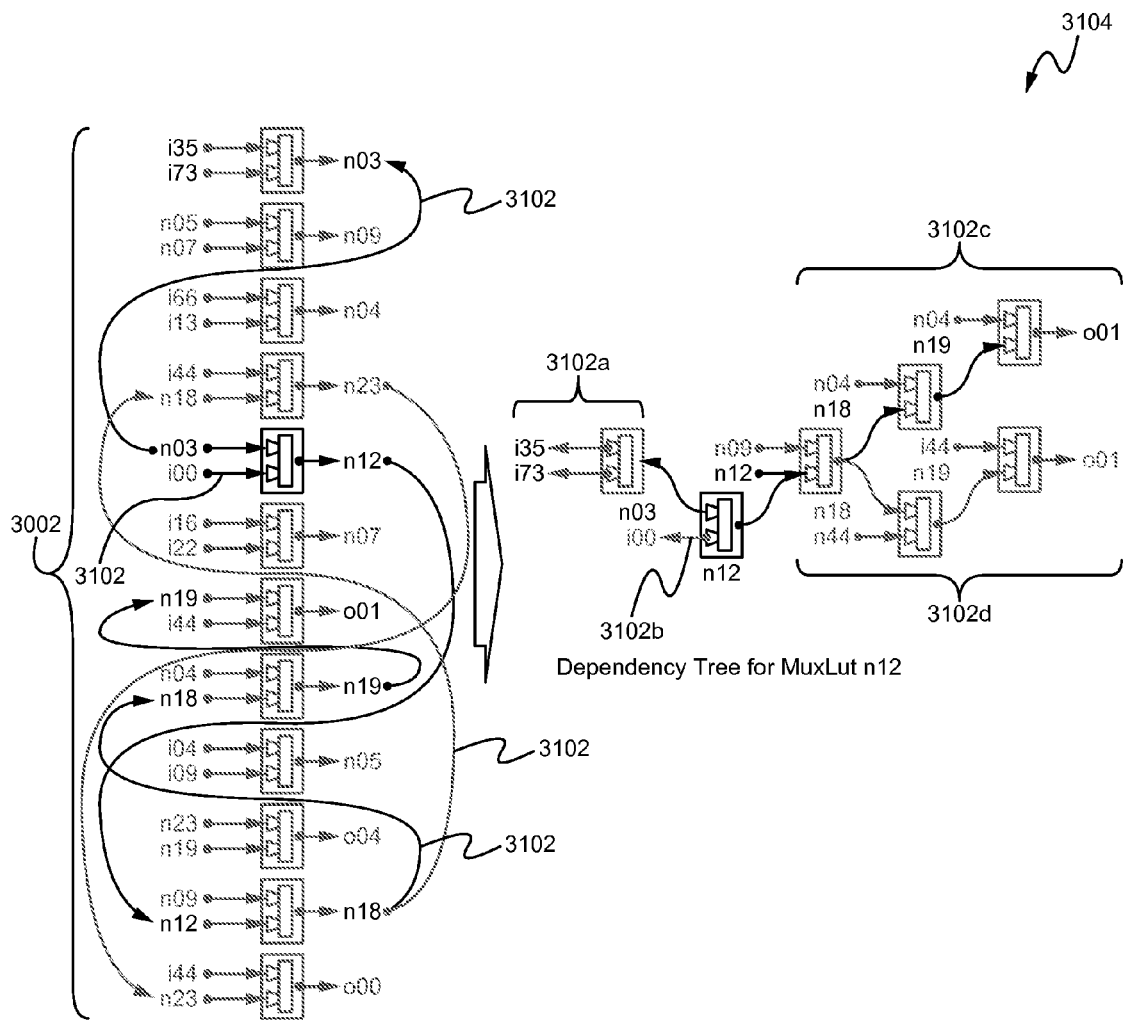
FIG. 31 illustrates an exemplary dependency tree for a function according to some embodiments.

FIG. 31 illustrates an exemplary dependency tree 3104 for a function according to some embodiments. In operation, in order to map the functions into the logic cloud 404, the mapper 622 determines how restricted the placement of each of the functions is based on the size of the logic cloud grid and the input/output dependencies of functions and then maps the functions according to the determined restrictions. As a result, the logic cloud mapper 622 is able to maximize the efficiency of the mapped grid as well as to avoid mapping functions to locations within the grid that will prevent other functions from being mapped properly.

Specifically, based on the list of functions 3002 for the source code 98, in order to map each of the functions to a position/MuxLut within the grid of MuxLuts 500 the logic cloud mapper 622 needs to determine which of the columns/stages of the grid that each of the functions are able to be placed while still meeting their input and output requirements. For example, if a function needs an intermediate input (e.g. n18) it cannot be placed in the first column/stage because there is no previous stage of MuxLut cells 500 to receive the intermediate input from (only primary inputs to the cloud 404). For the same reasons, the function cannot be placed in the same column or previous to the column including the other functions that output the needed intermediate output. Similarly, if a function has an intermediate output (e.g. n09) the function cannot be placed in the last column/stage because there is no subsequent stage of Mux-Luts 500 to send the intermediate output to (only final outputs to the blocks 402). Again for the same reasons, the function cannot be placed in the same column or after the column including the other functions that need to input the produced intermediate output. As a result, the cloud mapper 622 must determine which stages/columns that each of the functions are able to possibly be placed based on their inputs and/or outputs and then map the functions in a layout that conforms to those restrictions.

Accordingly, for each of the functions in the list 3002, the cloud mapper 622 determines all of the possible signal paths 3102 from the inputs and output of the selected function to primary inputs (for the inputs) and final outputs (for the output) using any one or combination of the other functions in the list 3002, which together form a dependency tree 3104 for that function. For example as shown in FIG. 31, for the function that has the output n12 and the inputs n03 and i00, the mapper 622 determines all the possible signal paths 3102 that would couple the output n12 and the inputs n03 and i00 to primary inputs and a final output. For the input i00, no other functions are necessary because i00 is a primary input, but for the input n03 another function is required to reach a point where all the inputs are primary inputs (i35 and i73). Similarly, for the output n12 there are two different combinations or chains of three of the functions that are possible to reach a final output (o01 or o00). In other words, the mapper 622 determines all of the possible signal paths 3102 between each function with a final output and each function with all primary inputs and associates each of the functions with the signal paths 3102 of these possible signal paths 3102 of which they are a part.

Once the dependency tree 3104 has been determined for a function, the mapper 622 is able to select and store the longest input path and the longest output path as forming a longest possible chain for the function, wherein the longest input path represents the number of stages/columns that must precede the column where the function is mapped and the longest output path represents the number of stages/columns that must be after the column were the function is mapped. In other words, this longest chain represents the most restrictive scenario for which column or columns the function is able to be mapped into while still receiving the needed input and outputting the necessary output. In FIG. 31, the longest chain for the selected function is highlighted, wherein the input path 3102a is selected because it is longer than 3102b and both the output paths 3102c and 3102d are an equal length so either is able to be chosen. Alternatively, less than the longest output and/or input signal path are able to be selected as the "longest" chain for the selected function. For example, if by selecting the longest possible input and output signal paths for a function would result in a chain that is longer than the number of stages in the logic cloud 404 (such that the function could not fit in the number of stages/columns using those paths), the mapper 622 is able to select a shorter output and/or input signal path such that the "longest" chain is equal to or shorter than the number of stages in the logic cloud 404. This process is repeated for all of the functions of the list 3002 such that all of their respective dependency trees 3104 and associated "longest" chains have been calculated.

Subsequently, based on the length or number of functions in each of the longest chains, the mapper 622 is able to sort the list of functions 3002 from most restricted to least restricted with regard to the number of stages/columns they are able to be mapped within. The longer the longest chain for a selected function, the more restricted placement of that function will be because it will need a greater amount of stages/columns before and/or after the column in which it is placed. Indeed, as described above, if any of the longest chains are longer than the number of stages, then a smaller "longest" chain must be selected for the associated functions or a new instruction layout may need to be calculated. Additionally, based on the number of stages in the logic cloud 404 and the number of functions before and after the selected function in the longest chain for that function, the mapper 622 is able to identify and store which of the stages each of the functions are able to be mapped into. For example, if there are five stages in the logic cloud 404 and the longest chain for a selected function has two functions before and one function after the selected function, the selected function is only able to be mapped into the third or fourth stage because it requires at least two prior stages to house the two functions before (meaning it cannot be in the first or second stages) and at least one subsequent stage to house the one function after (meaning it cannot be in the fifth stage). Accordingly, with the above determined information, the mapper 622 is able to have a list of all of the columns/stages that each of the functions are able to be mapped to as well as having that list sorted based on how restricted the mapping of each of the function is (or in other words, how many columns/stages are each of the functions able to be mapped to).

Once the restrictions have been determined, the mapper 622 maps each of the functions to one of the MuxLut cells 500 within the logic cloud 404. In particular, when mapping the functions from the list 3002, the mapper 622 is able to prioritize the order and placement of the mapping based on the determined function placement restrictions. For example, the mapper 622 is able to place more highly restricted functions before less restricted functions, is able to map functions into the stages/columns in order starting with the first column (that receives primary inputs) and finishing with the last column (which outputs final outputs), and/or is able to map functions to the column/stage closest to the first column/stage when given a choice between columns/stages. In some embodiments, the mapper 622 begins by identifying a subset of all of the functions of the list 3002 that (have not already been placed and based on their associated restrictions) are able to be placed in the first column/stage and placing the subset of functions in order based on their level of restrictiveness until the first column/stage is full or all of the subset have been mapped to a different MuxLut cell 500 in the first column/stage. Specifically, the functions of the subset that are only able to be placed in one of the columns are mapped first, followed by those that are able to be placed in two of the columns and so forth until the first column/stage is full or all of the subset have been mapped to a different MuxLut cell 500 in the first column/stage. This process is then repeated for the subsequent columns in order until the last column has been mapped such that the process started with the column/stage that receives the primary inputs, continues in order and finishes with the column/stage that outputs the final outputs. Alternatively, the mapper 622 is able to begin by mapping all of the functions that are restricted to only one of the columns/stages into a MuxLut cell 500 of that single column/stage before moving from the first to the last column for the remaining functions that are able to be placed in multiple columns. In such embodiments, after the functions that are restricted to only one of the columns/stages have been mapped, the mapper 622 continues in the same manner as described above except that each of the subsets will exclude the "one column" functions that were already mapped.

In either case, by starting with the first column/stage and continuing in order to the last column/stage, the logic cloud mapper 622 is prioritizing placement of the functions into the column/stage closest to the primary inputs (e.g. closest to the first column/stage) when a choice between two columns/stages is available for a function (based on the restrictions for the function and if any non-mapped MuxLut cells 500 remain in the earlier column(s)). In particular, this prioritization is beneficial because a MuxLut cell 500 has only one output signal and at least one, sometimes many input signals, such that a MuxLut cell 500 moved one or more columns/stages toward the final output requires all of its sometimes many input signals to be bypassed to the next stage (toward the output) using BypassMuxes 502. In contrast, the same MuxLut cell 500 moved one or more columns/stages toward the primary input at most only requires its single output to be bypassed to a subsequent stage using BypassMuxes 502. Thus, the input side prioritization of the mapping order of the functions to the columns/stages minimizes the number of BypassMuxes 502 necessary for the routing/coupling of the function signals. Alternatively, the mapper 622 is able to map the columns in a different order thereby differently prioritizing the placement of the functions within the cloud 404 based on the order.

Finally, for any of the functions whose output is a final output (e.g. o01) have been mapped to a MuxLut cell 500 that is not within the last column/stage, the mapper 622 generates and maps a pass-through function to a MuxLut cell 500 within the last column/stage. This pass-through function is configured to have a single input and output that matches the final output of the function such that the MuxLut cell 500 passes the signal received as the input through to the output similarly to a BypassMux 502. This step ensures that the final outputs of the functions are all output from the logic cloud 404 via the last column. In some embodiments, after all of the functions have been mapped (including any pass-through functions necessary), the mapper 622 sorts the functions within the last stage/column such that the final outputs of those functions (and the instruction table address bits to which they correspond) align with the associated addresses/lines of the instructions blocks 402 to which they are coupled.

Function Routing

After the mapping is complete, the logic cloud mapper 622 is able to route operable connections between the functions, the primary inputs and the final outputs such that all the functions input their associated inputs. Specifically, for the first stage/column this comprises coupling the inputs of the MuxLut cells 500 (as programmed with the mapped function) to the matching primary inputs. In some embodiments, one or more of the primary inputs are able to be from the MuxXor cloud 406 as described above in reference to the MuxXor cloud mapper 626. For the other stages, this routing comprises coupling the inputs of the MuxLut cells 500 of the selected column/stage to a matching output of the MuxLut cells 500 or BypassMuxes 502 within the immediately preceding adjacent column/stage. Indeed, because during the mapping of the functions, the mapper 622 considered input/output signal dependencies it was ensured that each of the signals that are required by a MuxLut cell 500 will always be available in one of the previous stages/columns. In other words, no output signal needs to be fed back to a previous stage/column.

If an output signal that matches an input signal of one or more of the MuxLut cells 500 of a stage/column is not output by any of the MuxLut cells 500 of the immediately previous adjacent stage/column, one or more BypassMuxes 502 are used to forward the needed output from MuxLut cell 500 of the prior stage/column to subsequent columns/stages. In particular, one BypassMux 502 is used to forward the output signal past each column/stage until the column/stage including the MuxLut cell(s) 500 needing the output signal is reached such that the output of the last BypassMux 502 is able to be coupled to the input of the one or more of the MuxLut cells 500. Further, in order to optimize the use of the Bypass muxes 502, the mapper 622 is able to couple multiple MuxLut cells 500 to single outputs of the BypassMuxes 502 if all of the multiple MuxLut cells 500 need the same input signal that is being output by the BypassMux 502. Similarly, the mapper 622 is able to couple multiple MuxLut cells 500 to single outputs of the MuxLut cells 500 of the immediately previous adjacent stage/column if all of the multiple MuxLut cells 500 need the same input signal that is being output by the prior MuxLut cell 500. All of these connections are able to be implemented by having the input muxes 502 of the MuxLut cells 500 couple to or select the needed bit number from the output of the previous stage/column.

In some embodiments, the mapper 622 starts the routing with the last column/stage (e.g. output stage) and continues through the columns/stages in order until the first column/stage (e.g. input stage) is reached. As described above, at each stage/column, the mapper 622 couples each of the input signals required for the MuxLut cells 500 of that stage/column (for both MuxLut cells 500 and Bypass Muxes 502) to the matching outputs generated by the previous stage/column (by both MuxLut cells 500 and Bypass Muxes 502). When a matching signal is not available in the output of the previous stage/column, the mapper 622 generates or allocates a Bypass Mux 502 in the previous stage/column to carry the needed signal reference backward to the previous stage. As a result, the BypassMux 503 acts as a proxy in the previous stage/column looking for the matching signal in the next previous stage/column This process of generated/allocated BypassMuxes 502 is repeated until a matching signal is found and forwarded via the generated/allocated BypassMuxes 502 to the original MuxLut cells 500.

Figure 32A:
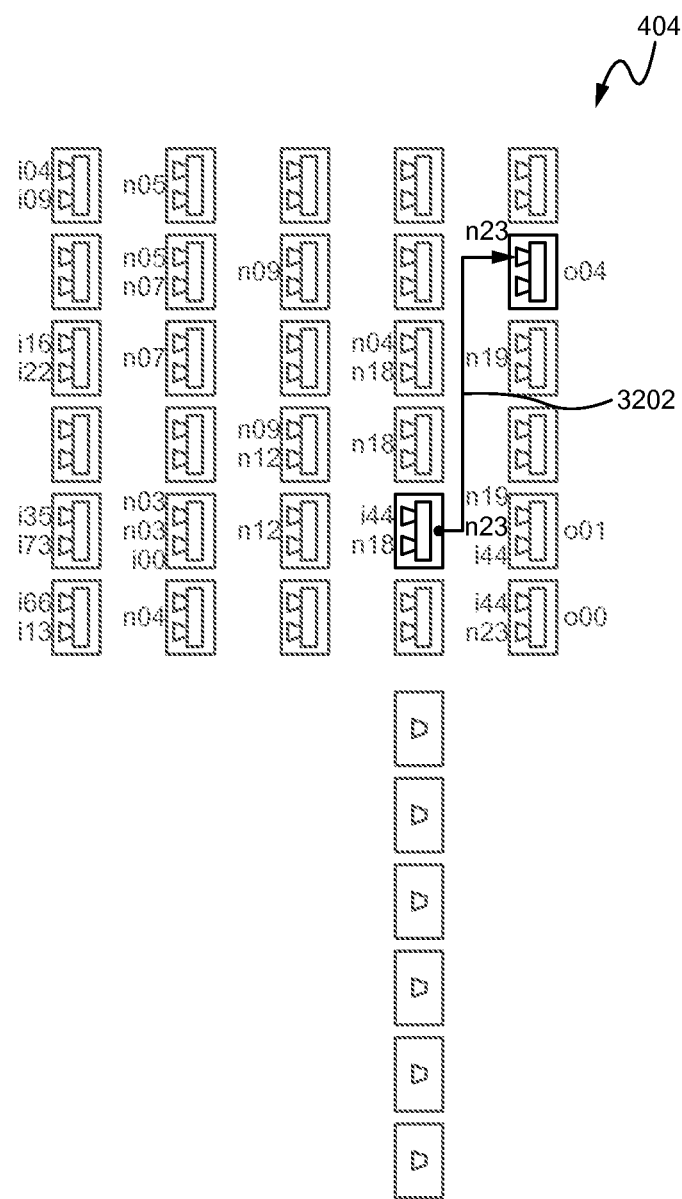
FIGS. 32A-32G illustrate an exemplary method of routing connections between the list of functions as mapped within the logic cloud according to some embodiments.

FIGS. 32A-32G illustrate an exemplary method of routing connections between the list of functions 3002 as mapped within the logic cloud 404 according to some embodiments. As shown in FIG. 32A, starting with the last column/stage the mapper selects an input (e.g. n23) of one of the MuxLut cells 500 and forms a connection 3202 between the matching output of one of the MuxLut cells 500 in the immediately preceding column/stage. The configuration value for the input mux 504 that selects this output signal would be bit 7, which is able to be determined by counting output bits/signals of the previous stage/column from bottom to top (bits 0-5 being the outputs of the Bypass Muxes 502 and bits 6-9 being outputs of the MuxLut cells 500 of the column/stage) as shown in FIG. 32A. The inputs within each stage are able to be selected in any order by the mapper 622 as long as all of the inputs (including assigned bypass inputs) have been selected before moving on to the previous stage/column.

Figures 32B, 32C:
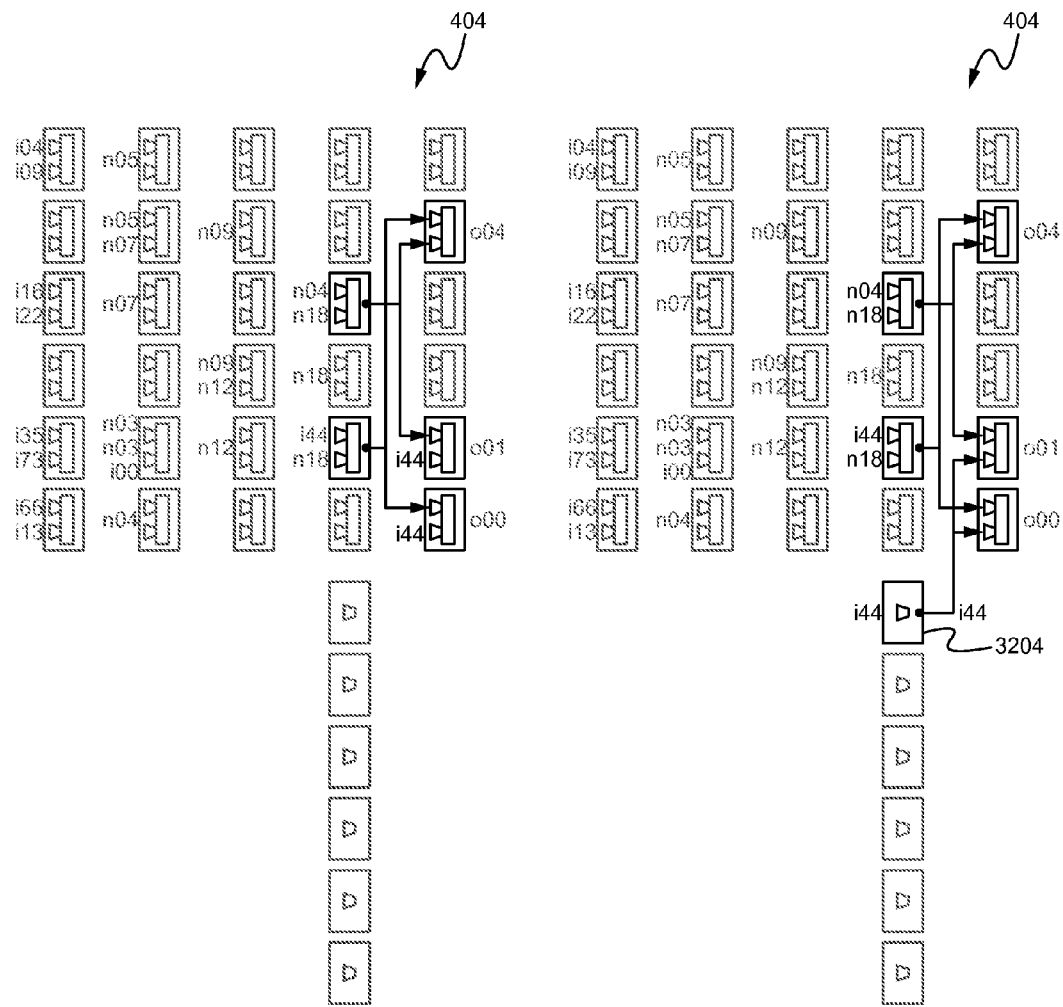

FIG. 32B illustrates the connections 3202 that have been formed after all of the inputs (n23, n19) that have matching outputs in the previous column/stage have been selected. In particular, different MuxLut cells 500 of the last column/row having the same input values are all coupled to the same matching output signal. However, the two remaining inputs (i44) are not coupled yet because they do not match any of the outputs. As a result, as shown in FIG. 32C, a BypassMux 3204 is allocated/generated in the previous column/stage and assigned a pass-through function that inputs and outputs the missing signal i44. The mapper 622 is then able to couple both of the remaining inputs to the matching output of the BypassMux 3204. This completes the routing for the last stage/column so the mapper 622 moves on to the preceding stage/column.

Figures 32D, 32E:
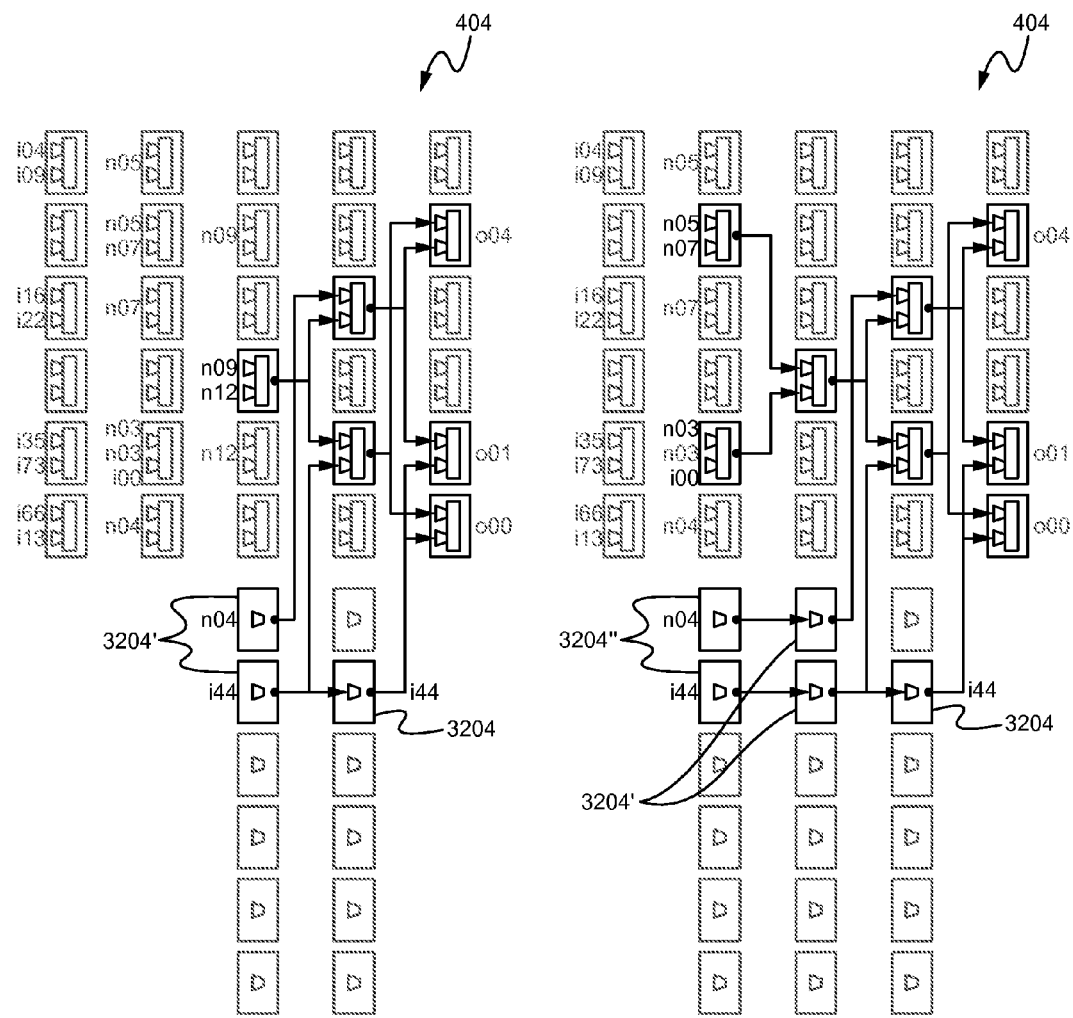
Figures 32F, 32G:
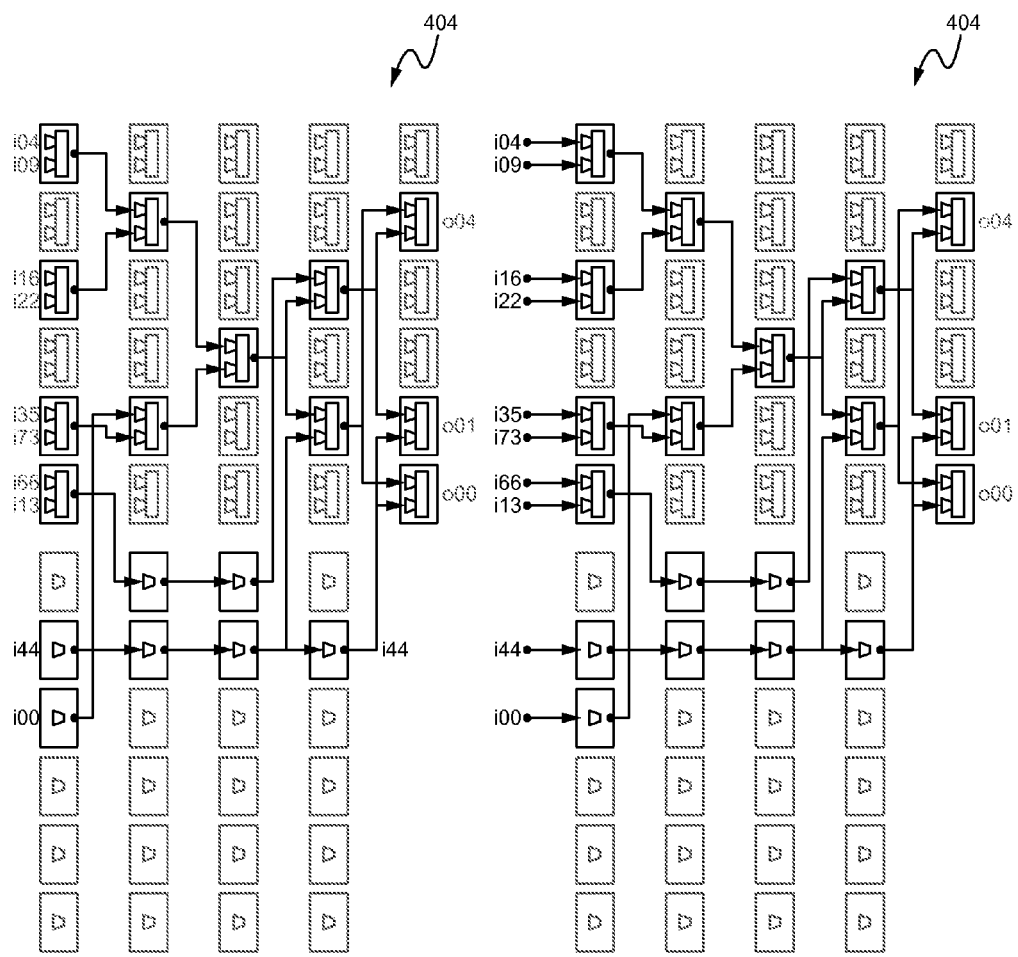

FIGS. 32D and 32E respectively illustrate the connections that have been formed after the routing for the next two preceding columns/stages have been completed. Specifically, in FIGS. 32D and 32E, the inputs of the column/stage having matching outputs in the previous stage/column (e.g. n18; n09 and n12) are coupled to the matching output and BypassMuxes (3204', 3204") are generated/allocated and coupled to the inputs without matching outputs in the same manner as described above. In particular, the only difference from FIGS. 32B and 32C is that the input of the BypassMux 3204 generated/allocated in FIG. 32C is selected as one of the inputs of the selected column/stage in FIG. 32D. Similarly, the input of the two BypassMuxes generated/allocated in FIG. 32D is selected as one of the inputs of the selected column/stage in FIG. 32E. FIG. 32F illustrates the connections that have been formed after the routing for the stage/column adjacent to the first stage/column has been completed. The forming of these connections follows the same process as in FIGS. 32D and 32E. As a result, in FIG. 32G only the first stage/column remains wherein all of the inputs are primary inputs to the logic cloud 404 such that the mapper 622 only needs to couple these inputs to the matching primary inputs. Thus, the mapper 622 provides the advantage of efficiently mapping the functions (or truth tables) derived from the source code 98 such that the logic cloud is able to implement the conditions and/or assignments of the source code 98.

In some cases, it is possible to run out of Bypass Muxes 502 that are available for allocation/generation to a non-matching input within a stage/column while routing signals. In such cases, in some embodiments the logic cloud mapper 622 is able to utilize one or more unused or unmapped MuxLut cell 500 within the previous stage/column as a "BypassMux" for the inputs without a matching output. In particular, this MuxLut cell allocation occurs in the same manner as the BypassMux allocation except that the mapper 622 needs to identify an unused/unmapped MuxLut cell 500 of the previous column/stage before assigning the appropriate pass-through function for the non-matching input(s). In such embodiments, the allocated MuxLut cells 500 only need to utilize a single one of their input muxes 504. For example, this is able to be done by configuring the LUT 506 of the MuxLut cell 500 to be used as a bypass with a value of 0xAAAAAAAAAAAAAAAAL and configuring the first mux 504 to select the desired input (e.g. matching the needed output of the selected column/stage). Thus, the mapper 622 is able to provide the advantage of the flexibility to utilize unused MuxLut cell resources of the logic cloud 404 when necessary.

Figure 33:
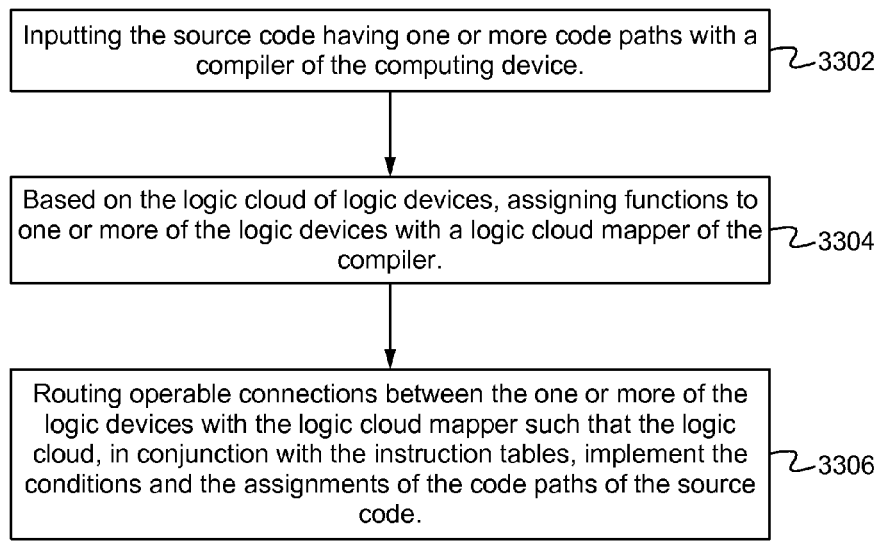
FIG. 33 illustrates a method of mapping and routing a list of functions associated with a source code into a logic cloud according to some embodiments.
Figure 34:
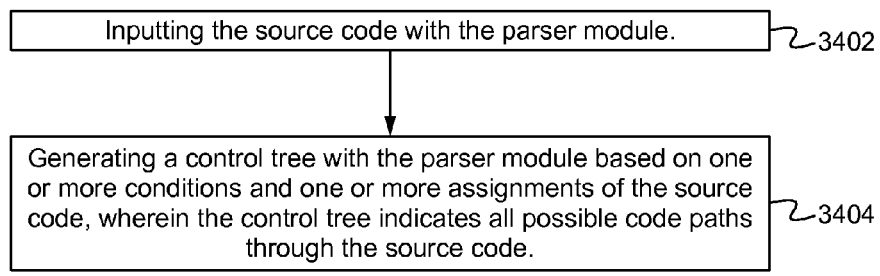
FIG. 34 illustrates a method of parsing an input source code with a parser according to some embodiments.

FIG. 33 illustrates a method of mapping and routing a list of functions associated with a source code into a logic cloud according to some embodiments. As shown in FIG. 33, an LDE compiler 104 inputs the source code 98 having one or more code paths 716 with the computing device at the step 3302. Based on the logic cloud 404 of logic devices (e.g. MuxLut cells 500, BypassMuxes 502), the logic cloud mapper 622 of the LDE compiler 104 assigns functions to one or more of the logic devices at the step 3304. Then the logic cloud mapper 622 of the LDE compiler 104 routes operable connections between the one or more of the logic devices such that the logic cloud 404, in conjunction with the instruction tables 402, implement the conditions 721 and the assignments 720 of the code paths 716 of the source code 98. In some embodiments, the cloud mapper 622 determines all possible serial chains 3102 of the functions that can be formed such that: the device input values of the function at the start of each of the chains 3102 are one or more of the primary inputs; the device output value of the function at the end of each of the chains 3102 is one of the primary outputs; and for every pair of the functions that are adjacent within each of the chains 3102, the device output value of the preceding function of the pair matches at least one of the device input values of the other function of the pair.

In some embodiments, the logic cloud mapper 622 determines, for each of the functions, a longest chain of the chains 3102 that includes the function. In some embodiments, for each of the functions, the mapper 622 determines which column(s) within the logic cloud 404 that the logic device to which the function is assigned can be located such that the longest chain 3102 that includes the function can fit within the logic devices of a single row of the logic cloud 404. In some embodiments, of the column(s) within the logic cloud 404 that the logic device to which the function is assigned can be located, assigning the function to one of the logic devices in the column/stage closest to the first column/stage whose logic devices have not all already been assigned one of the functions. In some embodiments, the logic cloud mapper 622 prioritizes the order of assignment of the functions based on the number of column(s) within the logic cloud 404 that the logic device to which the function is assigned can be located such that, for each column/stage of the logic cloud 404, the functions with a smaller number of column(s) within the logic cloud 404 that the logic device to which the function is assigned can be located are assigned first.

In some embodiments, the routing of the operable connections between the one or more of the logic devices with the logic cloud mapper 622 comprises except for the first column, for each of the device input values of each of the functions assigned to one of the logic devices in one of the columns of the grid, coupling a matching device output value of the device output values of the functions assigned to the logic devices in an immediately preceding column of the grid if possible and for any of the device input values of the functions assigned to the logic devices of the last column that do not match any of the device output values of the functions of the immediately preceding column, coupling each of the any of the device input values to a bypass output of a bypass device in the immediately preceding column. In some embodiments, the routing of the operable connections between the one or more of the logic devices with the logic cloud mapper 622 comprises except for the first column, for each of the bypass devices of each of the immediately preceding columns whose bypass output is coupled to one of the any of the device input values, coupling to the bypass input a device output value of the device output values of the functions assigned to the logic devices in the immediately preceding column of the grid that matches the one of the any of the device input values if possible and for any of the any of the device input values of the functions assigned to the logic devices of the last column that do not match any of the device output values of the functions of the immediately preceding column, coupling each of the any of the any of the device input values to a bypass output of a bypass device in the immediately preceding column.

Output Generator Module

The output generator module 624 provides the function of "walking through" all of the instruction table blocks 402 and the Logic cloud 404 and MuxXor cloud 406 and writing all the values that have been generated/computed in the previous steps by the previous modules into an output file. As a result, this output file is able to be read and the values programmed into the chip. Accordingly, the LDE compiler 104 is able to provide the advantage of inputting a source code and both minimizing and translating the code into an output file such that LDE hardware (e.g. MuxLuts, instruction blocks, BypassMuxes, MuxXors) is able to be programmed with the output file to perform the functions of the source code.

Figure 8:
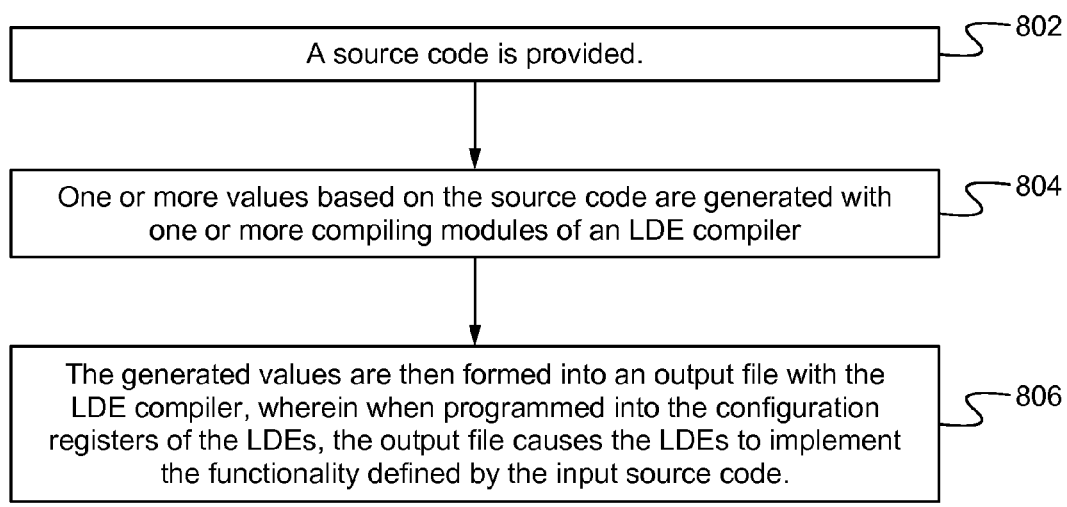
FIG. 8 illustrates a method of implementing an LDE compiler according to some embodiments.

FIG. 8 illustrates a method of implementing an LDE compiler according to some embodiments. As shown in FIG. 8, a source code 98 is provided at the step 802. One or more values based on the source code are generated with one or more compiling modules of an LDE compiler 104 at the step 804. The generated values are then formed into an output file with the LDE compiler at the step 806, wherein when programmed into the configuration registers of the LDEs, the output file causes the LDEs to implement the functionality defined by the input source code. In some embodiments, generating the values comprises creating one or more symbol tables with a symbol mapper that correlate one or more symbols of the input source code to one or more of the group consisting of an input layer, a bit offset into the input layer, and a length of the symbol. In some embodiments, generating the values comprises generating instructions with a code generator that are executable by the LDEs for one or more assignment statements of the source code. In some embodiments, generating the values comprises, based on the source code, determining with a code parallelizer all permutations of the conditions of the source code and pairs each of the permutations with the assignment statements that would be executed by that permutation.

In some embodiments, generating the values comprises putting each of the assignment statements of the source code into a cell of one of the blocks with an instruction mapper and then compressing the instruction table by removing all but one of any of the assignment statements that match and are located in the same block such that none of the assignment statements within one of the blocks are duplicated. In some embodiments, generating the values comprises determining an instruction table address of the instruction table for each of the permutations with the instruction mapper, wherein the address identifies a location within the instruction table of the assignment statements paired with the permutation. In some embodiments, generating the values comprises creating an address bit log with a block logic generator by, for each of the bit positions, determining the value within each of the instruction table addresses. Specifically, if all of the values for one of the bit positions are zero, the bit position within the bit log is set to zero and if all the values for the one of the bit positions are one, the bit position within the bit log is set to one. Otherwise, for each of the instruction table addresses having a value of one for the one of the bit positions, the permutation of the conditions paired with the assignment statements identified by the addresses are associated with the bit position within the bit log.

In some embodiments, generating the values comprises logically minimizing with a block logic minimizer the permutations of the conditions assigned to each of the bit positions within the bit log as if the permutations were combined by a boolean OR operation. In some embodiments, generating the values comprises, based on each of the minimized permutations of conditions, determining with a MuxLut generator of the LDE compiler one or more multiplexor values and lookup table values necessary to program a set of cells each including a plurality of multiplexors and a lookup table to implement the minimized permutation of conditions. In some embodiments, generating the values comprises determining with a logic cloud mapper of the LDE compiler the position of the cells within the matrix based on the minimized permutation of conditions associated with the cell. As a result, the method provides the advantage of both translating and minimizing a source code into an output code that can be programmed into the hardware of an LDE such that the LDE performs the functionality indicated in the source code.

Figure 14:
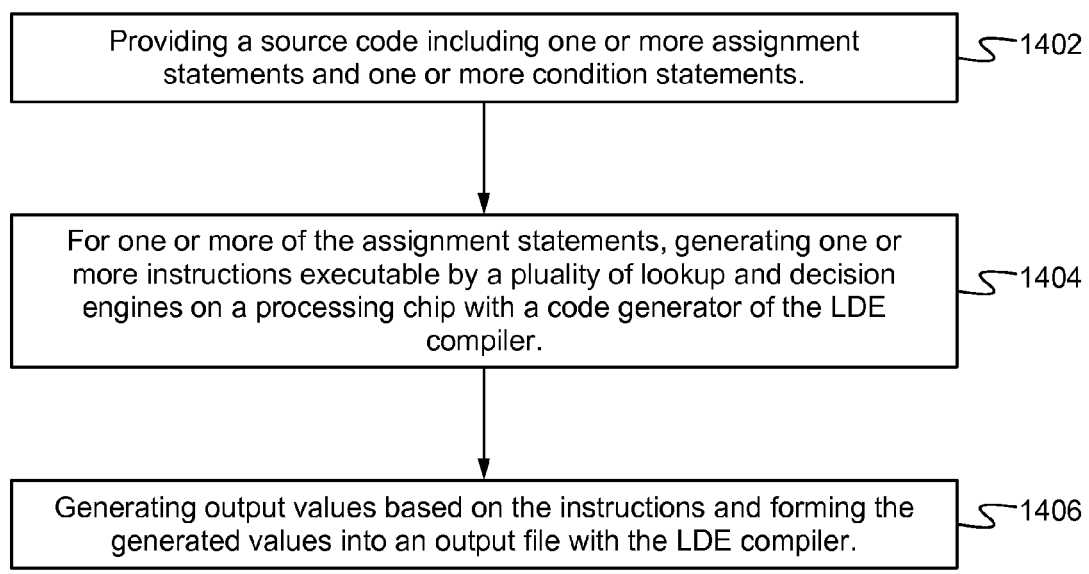
FIG. 14 illustrates a method of implementing an LDE compiler according to some embodiments.

FIG. 14 illustrates a method of implementing an LDE compiler according to some embodiments. As shown in FIG. 14, a source code is provided including one or more assignment statements and one or more condition statements at the step 1402. For one or more of the assignment statements, one or more instructions executable by a plurality of lookup and decision engines (LDEs) on a processing microchip are generated with a code generator of the LDE compiler at the step 1404. Output values based on the instructions and forming the generated values into an output file with the LDE compiler at the step 1406. In some embodiments, when programmed into one or more configuration registers of the LDEs, the output file causes the LDEs to implement the functionality defined by the input source code. As a result, the LDE compiler provides the advantage of intelligently converting source code into one or a plurality of instructions based on the assignment statements within the source code and one or more databases defining the location and associated data with the elements of the assignment statements.

The processing network including an LDE compiler described herein has numerous advantages. Specifically, it is able to input source code and in addition to translating that code such that it can be programmed into the hardware of one or more LDEs, logically compresses and filters the code such that the size of the output file is reduced. This is particularly beneficial in the case of programming LDEs of a microchip, wherein each microchip has a limited programming capacity because the minimization enables each LDE and thus the microchip as a whole to implement larger source code thereby saving money while increasing functionality. Further, the LDE compiler provides the advantage of intelligently converting source code into one or a plurality of instructions based on the assignment statements within the source code and one or more databases defining the location and associated data with the elements of the assignment statements.

One of ordinary skill in the art will realize other uses and advantages also exist. While the invention has been described with reference to numerous specific details, one of ordinary skill in the art will recognize that the invention can be embodied in other specific forms without departing from the spirit of the invention. For example, although the functionality of the LDE compiler 108 is segregated amongst multiple different modules 602-626, it is understood that one or more of the modules are able to be combined in their functionality and/or omitted. As another example, although the different methods described herein describe a particular order of steps, other orders are contemplated as well as the omission of one or more of the steps and/or the addition of one or more new steps. Moreover, although the methods above are described herein separately, one or more of the methods are able to be combined (in whole or part) in order to describe a more comprehensive method operation of the compiler 108. Thus, one of ordinary skill in the art will understand that the invention is not to be limited by the foregoing illustrative details, but rather is to be defined by the appended claims.

We claim:

1. A processing network for receiving a source code having one or more code paths that are each associated with one or more conditions and one or more assignments of the source code, the network comprising:
a plurality of processing elements on a programmable microchip, wherein each of the processing elements comprise one or more instruction tables and a logic cloud including a grid of logic devices, wherein a first column of the grid receives logic cloud input and a last column of the grid transmits logic cloud output;
a plurality of on-chip routers on the microchip for routing the data between the processing elements, wherein each of the on-chip routers is communicatively coupled with one or more of the processing elements; and
a compiler stored on a non-transitory computer-readable memory and comprising a logic cloud mapper that, based on the grid of logic devices, assigns functions to one or more of the logic devices and routes operable connections between the one or more of the logic devices such that the logic cloud, in conjunction with the instruction tables, implement the conditions and the assignments of the code paths of the source code,
wherein each function corresponds to one or more device input values and a device output value, and further wherein the logic device assigned one of the functions will output the device output value in response to inputting the device input values,
wherein the device input values and the device output value are selected from the group consisting of primary inputs that are to be received from the logic cloud input, intermediate results that are to be received from one of the logic devices or primary outputs that are the logic cloud output to be transmitted to the instruction tables,
wherein the logic cloud mapper determines all possible serial chains of the functions that can be formed such that:
the device input values of the function at the start of each of the chains are one or more of the primary inputs;
the device output value of the function at the end of each of the chains is one of the primary outputs; and
for every pair of the functions that are adjacent within each of the chains, the device output value of the preceding function of the pair matches at least one of the device input values of the other function of the pair.

2. The network of claim 1, wherein for each of the functions the logic cloud mapper determines a longest chain of the chains that includes the function.

3. The network of claim 2, wherein, for each of the functions, the logic cloud mapper determines which column or columns within the grid that the logic device to which the function is assigned can be located such that the longest chain that includes the function can fit within the logic devices of a single row of the grid.

4. The network of claim 3, wherein of the column or columns within the grid that the logic device to which the function is assigned can be located, the logic cloud mapper assigns the function to one of the logic devices in the column closest to the first column whose logic devices have not all already been assigned one of the functions.

5. The network of claim 4, wherein the logic cloud mapper prioritizes the order of assignment of the functions based on the number of column or columns within the grid that the logic device to which the function is assigned can be located such that, for each column of the grid, the functions with a smaller number of column or columns within the grid that the logic device to which the function is assigned can be located are assigned first.

6. A processing network for receiving a source code having one or more code paths that are each associated with one or more conditions and one or more assignments of the source code, the network comprising:
a plurality of processing elements on a programmable microchip, wherein each of the processing elements comprise one or more instruction tables and a logic cloud including a grid of logic devices, wherein a first column of the grid receives logic cloud input and a last column of the grid transmits logic cloud output;
a plurality of on-chip routers on the microchip for routing the data between the processing elements, wherein each of the on-chip routers is communicatively coupled with one or more of the processing elements; and
a compiler stored on a non-transitory computer-readable memory and comprising a logic cloud mapper that, based on the grid of logic devices, assigns functions to one or more of the logic devices and routes operable connections between the one or more of the logic devices such that the logic cloud, in conjunction with the instruction tables, implement the conditions and the assignments of the code paths of the source code,
wherein routing the operable connections between the one or more of the logic devices comprises:
except for the first column, for each of the device input values of each of the functions assigned to one of the logic devices in one of the columns of the grid, coupling a matching device output value of the device output values of the functions assigned to the logic devices in an immediately preceding column of the grid if possible; and for any of the device input values of the functions assigned to the logic devices of the last column that do not match any of the device output values of the functions of the immediately preceding column, coupling each of the any of the device input values to a bypass output of a bypass device in the immediately preceding column.

7. The network of claim 6, wherein the bypass output of the bypass devices is equal to a bypass input of the bypass devices.

8. The network of claim 7, wherein routing the operable connections between the one or more of the logic devices comprises:
except for the first column, for each of the bypass devices of each of the immediately preceding columns whose bypass output is coupled to one of the any of the device input values, coupling to the bypass input a device output value of the device output values of the functions assigned to the logic devices in the immediately preceding column of the grid that matches the one of the any of the device input values if possible; and
for any of the any of the device input values of the functions assigned to the logic devices of the last column that do not match any of the device output values of the functions of the immediately preceding column, coupling each of the any of the any of the device input values to a bypass output of a bypass device in the immediately preceding column.

9. The network of claim 8, wherein the logic cloud mapper starts with the last column and proceeds through the columns of the grid in order toward the first column when routing the operable connections between the one or more of the logic devices.

10. The network of claim 1, wherein each of the logic devices comprise one or more multiplexors coupled with a lookup table.

11. A compiler stored on a non-transitory computer-readable medium and configured to generate values based on source code that when programmed into one or more configuration registers of one or more processing elements on a programmable microchip cause the processing elements to implement the functionality defined by the source code, wherein:
the source code has one or more code paths that are each associated with one or more conditions and one or more assignments of the source code;
each of the processing elements comprise one or more instruction tables and a logic cloud including a grid of logic devices, wherein a first column of the grid receives logic cloud input and a last column of the grid transmits logic cloud output; and
the compiler comprises a logic cloud mapper that, based on the grid of logic devices, assigns functions to one or more of the logic devices and routes operable connections between the one or more of the logic devices such that the logic cloud, in conjunction with the instruction tables, implement the conditions and the assignments of the code paths of the source code,
wherein each function corresponds to one or more device input values and a device output value, and further wherein the logic device assigned one of the functions will output the device output value in response to inputting the device input values,
wherein the device input values and device output value are selected from the group consisting of primary inputs that are to be received from the logic cloud input, intermediate results that are to be received from one of the logic devices or primary outputs that are the logic cloud output to be transmitted to the instruction tables,
wherein the logic cloud mapper determines all possible serial chains of the functions that can be formed such that:
the device input values of the function at the start of each of the chains are one or more of the primary inputs;
the device output value of the function at the end of each of the chains is one of the primary outputs; and
for every pair of the functions that are adjacent within each of the chains, the device output value of the preceding function of the pair matches at least one of the device input values of the other function of the pair.

12. The compiler of claim 11, wherein for each of the functions the logic cloud mapper determines a longest chain of the chains that includes the function.

13. The compiler of claim 12, wherein, for each of the functions, the logic cloud mapper determines which column or columns within the grid that the logic device to which the function is assigned can be located such that the longest chain that includes the function can fit within the logic devices of a single row of the grid.

14. The compiler of claim 13, wherein of the column or columns within the grid that the logic device to which the function is assigned can be located, the logic cloud mapper assigns the function to one of the logic devices in the column closest to the first column whose logic devices have not all already been assigned one of the functions.

15. The compiler of claim 14, wherein the logic cloud mapper prioritizes the order of assignment of the functions based on the number of column or columns within the grid that the logic device to which the function is assigned can be located such that, for each column of the grid, the functions with a smaller number of column or columns within the grid that the logic device to which the function is assigned can be located are assigned first.

16. A compiler stored on a non-transitory computer-readable medium and configured to generate values based on source code that when programmed into one or more configuration registers of one or more processing elements on a programmable microchip cause the processing elements to implement the functionality defined by the source code, wherein:
the source code has one or more code paths that are each associated with one or more conditions and one or more assignments of the source code;
each of the processing elements comprise one or more instruction tables and a logic cloud including a grid of logic devices, wherein a first column of the grid receives logic cloud input and a last column of the grid transmits logic cloud output; and
the compiler comprises a logic cloud mapper that, based on the grid of logic devices, assigns functions to one or more of the logic devices and routes operable connections between the one or more of the logic devices such that the logic cloud, in conjunction with the instruction tables, implement the conditions and the assignments of the code paths of the source code, wherein routing the operable connections between the one or more of the logic devices comprises:
except for the first column, for each of the device input values of each of the functions assigned to one of the logic devices in one of the columns of the grid, coupling a matching device output value of the device output values of the functions assigned to the logic devices in an immediately preceding column of the grid if possible; and for any of the device input values of the functions assigned to the logic devices of the last column that do not match any of the device output values of the functions of the immediately preceding column, coupling each of the any of the device input values to a bypass output of a bypass device in the immediately preceding column.

17. The compiler of claim 16, wherein the bypass output of the bypass devices is equal to a bypass input of the bypass devices.

18. The compiler of claim 17, wherein routing the operable connections between the one or more of the logic devices comprises:

except for the first column, for each of the bypass devices of each of the immediately preceding columns whose bypass output is coupled to one of the any of the device input values, coupling to the bypass input a device output value of the device output values of the functions assigned to the logic devices in the immediately preceding column of the grid that matches the one of the any of the device input values if possible; and for any of the any of the device input values of the functions assigned to the logic devices of the last column that do not match any of the device output values of the functions of the immediately preceding column, coupling each of the any of the any of the device input values to a bypass output of a bypass device in the immediately preceding column.

19. The compiler of claim 18, wherein the logic cloud mapper starts with the last column and proceeds through the columns of the grid in order toward the first column when routing the operable connections between the one or more of the logic devices.

20. The compiler of claim 11, wherein each of the logic devices comprise one or more multiplexors coupled with a lookup table.

21. A method of implementing a compiler stored on a non-transitory computer-readable medium of a computing device and configured to generate values based on a source code that when programmed into one or more configuration registers of one or more processing elements on a programmable microchip cause the processing elements to implement the functionality defined by the source code, the method comprising:

inputting the source code having one or more code paths with the computing device, wherein the code paths are each associated with one or more conditions and one or more assignments of the source code, wherein each of the processing elements comprise one or more instruction tables and a logic cloud including a grid of logic devices, wherein a first column of the grid receives logic cloud input and a last column of the grid transmits logic cloud output;

based on the grid of logic devices, assigning functions to one or more of the logic devices with a logic cloud mapper of the compiler of the computing device and routing operable connections between the one or more of the logic devices with the logic cloud mapper such that the logic cloud, in conjunction with the instruction tables, implement the conditions and the assignments of the code paths of the source code, wherein each function corresponds to one or more device input values and a device output value, and further wherein the logic device assigned one of the functions will output the device output value in response to inputting the device input values, wherein the device input values and device output value are selected from the group consisting of primary inputs that are to be received from the logic cloud input, intermediate results that are to be received from one of the logic devices or primary outputs that are the logic cloud output to be transmitted to the instruction tables; and with the logic cloud mapper, determining all possible serial chains of the functions that can be formed such that:

the device input values of the function at the start of each of the chains are one or more of the primary inputs;

the device output value of the function at the end of each of the chains is one of the primary outputs; and for every pair of the functions that are adjacent within each of the chains, the device output value of the preceding function of the pair matches at least one of the device input values of the other function of the pair.

22. The method of claim 21, further comprising, for each of the functions, determining a longest chain of the chains that includes the function with the logic cloud mapper.

23. The method of claim 22, further comprising, for each of the functions, determining with the logic cloud mapper which column or columns within the grid that the logic device to which the function is assigned can be located such that the longest chain that includes the function can fit within the logic devices of a single row of the grid.

24. The method of claim 23, further comprising, of the column or columns within the grid that the logic device to which the function is assigned can be located, assigning the function to one of the logic devices in the column closest to the first column whose logic devices have not all already been assigned one of the functions with the logic cloud mapper.

25. The method of claim 24, wherein the logic cloud mapper prioritizes the order of assignment of the functions based on the number of column or columns within the grid that the logic device to which the function is assigned can be located such that, for each column of the grid, the functions with a smaller number of column or columns within the grid that the logic device to which the function is assigned can be located are assigned first.

26. A method of implementing a compiler stored on a non-transitory computer-readable medium of a computing device and configured to generate values based on a source code that when programmed into one or more configuration registers of one or more processing elements on a programmable microchip cause the processing elements to implement the functionality defined by the source code, the method comprising:

inputting the source code having one or more code paths with the computing device, wherein the code paths are each associated with one or more conditions and one or more assignments of the source code, wherein each of the processing elements comprise one or more instruction tables and a logic cloud including a grid of logic devices, wherein a first column of the grid receives logic cloud input and a last column of the grid transmits logic cloud output; and based on the grid of logic devices, assigning functions to one or more of the logic devices with a logic cloud mapper of the compiler of the computing device and routing operable connections between the one or more of the logic devices with the logic cloud mapper such that the logic cloud, in conjunction with the instruction tables, implement the conditions and the assignments of the code paths of the source code, wherein routing the operable connections between the one or more of the logic devices with the logic cloud mapper comprises:

except for the first column, for each of the device input values of each of the functions assigned to one of the logic devices in one of the columns of the grid, coupling a matching device output value of the device output values of the functions assigned to the logic devices in an immediately preceding column of the grid if possible; and for any of the device input values of the functions assigned to the logic devices of the last column that do not match any of the device output values of the functions of the immediately preceding column, coupling each of the any of the device input values to a bypass output of a bypass device in the immediately preceding column.

27. The method of claim 26, wherein the bypass output of the bypass devices is equal to a bypass input of the bypass devices.

28. The method of claim 27, wherein routing the operable connections between the one or more of the logic devices with the logic cloud mapper comprises:

except for the first column, for each of the bypass devices of each of the immediately preceding columns whose bypass output is coupled to one of the any of the device input values, coupling to the bypass input a device output value of the device output values of the functions assigned to the logic devices in the immediately preceding column of the grid that matches the one of the any of the device input values if possible; and for any of the any of the device input values of the functions assigned to the logic devices of the last column that do not match any of the device output values of the functions of the immediately preceding column, coupling each of the any of the any of the device input values to a bypass output of a bypass device in the immediately preceding column.

29. The method of claim 28, wherein the logic cloud mapper starts with the last column and proceeds through the columns of the grid in order toward the first column when routing the operable connections between the one or more of the logic devices.

30. The method of claim 21, wherein each of the logic devices comprise one or more multiplexors coupled with a lookup table.

31. A method of implementing a compiler stored on a non-transitory computer-readable medium of a computing device and configured to generate values based on a source code that when programmed into one or more configuration registers of one or more processing elements on a programmable microchip cause the processing elements to implement the functionality defined by the source code, the method comprising:

inputting the source code having one or more code paths with the computing device, wherein the code paths are each associated with one or more conditions and one or more assignments of the source code, wherein each of the processing elements comprise a MuxXor cloud including a predetermined number of MuxXor cells and a logic cloud coupled with the MuxXor cloud for receiving MuxXor output from the MuxXor cells;

configuring the MuxXor cells to implement one or more comparisons of the conditions of the source code with a MuxXor cloud mapper of the compiler of the computing device; and determining the one or more comparisons with the MuxXor cloud mapper by identifying a list of all comparisons within the conditions of the source code and pruning the list until the number of comparisons within the list is equal to the predetermined number of MuxXor cells, wherein the pruning is prioritized such that comparisons of the list involving smaller amounts of compared data are pruned before comparisons of the list involving larger amounts of compared data.

32. The method of claim 31, wherein the source code comprises one or more dedicated MuxXor cloud comparison operators and the pruning is prioritized such that comparisons of the list associated with one of the dedicated MuxXor cloud comparison operators are immune from pruning until all comparisons of the list not associated with one of the dedicated MuxXor cloud comparison operators have already been pruned.

33. The method of claim 32, wherein each of the MuxXor cells comprise two MuxXor inputs and the MuxXor output such that, after being configured, each of the MuxXor cells compare the data received on the two MuxXor inputs and output a first predetermined value as the MuxXor output if the MuxXor inputs are the same and output a second predetermined value as the MuxXor output if the MuxXor inputs are not the same.

34. The method of claim 33, wherein each of the MuxXor cells receive a primary input from outside the processing element and output the MuxXor output to the logic cloud.

35. The method of claim 34, wherein each of the MuxXor cells comprise two multiplexors the each receive one of the MuxXor inputs coupled to a comparator that compares the MuxXor inputs and outputs the MuxXor output based on the comparison.

* * * * *